United States Patent
Hoffend, III et al.

(10) Patent No.: US 9,061,869 B2
(45) Date of Patent: Jun. 23, 2015

(54) LIFT ASSEMBLY SYSTEMS AND METHODS

(75) Inventors: Donald A. Hoffend, III, Annandale, VA (US); William R Florac, Verona, WI (US); Michael Lichter, Holzkirchen (DE); Edwin W. Bolz, Queensbury, NY (US)

(73) Assignee: Electronic Theatre Controls, Inc., Middleton, WI (US)

( * ) Notice: Subject to any disclaimer, the term of this patent is extended or adjusted under 35 U.S.C. 154(b) by 21 days.

(21) Appl. No.: 13/475,267

(22) Filed: May 18, 2012
(Under 37 CFR 1.47)

(65) Prior Publication Data
US 2013/0015315 A1   Jan. 17, 2013

Related U.S. Application Data

(63) Continuation of application No. PCT/US2010/057268, filed on Nov. 18, 2010.

(60) Provisional application No. 61/358,537, filed on Jun. 25, 2010, provisional application No. 61/262,244, filed on Nov. 18, 2009.

(51) Int. Cl.
*B66D 1/48* (2006.01)
*B66D 5/16* (2006.01)
(Continued)

(52) U.S. Cl.
CPC . *B66D 5/16* (2013.01); *A63J 1/028* (2013.01); *B66D 1/38* (2013.01); *B66D 1/56* (2013.01)

(58) Field of Classification Search
USPC ......... 254/264, 266, 277, 333, 362, 371, 383, 254/411, 286, 338, 393–397
See application file for complete search history.

(56) References Cited

U.S. PATENT DOCUMENTS 1,002,839 A   9/1911   Hagen
1,435,390 A   11/1922  Hasait
(Continued)

FOREIGN PATENT DOCUMENTS

DE   1014725   8/1957
DE   2710145   9/1978
(Continued)

OTHER PUBLICATIONS

PCT/US2010057268 International Preliminary Report on Patentability and Written Opinion of the International Searching Authority, mailed May 22, 2012, 13 page.
(Continued)

*Primary Examiner* — Emmanuel M Marcelo
*Assistant Examiner* — Angela Caligiuri
(74) *Attorney, Agent, or Firm* — Michael Best & Friedrich LLP

(57) ABSTRACT

A lift assembly comprising an article to be raised and lowered, a cable coupled to the article and defining a longitudinal axis, a power mechanism coupled to the drive element, a drum powered by the power mechanism, a cable keeper biasing the drive element toward the drum, a keeper shaft providing lateral movement of the cable keeper, and an encoder mounted for rotation with the keeper shaft. The encoder provides information regarding the position of the article. The lift assembly can also include a load cell assembly including a load cell housing, a load cell member contacting the drive element and movable relative to the load cell housing, and a load cell sensor coupled to the load cell member and operative to provide an output corresponding with a load on the drive element. The load cell member can be mounted for movement laterally relative to the longitudinal axis.

16 Claims, 44 Drawing Sheets

(51) Int. Cl.
*A63J 1/02* (2006.01)
*B66D 1/38* (2006.01)
*B66D 1/56* (2006.01)

(56) References Cited

U.S. PATENT DOCUMENTS

| | | | |
|---|---|---|---|
| 1,822,422 | A | 9/1929 | Richardson |
| 1,982,281 | A | 11/1934 | Birkenmaier et al. |
| 2,649,279 | A | 8/1953 | Jones et al. |
| 2,892,598 | A | 6/1959 | Dudley |
| 3,136,358 | A | 6/1964 | Madsen |
| 3,345,066 | A | 10/1967 | Izenour |
| 4,058,186 | A | 11/1977 | Mullis |
| 4,062,519 | A | 12/1977 | Jacobs |
| 4,071,205 | A | 1/1978 | Wieschel |
| 4,269,380 | A | 5/1981 | Shima et al. |
| 4,303,237 | A | 12/1981 | Hoffend, Jr. et al. |
| 4,512,117 | A | 4/1985 | Lange |
| 4,575,050 | A | 3/1986 | Bechmann |
| 4,606,527 | A | 8/1986 | Ziller et al. |
| 4,767,073 | A | 8/1988 | Malzacher |
| 5,021,954 | A | 6/1991 | Fox et al. |
| 5,106,057 | A | 4/1992 | Feller et al. |
| 5,161,104 | A | 11/1992 | Fox et al. |
| 5,280,880 | A | 1/1994 | Ewing et al. |
| 5,758,867 | A | 6/1998 | Arnesson |
| 5,829,736 | A | 11/1998 | Harken |
| 5,829,737 | A | 11/1998 | Gersemsky |
| 5,920,476 | A | 7/1999 | Hennessey et al. |
| 5,947,451 | A | 9/1999 | Cavanagh |
| 5,950,953 | A | 9/1999 | Baugh et al. |
| 6,019,353 | A | 2/2000 | Atfield |
| 6,085,826 | A | 7/2000 | Maesaki |
| 6,209,852 | B1 | 4/2001 | George et al. |
| 6,385,493 | B1 | 5/2002 | Hennessey et al. |
| 6,443,431 | B1 | 9/2002 | Stasny et al. |
| 6,520,485 | B1 | 2/2003 | Soot |
| 6,619,624 | B2 | 9/2003 | Lamphen |
| 6,634,622 | B1 | 10/2003 | Hoffend, Jr. |
| 6,691,986 | B2 | 2/2004 | Hoffend, Jr. |
| 6,811,112 | B1 | 11/2004 | Currie et al. |
| 6,827,121 | B2 | 12/2004 | Park |
| 6,889,958 | B2 | 5/2005 | Hoffend, Jr. |
| 6,988,716 | B2 | 1/2006 | Hoffend, Jr. |
| 6,997,442 | B2 | 2/2006 | Hoffend, Jr. |
| 7,185,774 | B2 | 3/2007 | Colgate et al. |
| 7,234,685 | B2 | 6/2007 | Britten |
| 7,311,297 | B1 | 12/2007 | Bradshaw et al. |
| 7,360,576 | B2 | 4/2008 | Lin |
| 7,364,136 | B2 | 4/2008 | Hossler |
| 2003/0030045 | A1 | 2/2003 | Hoffend, Jr. |
| 2004/0098944 | A1 | 5/2004 | Hoffend, Jr. |
| 2004/0099852 | A1 | 5/2004 | Hoffend, Jr. et al. |
| 2004/0183060 | A1 | 9/2004 | Hoffend, Jr. |
| 2005/0247919 | A1 | 11/2005 | Hoffend, Jr. |
| 2006/0163548 | A1 | 7/2006 | Kochan et al. |
| 2006/0169662 | A1 | 8/2006 | Hoffend, Jr. |
| 2006/0284151 | A1 | 12/2006 | Hossler |
| 2007/0001158 | A1 | 1/2007 | Hoffend, Jr. |
| 2007/0181862 | A1 | 8/2007 | Hossler |
| 2007/0278046 | A1 | 12/2007 | Hoffend, III |
| 2009/0127527 | A1 | 5/2009 | Hoffend, III |
| 2009/0140221 | A1 | 6/2009 | Kochan et al. |
| 2010/0301292 | A1 | 12/2010 | Hoffend, III |

FOREIGN PATENT DOCUMENTS

| | | |
|---|---|---|
| DE | 9415808.8 | 2/1995 |
| EP | 0009058 | 4/1980 |
| EP | 0457436 | 11/1991 |
| EP | 0504867 | 9/1992 |
| FR | 640143 | 10/1926 |
| FR | 2798597 | 3/2001 |
| GB | 178580 | 4/1922 |
| JP | 2002167175 | 6/2002 |
| WO | 2006031245 | 3/2006 |
| WO | 2007127453 | 11/2007 |

OTHER PUBLICATIONS

PCT/US2010057268 International Search Report and Written Opinion, mailed Jan. 31, 2011, 15 pages.

EP10832195 Supplementary European Search Report and Written Opinion dated Oct. 31, 2013 (6 pages).

LIFT ASSEMBLY SYSTEMS AND METHODS

CROSS-REFERENCE TO RELATED APPLICATIONS

This application is a continuation of International Application No. PCT/US2010/057268, filed Nov. 18, 2010, which claims the benefit of priority to U.S. Provisional Patent Application No. 61/358,537, filed Jun. 25, 2010 and U.S. Provisional Patent Application No. 61/262,244, filed Nov. 18, 2009. These applications are incorporated herein by reference in their entireties.

FIELD OF THE INVENTION

The present invention relates to lift assembly systems, components, and methods. Embodiments of the present invention may be useful for raising and lowering a load in theatrical and staging environments.

BACKGROUND OF THE INVENTION

Performance venues such as theaters, arenas, concert halls, auditoriums, schools, clubs, convention centers, and television studios can employ battens or trusses to suspend, elevate, and/or lower lighting, scenery, draperies, and other equipment that can be moved relative to a stage or floor.

Conventional lift systems may be configured such that a pulley, or loft block, mechanism is attached directly to an overhead building support. As a result, an undesired amount of horizontal stress can be placed on the overhead building supports to which the system and associated load are attached.

Ropes or cables utilized to raise and/or lower a batten or other load may be wound about and unwound from a drum connected to a lift system motor. In conventional lift systems, the cables may rub unevenly against adjacent cables as they are being wound about and unwound from the drum. Such uneven rubbing can cause friction that may increase the rate at which the cables, drum, and other components need to be serviced and/or replaced. In addition, such friction can cause increased noise that may be undesirable in certain performance environments.

Some conventional drums can have a size and/or coil cables about the drums such that a large space is needed in which to locate the drum in or about the lift system. In "yo-yo" type drums and "pile" type drums, cables coil about the drum vertically on top of themselves. For example, in a "pile" type drum, after the cable has wound completely across the face of the drum, it is forced up to a second layer at a flange on the side of the drum. The cable then winds back across the drum in the opposite direction. In order to advance across the drum, the cable must cross over two cable "notches" of the previous coil. Such "cross-over" subjects a cable to abrasion, crushing, and pinching as it is pushed over the two cable notches across the crown of the first cable layer. Such stress can cause erratic motion of the cables as they are wound up onto the drum and/or unwound from the drum. Such vertically stacked coils of cables in conventional drums contribute to the need for increased torque to wind and unwind cables on those drums.

Conventional lift systems can include a cable management system in which electrical wires in a cable are stacked in layers back and forth on top of each other. The wires can fold back and forth periodically on themselves in a "scissoring" or "switchback" fashion, for example, every few feet. One risk of folding wires back onto themselves repeatedly is that they can be undesirably pinched, and can become worn over time.

In some conventional cable management systems, the electrical wire cable is collected in a tray positioned on top of a batten as the batten is raised. Such a tray may be referred to as a "flip flop" tray, since a portion of the electrical wire cable can be "flipped" in one direction and then "flopped" back onto itself in the opposite direction. A disadvantage of allowing such wire cables to collect in a stacked fashion on top of a batten, particularly on one end of the batten, is that the collected cables can cause the batten to be top heavy, which may cause the batten to become unbalanced and undesirably alter the orientation of the batten and/or articles attached to the batten.

In some lift systems, cables coiled about a drum can lose tension, for example, from becoming disconnected from a batten and/or article being raised and/or lowered, or the batten or article striking an object in its path. As a result of slack tension on the cables, the cables may need to be retained in position about the drum during such an event.

Lift systems often include a braking mechanism to stop movement of the cables and article attached to the cables, for example, in the event of loss of power to the lift system motor or other reason the article begins to fall out of control of the lift system. Some braking mechanisms can be less than totally reliable, requiring redundant braking systems, and can be noisy and tend to wear out quickly.

SUMMARY

The present invention provides a lift assembly comprising an article to be lifted between a lowered position and a raised position, a flexible drive element (e.g., a cable) coupled to the article and defining a longitudinal axis, a power mechanism coupled to the drive element, a drum powered by the power mechanism and dimensioned to facilitate winding of the drive element onto the drum, a cable keeper providing a force on the drive element to bias the drive element toward the drum, a keeper shaft coupled to the cable keeper to provide movement of the cable keeper laterally relative to the longitudinal axis, and an encoder (e.g., an absolute, mechanical encoder) mounted for rotation with the keeper shaft. The encoder provides information regarding the position of the article from the lowered position to the raised position.

In one embodiment, the power mechanism includes a drive shaft, and the assembly further comprises a second encoder mounted for rotation with the drive shaft. Preferably, the first encoder rotates at a slower rate that the second encoder as the article is moved between the lowered and raised positions.

The lift assembly can also include a load cell assembly including a load cell housing, a load cell member (e.g., a roller) contacting the drive element and movable relative to the load cell housing, and a load cell sensor coupled to the load cell member and operative to provide an output corresponding with a load on the drive element. Preferably, a keeper bar is positioned adjacent the first load cell member. In one embodiment, the load cell member is coupled to a pivot block, and the pivot block is coupled to the load cell sensor. In order to accommodate lateral movement of the drive element, the load cell member can be mounted for movement laterally relative to the longitudinal axis.

DETAILED DESCRIPTION

Figure 1:
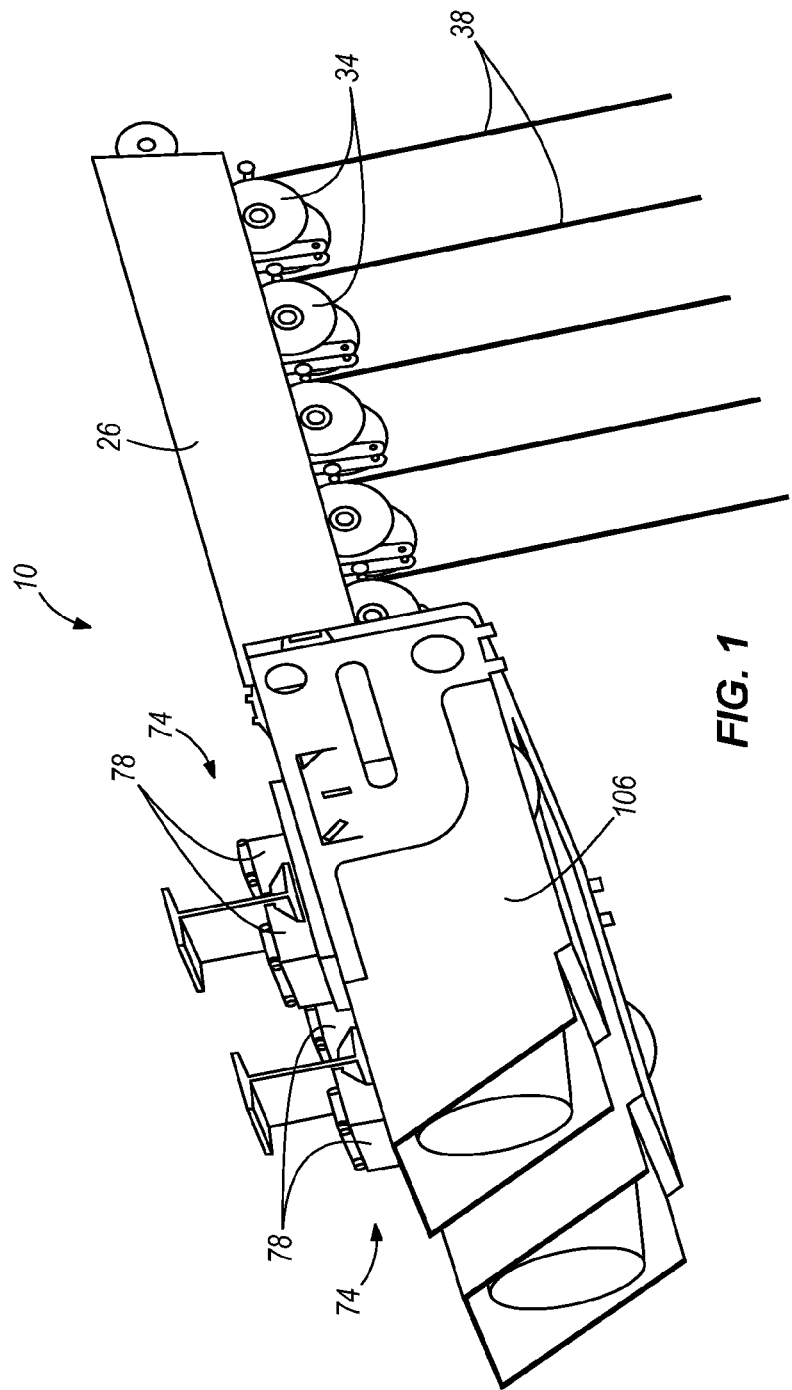
FIG. 1 is a view of a lift assembly system showing a power head 106 attached to a compression tube and loft blocks loaded in the tube in an embodiment of the present invention.

For the purposes of this application, unless otherwise indicated, all numbers expressing quantities, conditions, and so forth used in the specification are to be understood as being modified in all instances by the term "about." Accordingly, unless indicated to the contrary, the numerical parameters set forth in the specification are approximations that can vary depending upon the desired properties sought to be obtained by the embodiments described herein. At the very least, each numerical parameter should at least be construed in light of the number of reported significant digits and by applying ordinary rounding techniques.

Notwithstanding that the numerical ranges and parameters setting forth the broad scope of the described embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10—that is, all subranges beginning with a minimum value of 1 or more, for example, 1 to 6.1, and ending with a maximum value of 10 or less, for example, 5.5 to 10.

As used in this specification, the singular forms "a," "an," and "the" include plural referents unless the context clearly dictates otherwise. Thus, for example, the term "a loft block" is intended to mean a single loft block or more than one loft block.

Some embodiments of a lift assembly system and method of the present invention can include a compression tube, a drum, an elongate member, or cable or wire rope, a drive mechanism, a head block, and a loft block. The compression tube can be a substantially rectangular tube having an opening in a bottom along at least a portion of the length of the tube. The tube can be connectable to an overhead structure. The drum can be located external to the tube and adapted to wind and unwind the elongate member to raise and lower an article attached to the elongate member. The drive mechanism can be structurally connected to one end of the tube externally. In some embodiments, the drum and drive mechanism can be housed within a power head housing that is separate from the tube and axially aligned with the tube. The drive mechanism can include a motor rotatingly connected to the drum, such that the elongate member extends along a first generally horizontal path from the drum to the tube. The loft block can be connected to the tube internally, spaced from the head block, and located to redirect the elongate member from the second generally horizontal path to a generally vertical path through the bottom opening in the tube to the attached article.

Some embodiments of such a lift assembly system can include a plurality of the loft blocks. Each loft block can be positionable and securable in place at an infinite number of locations along the length of the tube. In some embodiments, the lift assembly system can include a braking mechanism. Certain embodiments of the lift assembly system can include a plurality of the tube modules arranged in an end-to-end configuration.

Exemplary embodiments of aspects of such a lift assembly system are shown in FIGS. 1-16. Such embodiments are described in co-owned U.S. patent application Ser. No. 12/268,097, filed Nov. 10, 2008, which is incorporated herein by reference in its entirety. An illustrative embodiment of a lift assembly system 10 can include the coiling apparatus, or drum 14, a first traction drive operably connected to the drive mechanism, a second traction drive, the tube 26 containing one or more pulleys, for example, the head block and the loft blocks 34, and one or more elongate members, such as cables 38. The cables 38 can be attached to the drum 14 and configured to travel in a generally horizontal path from the drum 14 around the second traction drive to and around the first traction drive to the head block and the loft blocks 34 inside the tube 26. From the loft blocks 34, the cables 38 can travel in a generally vertical path, that is, upward and downward between the loft blocks 34 and a surface below. An article 42, or load, can be attached to the cables 38 such that when the cables 38 are moved in the generally vertical path, the attached article 42 can be raised and/or lowered relative to the surface.

Such embodiments of the lift assembly system 10 may be useful for raising and/or lowering articles 42, such as theatrical stage equipment, relative to a stage floor. Theatrical stage equipment can include equipment which is to be raised and/or lowered prior to and/or during a performance, in order to provide a desired scene effect. This equipment can include, for example, various rigging sets such as curtains, borders, screens, scene displays, props, lighting fixtures, and other equipment. The rigging sets, some of which can be generally coextensive in length with the opening of a theater stage, can have substantial mass and weight. Some embodiments of the lift assembly system 10 may be used for raising and/or lowering articles 42 and loads other than theatrical stage equipment.

In certain instances, the articles 42 to be raised and lowered can be stage equipment supported by one or more battens 46. A "batten" can comprise an elongated pipe, rod, or rigid strip of material. Each batten 46 can be supported along its length by a plurality of flexible cables 38. Although the term "batten" is used in connection with theatrical and staging environment, including scenery, staging, lighting and sound equipment, etc., the term can encompass any load connectable to an elongate member, such as a windable cable.

Some embodiments of the lift assembly system 10 can be utilized in connection with buildings in various settings. The term "building" as used herein can encompass a structure or facility to which the lift assembly is connected, such as, but not limited to, performance venues, theaters, arenas, concert halls, auditoriums, schools, clubs, educational institutions, stages, convention centers, television studios, showrooms, places of religious gathering, cruise ships, etc.

Figure 2:
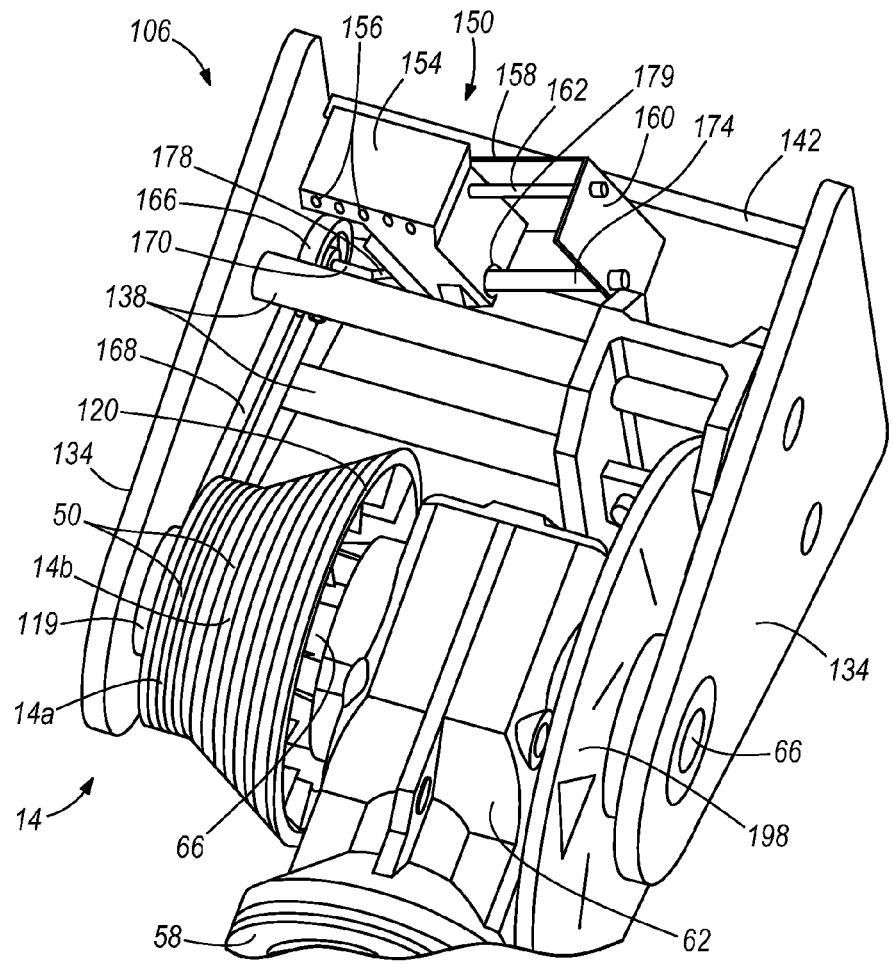
FIG. 2 is a perspective view of a drive mechanism, or power head 106, of a lift assembly system showing a hybrid progressive drum in an embodiment of the present invention.
Figure 3:
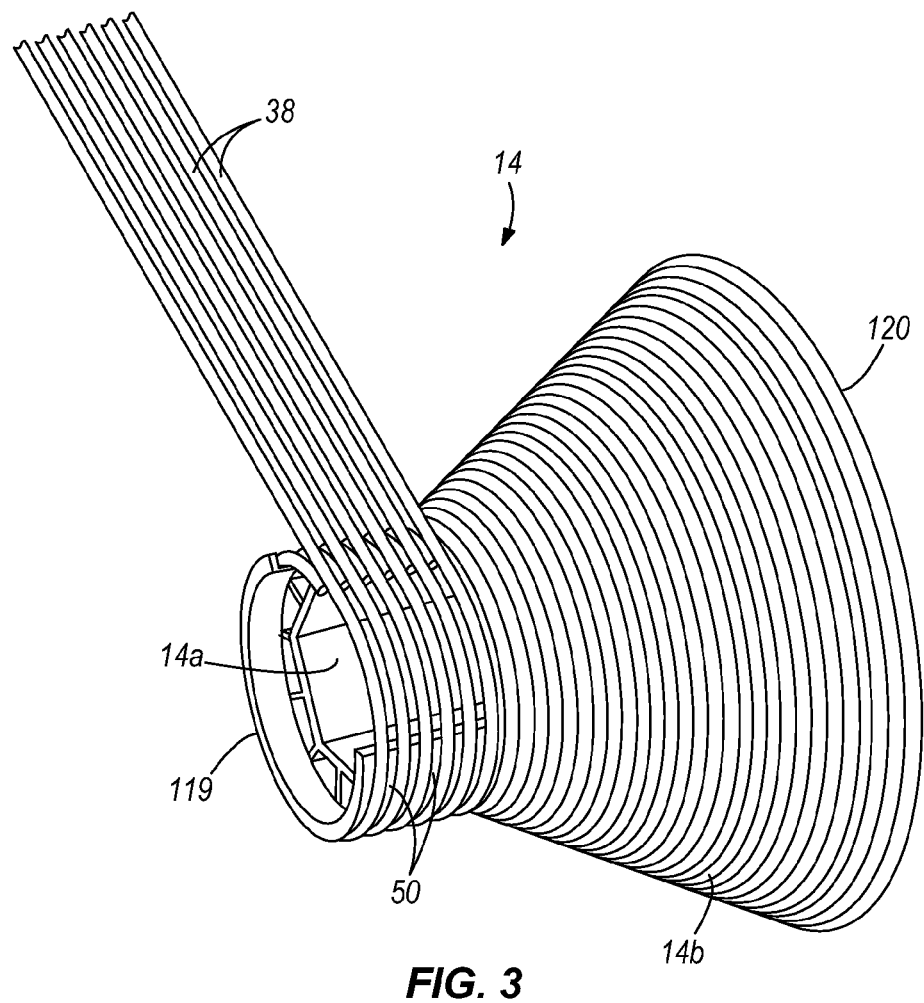
FIG. 3 is a perspective view of a hybrid drum having a constant diameter portion 14a and a gradually increasing diameter portion 14b useful in a power head 106 in an embodiment of the present invention.

In some embodiments of the present invention, the lift assembly system 10 can include the coiling apparatus, or drum 14, as shown in FIGS. 2 and 3. One end of the cables 38, can be securely attached to the drum 14. The drum 14 can include a series of channels 50 or contoured surface areas about which the cables 38 can be coiled, or wound, and from which the cables 38 can be uncoiled, or unwound. In some embodiments, the drum 14 can include a channel 50 or contoured surface area for each cable 38 to be wound and unwound. For example, the drum 14 can include eight cable-receiving channels 50. Each channel 50 or contoured surface area can be sized to retain a length of cable 38 sufficient to dispose the article 42 connected to the cable 38 between a fully lowered position and a fully raised position. Alternatively, the drum 14 can have a smooth surface about which the cables 38 can be wound and from which the cables 38 can be unwound in a side-by-side manner.

The drum 14 may be rotatably connected to the tube 26 and operably connected to the motor driveshaft with a linking element, such as a belt, chain, or other linking mechanism.

In some embodiments, the lift assembly system 10 can include a drive mechanism. The drive mechanism may include a motor 58, for example, an electric motor. The drive mechanism may further include a set of gears (not shown), which may be housed in a gear box 62, for transferring rotational motion of the motor 58 to the drive shaft 66 and in turn to the first traction drive. The drive mechanism can be housed in a drive mechanism housing, as shown in FIG. 1. The motor 58 can cause rotation of the first traction drive about its rotational axis. In embodiments in which the second traction drive and the drum 14 are operably linked to the first traction drive, the motor 58 and gears can likewise cause rotation of the second traction drive and the drum 14. The gears (not shown) in the gear box 62 can rotate the drive shaft 66, and the traction drives and drum 14, in a winding (raising) rotation and an unwinding (lowering) rotation.

In some embodiments, the drive mechanism can be located completely external to the tube 26 containing the loft blocks 34. Some embodiments of the lift assembly system 10 can be equipped with different sizes and capacities of motors 58.

Some embodiments of the lift assembly system 10 can be constructed to cooperate with at least one elongate member, such as a cable 38, or other length of material, connected at one end to the drum 14 and at the other end to the article 42 or load to be moved. In some embodiments, the number of cables 38 can be at as many as eight or more cables 38. As used herein, "cable" is defined as a steel cable, steel tape (for example, a one inch wide steel band), wire, metal, natural or synthetic rope, or other any other generally inelastic windable material suitable for raising and lowering a load or article 42.

A length of cable 38 can be disposed about the drum 14 sufficient to wind about the drum 14 to extend horizontally to the head block and to the loft block 34 around which it moves, and then downward to the point at which it is connected to the article 42 or load. The cable 38 can have a length sufficient to fully lower a desired article 42 or load.

In another aspect, some embodiments of the lift assembly system 10 can include the compression tube 26 as shown in FIGS. 1 and 11-13. The compression tube 26 can comprise a length of substantially rigid material that can be connected to an overhead building structure. As shown in FIG. 1, the compression tube 26 can include a plurality of loft blocks 34, or pulleys, disposed at intervals along the inside length of the tube 26. Each loft block 34 can rotatingly engage one or more cables 38. The loft blocks 34 can re-direct the generally horizontal path of the cables 38 from the drum 14 to a generally vertical path to the attached article(s) 42 below the compression tube 26.

Depending upon several factors, including, for example, the dimensions and weight of the article 42 to be raised and/or lowered, the number of loft blocks 34 utilized in an embodiment of the present invention can vary. In some embodiments, for example, the lift assembly system 10 can include eight loft blocks 34 and thus eight cable 38 drop points, as compared to some conventional lift assemblies which provide seven or fewer loft blocks 34. In this manner, the lift assembly system 10 can provide greater support to the article 42 and greater flexibility as to locations on the article 42 to which the cables 38 can be attached.

The head block can be located to redirect the elongate member, or cable 38, from a first generally horizontal path from the drive mechanism to a second generally horizontal path to the loft blocks 34 back in the direction of the drive mechanism. The head block can include channels for aligning and directing each of a plurality of the cables 38.

The compression tube 26 can include an opening in the bottom of the tube 26 along at least a portion of the length of the tube 26. The cables 38 that are routed about the loft blocks 34 can be routed downward through the opening for movement upward and downward to raise and lower the attached article 42.

In some embodiments, the compression tube 26 can include a connecting mechanism 74 disposed on the top of the tube 26 for connecting the tube 26 to an overhead structure, such as a building support beam. The connecting mechanism 74 can comprise connector arms 78 that can be movable toward and away from each other. The connecting mechanism 74 can include a tightening mechanism, such as a biasing mechanism, for releasably securing the connecting mechanism 74 about the structure.

Some embodiments of the lift assembly system 10 can include a single primary compression tube 26 unit having a predetermined length. In other embodiments, the lift assembly system 10 can include a primary compression tube 26 unit and one or more extension tubes. In such embodiments, the extension tube unit(s) can include a desired number of loft blocks 34, and can be installed end-to-end to provide a length of compression tube 26 having various desired lengths. In this arrangement, the lift assembly system 10 can include a single drive mechanism at one end of the primary compression tube 26. The cables 38 to be routed through the bottom of the extension tube unit can be routed from the single drive mechanism on the drive end of the primary tube 26 through the opposite end of the primary tube 26, to the head block, if included, and to the loft blocks 34 in the extension tube. In this manner, the lift assembly system 10 can include various lengths of the compression tube 26 and various numbers of the loft blocks 34 for routing a corresponding number of the cables 38 to the article 42 to be moved. Alternatively, compression tubes 26 and/or extensions can be manufactured in customized lengths.

Figure 10:
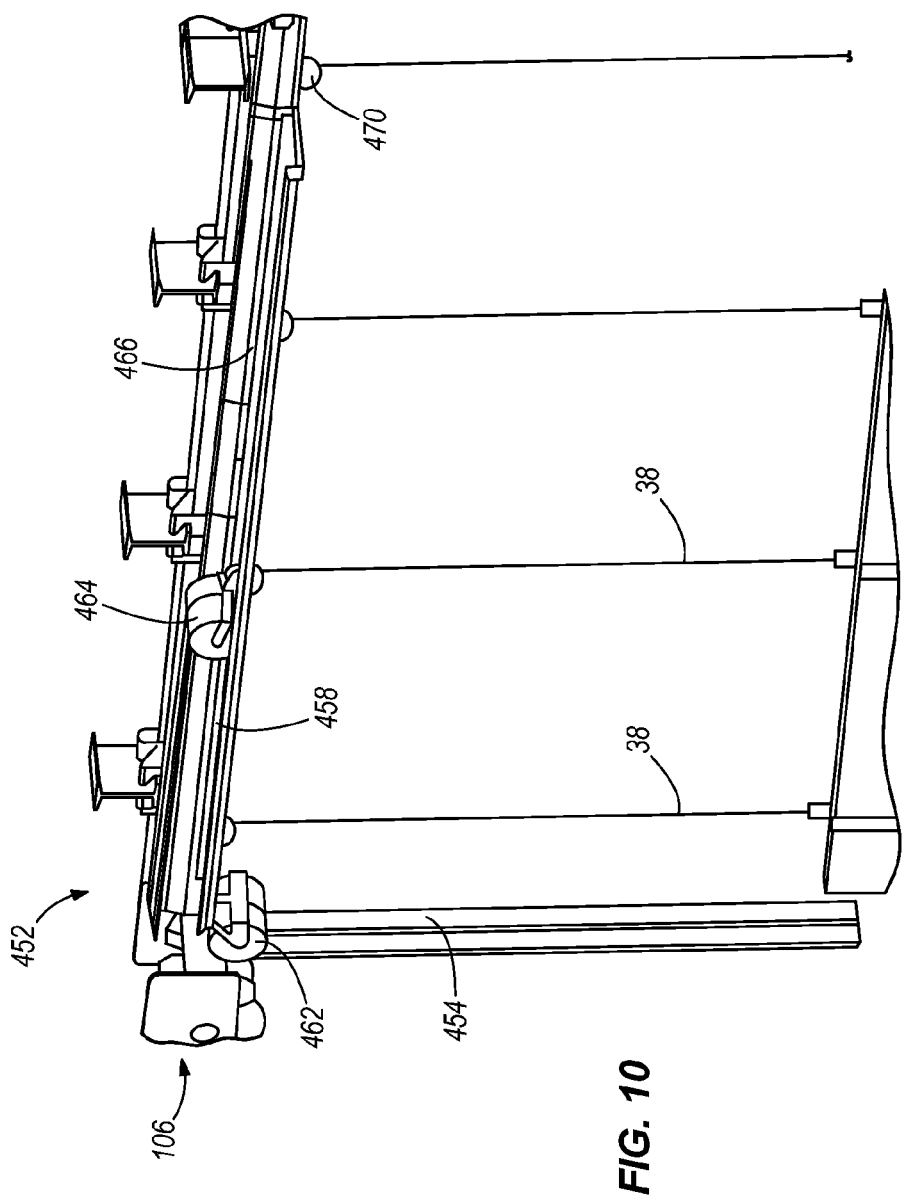
FIG. 10 is a perspective view of a cable management system, showing a tray attached to a compression tube and first and second rollers for guiding an electrical wire containment cable into and out of the tray, in an embodiment of the present invention.

In embodiments of the compression tube 26 having an extension tube coupled to a primary tube 26, each of the tubes 26 can be spliced together with a compression tube splicing plate. As shown in FIG. 10, the compression tube 26 can include a set of upper and lower grooves extending outwardly from the side of the tube 26. An extension tube can also include the set of upper and lower extending outwardly grooves. The compression tube splicing plate can comprise a plate of rigid material, such as steel having a size and shape to fit between the upper and lower grooves and to overlap a joint between the two abutting ends of the tubes 26. The compression tube splicing plate can also include a fastening member, such as a piece of steel approximately one to two inches in width, and configured to fit on the outside of the splicing plate and securely between the upper and lower grooves. The fastening member can further include a tightening mechanism, such as a screw through a threaded bore in the fastening member. The tightening mechanism can be tightening to exert pressure against the compression tube splicing plate so as to lock the fastening member between the upper and lower grooves and against the compression tube splicing plate. In this way, the compression tube splicing plate can securely lock the abutting ends of the tubes 26 together and provide a smooth transition between the two tube lengths. Such a compression tube splicing plate can enhance the ability of a cable 38 management trolley and/or loft blocks 34 to move smoothly across the joint between the two tubes 26. Such a smooth transition can decrease noise of components moving from one tube 26 section to another tube 26 section, and can decrease wear and tear on those interfacing components.

In alternative embodiments, the lift assembly system 10 can comprise the power head 106, the loft blocks 34, and the cables 38. In such an embodiment, the lift assembly system 10 can operate without the compression tube 26. In such a configuration, the loft blocks 34 can be individually securely connected to an overhead structure, for example, utilizing a clamping mechanism similar to the connecting mechanism 74 as described herein and further described in co-owned U.S. patent application Ser. No. 12/268,097. In embodiments of the lift assembly system 10 that do not utilize the compression tube 26, loft blocks 34 similar to those described herein, and further described in co-owned U.S. patent application Ser. No. 12/268,097, can be utilized. Alternatively, loft blocks 34 having a different design may be utilized.

The power head 106 can be removably attached to an overhead support structure such as an overhead steel I-beam. In some embodiments, the power head 106 can be removably attached to the overhead support structure with a power head beam clamp (not shown). The connecting mechanism 74, or power head beam clamp, can comprise a rectangular-shaped frame of rigid material such as steel. The top of the connecting mechanism 74 can be configured similarly to the beam clamp tube receiver as described herein and further described in co-owned U.S. patent application Ser. No. 12/268,097. Each of four clamps in the connecting mechanism 74 can be adjusted to varying distances separating each of two pairs of the connecting mechanisms 74 so as to accommodate attachment to varying widths of the overhead support structure. Once the connecting mechanism 74 is in a desired position about the overhead support structure, each of the pairs of connecting mechanisms 74 can be tightened toward each other and securably onto the overhead support structure. The connecting mechanism 74 can further include a tab of biased material such as steel extending downward from the bottom of the connecting mechanism 74 near each corner of the connecting mechanism 74. Each of the four tabs 114 can be press fit into a matingly positioned receiving slot on the top of the power head 106. Accordingly, once the connecting mechanism 74 is secured about the overhead support structure, the slots in the top of the power head 106 can be press fit about the four downwardly extending tabs 114 to secure the power head 106 to the connecting mechanism 74 and thus to the overhead support structure.

In another aspect of the present invention, some embodiments of the lift assembly system 10 may include a braking mechanism 118. The braking mechanism 118 can be, for example, a torque-sensing braking system (e.g., a load-side brake).

As described herein, the lift assembly drive mechanism, or power head 106, can include the motor 58. In some embodiments, the power head 106 can further include the gear box 62 attached to the motor 58. The drive shaft 66 can extend outwardly from the gear box 62 and/or motor 58. The drum 14 can be fixedly attached about the end of the drive shaft 66 extending from the gear box 62 and/or motor 58 such that when the drive shaft 66 rotates, the drum 14 can be rotated in the same direction as the drive shaft 66. The drive shaft 66 and drum 14 can be rotated in opposite directions, for example, forward and backward.

The drum 14 can have a particular shape capable of accommodating winding and unwinding of the cables 38 about the external surface of the drum 14. In some embodiments of the lift assembly system 10, the drum 14 can comprise a funnel shape, as shown in FIGS. 2 and 3. In some embodiments, at least a portion of the funnel-shaped, or frusto-conical shaped, drum 14 can have a progressively increasing diameter.

The drum 14 can have various diameters and widths from the most narrow apex 119 of the drum 14 to the widest part, or base 120, of the drum 14. For example, a drum 14 suitable for accommodating five cables 38, each cable 38 about ⅛ inch in diameter, can be about four inches wide. In an embodiment, the drum 14 may have eight channels 50 and eight cables 38, each cable 38 about 3/16 inch in diameter and having a length sufficient to accommodate fifty to one hundred feet or more of travel. Such a drum 14 may be approximately six inches wide and have a progressively increasing diameter from about four inches to about thirteen inches. The drum 14 may have other larger diameters as needed.

In certain embodiments, the drum 14 can include a portion extending from the apex 119 a predetermined distance toward, for example, the motor 58 (as shown in FIG. 2), having the same diameter before the drum 14 begins to gradually increase in diameter. The same, or constant, diameter drum 14 portion can include grooves, or channels 50, in its external surface in which cables 38 can be routed.

The drum 14 can be rotated in one direction so that cables 38 unwind, or pay out, from the external surface of the drum 14 and rotated in the opposite direction so that the cables 38 are wound about the drum 14. When the drum 14 is rotated so as to wind cables 38 about the drum 14, a first cable 38 can be wound in a first channel 50 adjacent the point of the drum 14 that begins to gradually increase in diameter. As shown in FIG. 3, the first cable 38 can be wound about the drum 14 such that the first loop, or coil, of the first cable 38 is wound about the drum 14 in the first channel 50 about the same diameter portion 14a of the drum 14. The first cable 38 can then be wound about the drum 14 in an angled channel 50 along the external surface of the increasing diameter portion 14b of the drum 14. As the first cable 38 is further wound about the drum 14, the next, or second, coil of the first cable 38 is adjacent the first coil and located about the drum 14 at a point having a slightly increased diameter than the constant diameter portion 14a of the drum 14. Each subsequent coil of the first cable 38 can be wound adjacent the preceding coil about gradually increasing diameters of the drum 14. When the first cable 38 is completely wound about the drum 14, substantially the entire external surface of the drum 14 can be covered with adjacent coils of the first cable 38. Such a drum 14 having a gradually increasing diameter can be referred to as a "progressive" drum 14, as the cables 38 can be wound about a progressively larger diameter of the drum 14.

The drum 14 can include a second channel 122 adjacent to the first channel 50 on the opposite side of the first channel 50 from the increasing diameter portion 14b of the drum 14. As the drum 14 is rotated so as to wind the cables 38 about the drum 14, a second cable 126 can be wound in the second channel 122 and about the coils of the first cable 38. The first coil of the second cable 126 can be wound in the second channel 122 about the constant (smaller) diameter portion of the drum 14. The second coil of the second cable 126 can then be wound about the same diameter portion 14a of the drum 14 in a notch between the first coil of the second cable 126 and the first coil of the first cable 38. The third coil of the second cable 126 can then be wound about the drum 14 at a point having a slightly increased diameter between the first and second coils, respectively, of the first cable 38. Each subsequent coil of the second cable 126 can be wound adjacent the preceding coil and about gradually increasing diameters of the drum 14. In this manner, coils of the second cable 126 can be wound about the drum 14 into the notches between adjacent coils of the first cable 38 such that the second cable 126 "nests" within the coils of the first cable 38. When the second cable 126 is completely wound about the drum 14, all but the last few coils (for example, the last two coils) of the first cable 38 can be covered with adjacent coils of the second cable 126.

Each subsequent cable 38 adjacent a preceding cable 38 (which is more distal from the increasing diameter portion 14b of the drum 14) can be wound about the drum 14 in the same manner. That is, a subsequent cable 38 can be wound first about the same diameter portion 14a of the drum 14 in a channel 50 for that cable 38 and in notches between a coil of that cable 38 and a coil of the adjacent, already wound-up cable 38, and then about the drum 14 at points having gradually increasing diameters in notches between a coil of that cable 38 and a coil of the adjacent cable 38. Each subsequent cable 38 can thus be wound about the drum 14 into the notches of the adjacent, already wound-up cable 38 such that each subsequent cable 38 "nests" within the coils of the adjacent, already wound-up cable 38. Generally, each of the cables 38 can be wound about the drum 14 and unwound from the drum 14 substantially simultaneously.

In certain embodiments, the channels 50 in the same diameter portion 14a of the drum 14 may be spaced from each other, and/or the diameters of the cables 38 relative to those spacings may be such, so that more than one or two coils of a cable 38 may be wound about the same diameter portion 14a of the drum 14 before being wound about the increasing diameter portion 14b of the drum 14. For example, as shown in FIG. 3, the first three coils, respectively, of the second cable 126 can be wound about the same diameter portion 14a of the drum 14. The spacing between the first and second channels 50, 122, respectively, and the diameters of the cables 38 relative to that spacing can allow the first and second coils of the second cable 126 and the second and third coils, respectively, of the second cable 126 to "stack" adjacent to each other at substantially the angle of the increasing diameter portion 14b of the drum 14.

In some embodiments, the surface of the constant diameter portion 14a of the drum 14 can have an opening, or separation, (not shown) across the width of the constant diameter portion 14a through which the originating ends of the cables 38 can be routed. The drum 14 can include a termination pin (not shown) attached to the inside of the drum 14. Each of the cables 38 can be routed through the opening and securably terminated onto the termination pin. The cables 38 can be secured to the termination pin with a compression fitting, such as a NICO compression fitting, as described in co-owned U.S. patent application Ser. No. 12/268,097 with respect to termination of the cable 38 in the cable adjuster. In particular embodiments, the connection of the cable 38 to the termination pin can be rated at 100% of the breaking strength of the cable 38. That is, the cable 38 would break before releasing from the termination pin. The termination pin may be removably attached to the inside of the drum 14. For example, the termination pin may be screwed into the inside wall of the drum 14 such that the termination pin can be unscrewed and removed. Such a removable pin and attached cable 38 can provide the advantage of easy removal for changing out cables 38.

As shown in the embodiment in FIG. 2, the power head 106 may include two spaced-apart side plates 134. Each end of the drive shaft 66 can be rotatingly attached to one of the side plates 134. One or more support bars 138 can extend between the side plates 134. A support plate 142 can extend between the two side plates 134 a distance from the motor 58, gear box 62, drum 14, support bars 138, and other power head 106 components so as to at least partially enclose the power head 106 between the side plates 134 and support plate 142. The support bar(s) 138 and support plate 142 can provide structural support to the side plates 134. In this configuration, the side plates 134 can be attached to the compression tube 26 or other assembly of head block(s) and loft blocks 34 in the lift system 10.

Some embodiments of the lift system 10 can include a cable guide mechanism 146. The cable guide mechanism 146 can comprise a guide assembly 150 for guiding movement of the cables 38 from the drum 14 to loft blocks 34 as they are unwound from the drum 14 and from the loft blocks 34 to the drum 14 as they are wound about the drum 14. As shown in FIG. 2, the guide assembly 150 can include a guide block 154 having one guide hole 156 for each cable 38 to be wound and unwound from the drum 14. The guide assembly 150 system can further include a guide block travel support arm 158. In some embodiments, the support arm 158 can be fixed to the support plate 142. A portion of the support arm 158 can extend at the end of the support arm 158 substantially perpendicularly to the remainder of the support arm 158. The support arm 158 can include such an extension 160 on one or both ends of the support arm 158. A guide bar 162 can be fixed on one end to the support arm extension 160, and on its opposite end the guide bar 162 can be slidably attached to the guide block 154. The guide block 154 can be slidably attached about the guide bar 162 such that the guide block 154 can move parallel to the drive shaft 66. In another embodiment, the guide block 154 can include a roller (not shown) comprising the same number of roller channels as the channels 50 on the drum 14 and adapted so that one of each of the cables 38 can be guided about one of the roller channels to maintain the cables 38 in position between the drum 14 and the loft blocks 34.

The guide assembly 150 can further include a pulley 166 rotatingly attached to the adjacent side plate 134 or other structure a distance from the drum 14 and within the power head 106. The pulley 166 can be operably attached to the drive shaft 66 with a linking mechanism 168, for example, a belt or chain. In this manner, when the drive shaft 66 rotates in one direction, the pulley 166 rotates in the same direction as the drive shaft 66 and at a constant speed relative to the speed of drive shaft 66 rotation. A pulley shaft 170 can extend outward from the pulley 166. A threaded rod 174 can be operably connected to the pulley shaft 170, for example, with a rotating joint 178. The guide rod joint can be a "universal" type joint that allows the threaded rod 174 to be rotated at an angle relative to the longitudinal axis of the pulley shaft 170. The threaded rod 174 can be rotatingly attached on the end opposite the pulley 166 to the support arm extension 160. The guide block 154 can include a threaded slot 179 that can be matingly engaged with the threaded rod 174, for example, an ACME® rod.

In such a configuration, when the drive shaft 66 rotates in a direction so as to wind the cables 38 about the drum 14, the pulley 166 rotates in the same direction as the drive shaft 66 and drum 14. The rotating pulley 166 causes the threaded rod 174 to rotate in the same, winding direction as, and with a constant speed relative to, the drive shaft 66, thereby causing the guide block 154 to ride upward along the threaded rod 174 and the guide bar 162. In this way, the cables 38 being wound about the drum 14 can be guided from the loft blocks 34 through the guide holes in the guide block 154 along the width of the surface of the drum 14 and parallel to the drive shaft 66. Likewise, when the drive shaft 66 rotates in the opposite direction so as to unwind the cables 38 from the drum 14, the pulley 166 rotates in the same direction as, and with a constant speed relative to, the drive shaft 66 and drum 14. The rotating pulley 166 causes the threaded rod 174 to rotate in the same, unwind direction as the drive shaft 66, thereby causing the guide block 154 to ride downward along the threaded rod 174 and the guide bar 162. In this way, the cables 38 being unwound from the drum 14 can be guided to the loft blocks 34 through the guide holes in the guide block 154 along substantially the same decreasing angle as the angle at which the cables 38 are paid out along the surface of the drum 14. As a result, the guide assembly 150 can help maintain the cables 38 at the same angle (the "fleet" angle) along the route of the cables 38 to and from the loft blocks 34 as the angle at which the cables 38 leave the surface of the drum 14 during unwinding and return to the drum 14 surface during winding.

Maintaining cable 38 fleet angles in this manner can provide the benefit of preventing the cables 38 from unnecessarily rubbing against each other, thereby increasing efficiency of movement, decreasing "wear and tear" on the cables 38 and other lift system components, and decreasing noise. The fleet angle of cables 38 from conventional drums 14, for example, a "yo-yo" type drum 14 on which cables 38 stack vertically, must be maintained within a narrow fleet angle tolerance, such as one and one-half degrees, in order to prevent the cables 38 from rubbing the sides of the drum 14 and/or from falling off the lock block. In embodiments of the present invention, maintaining such a precise fleet angle may not be as critical, since the cables 38 can be wound up in a more horizontal and angled fashion. In some embodiments, the fleet angle can operate smoothly and effectively within a range of plus or minus one and one-half degrees variation as the cables 38 travel between the drum 14 and the loft blocks 34.

Certain embodiments of the lift assembly system 10 comprising the hybrid progressive drum 14 may operate effectively without the guide assembly 150. However, in embodiments comprising such a guide assembly 150, or system, additional safety may be provided by helping maintain the cables 38 in position during winding and unwinding operations.

Some embodiments of the present invention can include a method for raising and lowering the article 42. Embodiments of components of the lift assembly system 10 described herein may be utilized in such a method.

Braking Mechanism

Some embodiments of a braking mechanism 118 can be configured to help regulate movement of the drive shaft 66, drum 14, and cables 38, and thereby movement of an article 42 or load attached to the cables 38. Such a braking mechanism 118 can be controllable by mechanical and/or electronic means.

Figure 7:
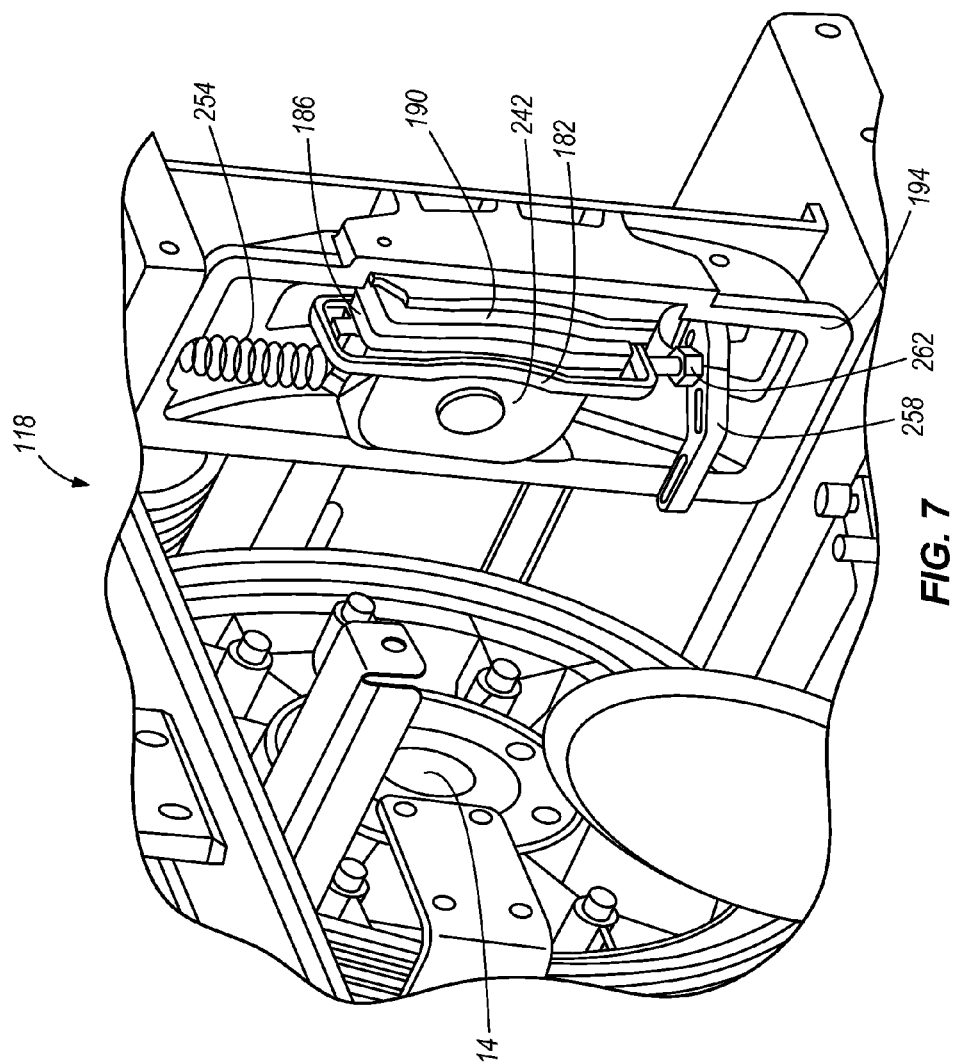
FIG. 7 is a view of a braking mechanism 118 having the brake pad housing partially removed to show the brake shoe and brake pads inside the brake pad housing in an embodiment of the present invention.
Figure 8:
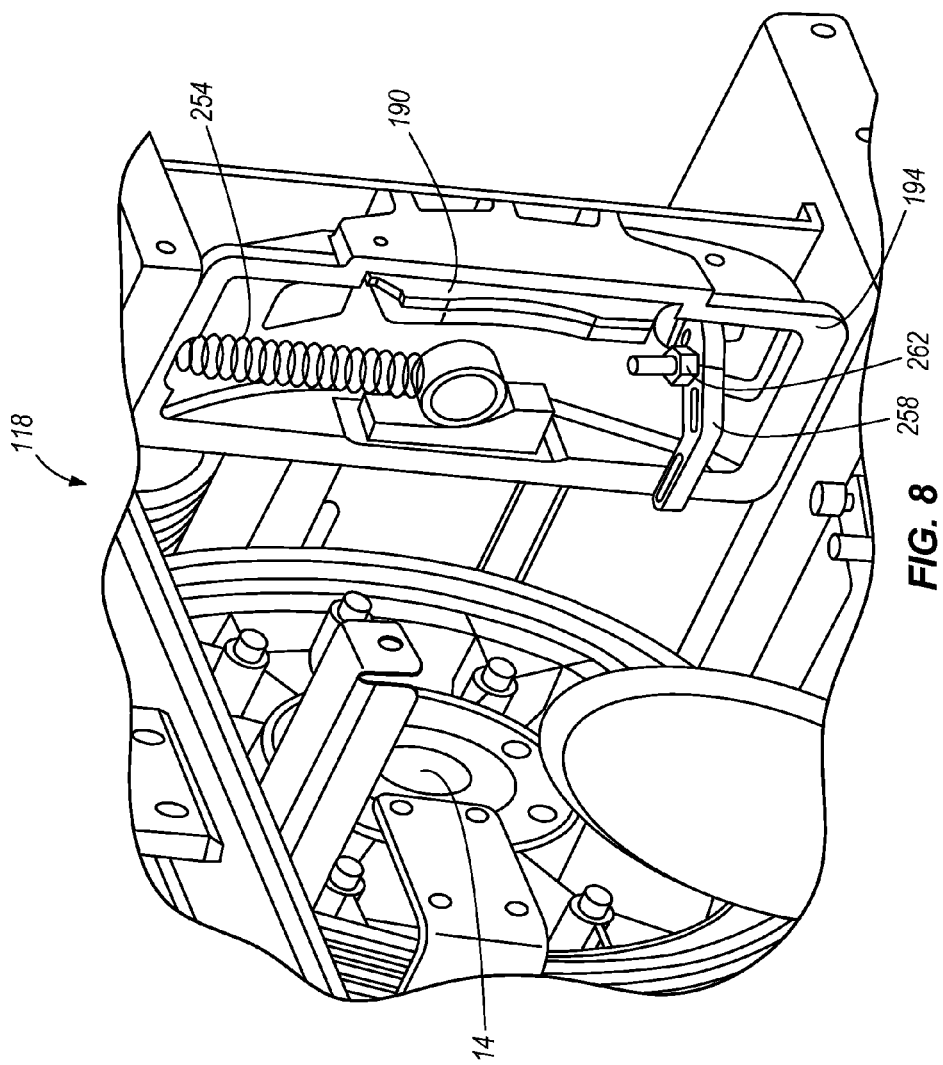
FIG. 8 is a view of the braking mechanism 118 shown in FIG. 7, having the brake shoe removed to show the ramp arm.

As shown in FIGS. 7 and 8, the braking mechanism 118 can include a brake shoe 182 having an actuator brake pad 186 attached to the brake shoe 182 and moveable toward and away from a fixed brake pad 190 attached to a brake pad housing 194, or caliper. A rotary disc brake 198 (see FIG. 2) fixed to the drive shaft 66 can be disposed to rotate between the actuator brake pad 186 and the fixed brake pad 190. In certain embodiments, the brake disc rotor 198 can be connected to the drive shaft 66 in such a manner that the brake disc rotor 198 can slightly "float" laterally along the drive shaft 66. The brake shoe 182 can be adapted to move up along an angled ramp arm 202, which causes the brake shoe 182 to move away from the fixed brake pad 190, and to move down along the ramp arm 202, which causes the brake shoe 182 to move toward the fixed brake pad 190. When an article 42, or other load, is being raised in the lift system 10, the rotary brake disc 198, as shown in FIGS. 17-21, moves in the counterclockwise direction. When the article 42 is being raised, the brake mechanism 118 is turned off, or deactuated, and the brake shoe 182 tends to move upward along the ramp arm 202 and away from the brake rotor 198.

Figure 17:
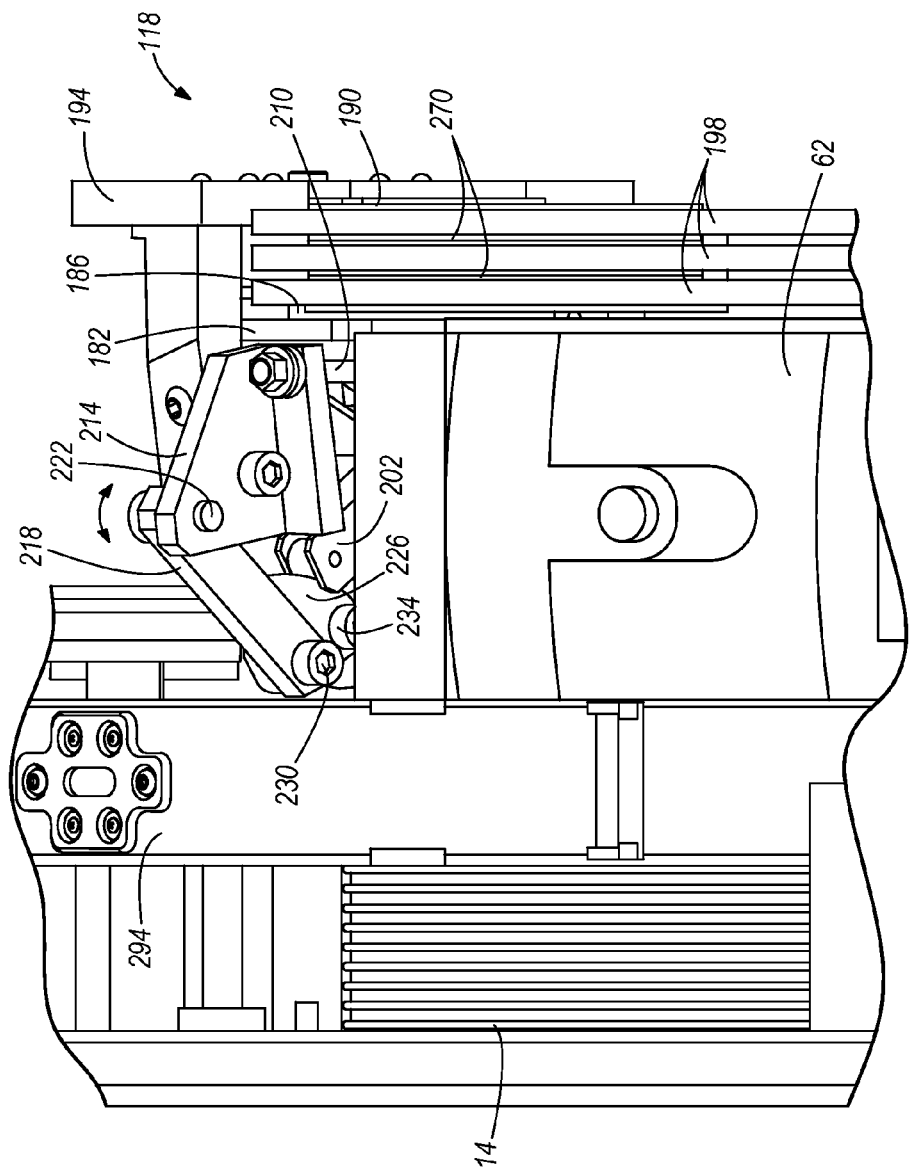
FIG. 17 is a top perspective view of a braking mechanism 118 having three brake disc rotors in another embodiment of the present invention.
Figure 18:
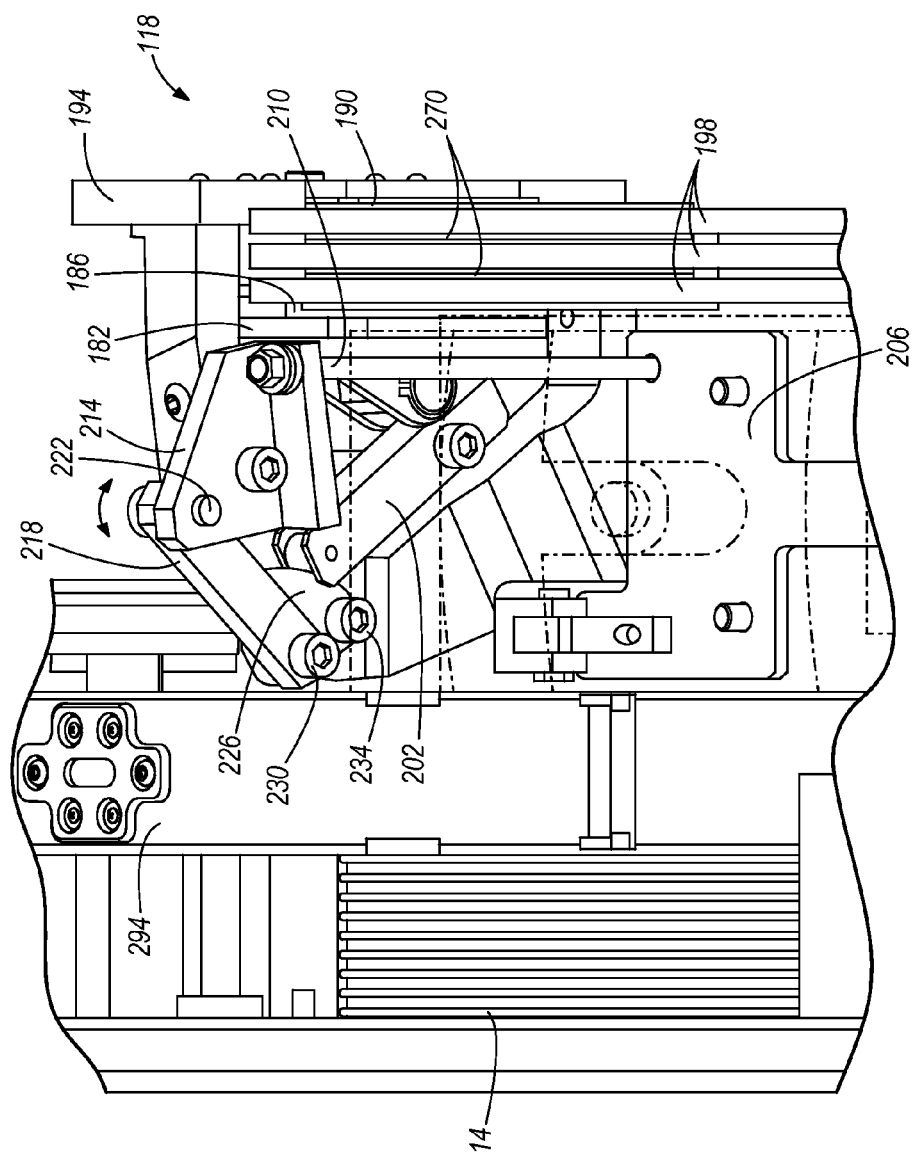
FIG. 18 is a view of the braking mechanism 118 shown in FIG. 17, in which the gear box cover is transparent to shown components of the braking mechanism 118 inside the gear box.

As shown in FIGS. 17-18, a gear box 62 associated with the motor 58 can be adjacent the brake pad housing 194. The bottom of the gear box 62 can include a plate 206 that moves upward and downward along with upward and downward movement of the motor 58. When power is applied to the motor 58 through controls of the lift assembly system 10, the drive shaft 66 and drum 14 can be rotated to either raise or lower the cables 38 and attached load, such as the batten 46.

In some embodiments, the motor 58 can be pivotable about the drive shaft 66 to a limited degree, for example, about five degrees. Further downward movement of the motor 58 is restricted after this limited rotation by the bottom plate, or floor, of the power head housing. The initial rotational force of the powered motor 58 in the direction of cable 38 movement can cause an equal and opposite rotational force on the motor 58 itself, causing the motor 58 to pivot slightly in the opposite direction on the drive shaft 66. Once the motor 58 rotates such a limited amount in the opposite direction on the drive shaft 66, the motor 58 becomes stabilized in a fixed position and the motor 58 and drive shaft 66 can continue to rotate in the direction of cable 38 movement.

Figure 19:
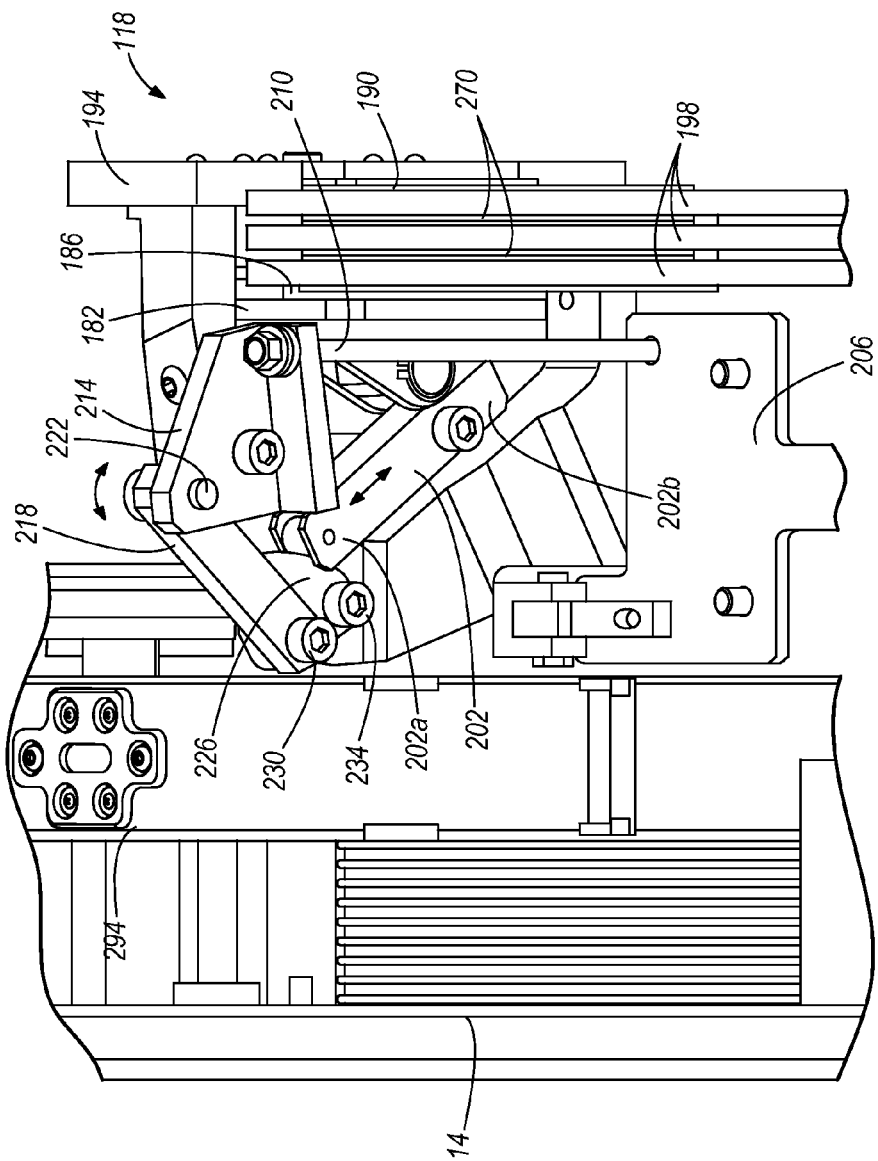
FIG. 19 is a view of the braking mechanism 118 shown in FIG. 18, in which the gear box and much of the gear components in the gear box are removed to show components of the braking mechanism 118.
Figure 20:
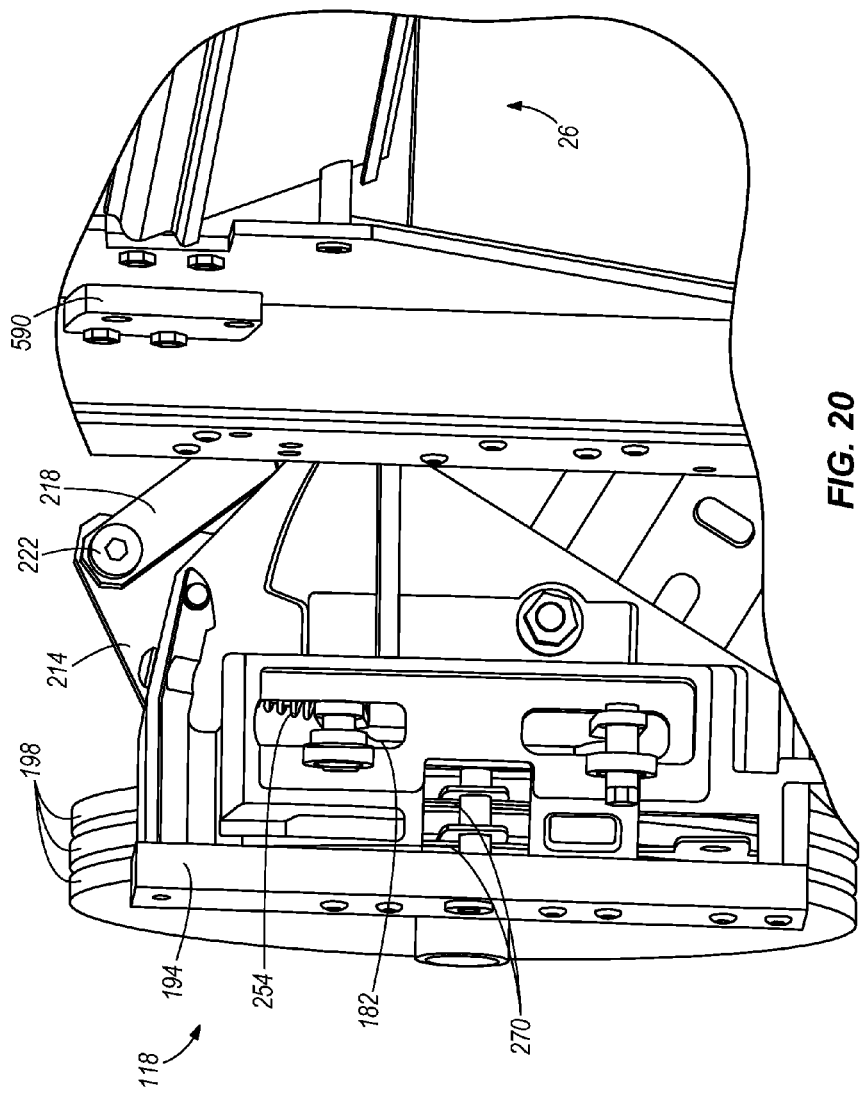
FIG. 20 is a view of the braking mechanism 118 shown in FIGS. 17-19 from the opposite side of the power head 106 in FIGS. 17-19.
Figure 21:
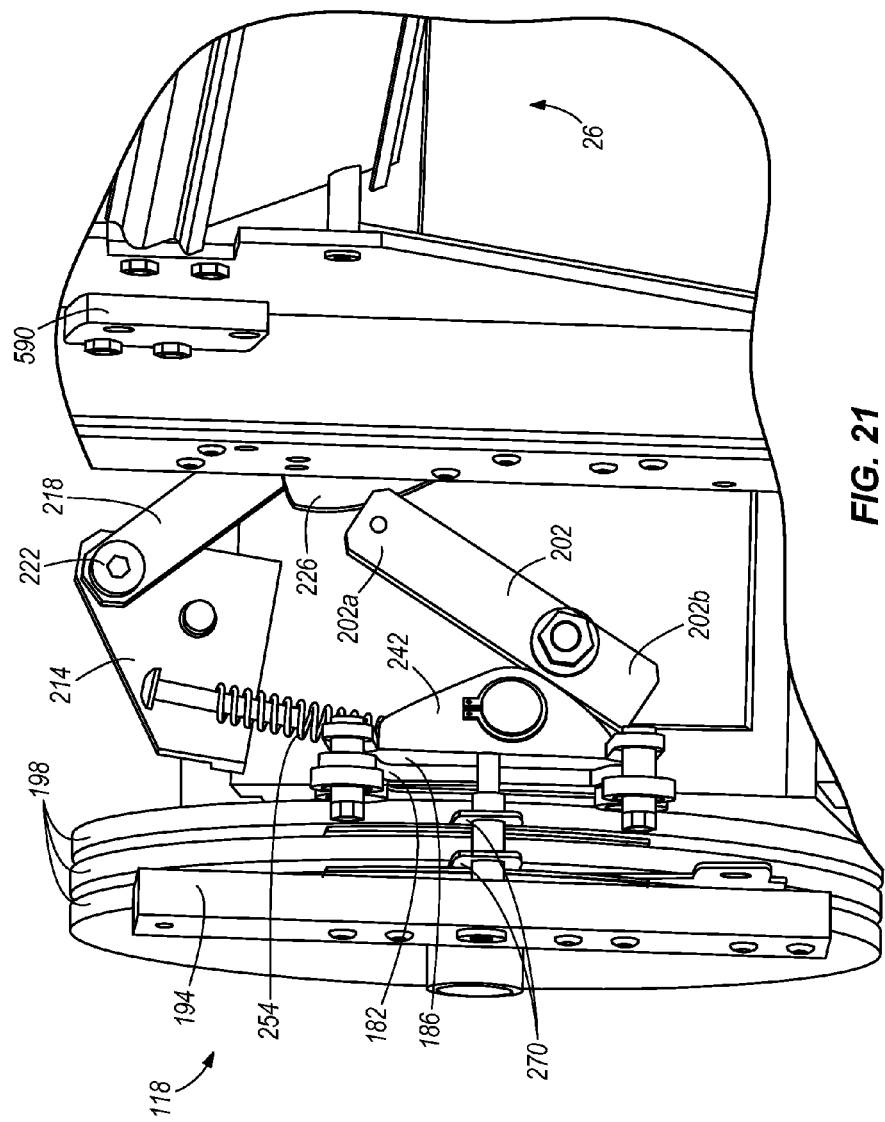
FIG. 21 is a view of the braking mechanism 118 in FIG. 20, with the power head 106 housing partially removed to shown the braking mechanism 118 components inside.

A vertically oriented linkage rod 210 can extend upward from the gear box 62 bottom plate 206 and connect on the end of the linkage rod 210 opposite the gear box 62 bottom plate 206 to a first brake actuator linkage 214. The first brake actuator linkage 214 can be pivotably connected to a second brake actuator linkage 218 about a first pivot pin 222 extending through both the first and second brake actuator linkages 214, 218. The second brake actuator linkage 218 can be disposed in a direction from the first brake actuator linkage 214 opposite the brake shoe 182 and can be pivotably connected to a partially rounded cam 226 about a second pivot pin 230 extending through both the second brake actuator linkage 218 and the cam 226. The cam 226 can be pivotably connected to the brake pad housing 194 about a third pivot pin 234 extending through both the cam 226 and the brake pad housing 194. The cam 226 is partially rotatable in a semicircular arc about the third pivot pin 234 such that the cam 226 can move toward and into contact with an upper portion 202a of the ramp arm 202 and away from and out of contact with the upper portion 202a of the ramp arm 202. A lower portion 202b of the ramp arm 202 can be pivotably connected to the stationary structure to which the cam 226 is pivotably connected. A rigid structure can extend from the brake shoe 182 into contact with the ramp arm 202. The rigid structure comprises a brake shoe ramp arm interface 242. As shown in FIGS. 18-19 and 21, the brake shoe ramp arm interface 242 can comprise two spaced apart plates extending from the brake shoe 182 between which a roller is rotatably mounted. The roller can have rotating contact with the ramp arm 202.

In the event that the load attached to the cables 38 moves downward in a non-powered, or "free-fall," manner, gravitational force on the load causes the motor 58 to pivot downward about the drive shaft 66 and the gear box bottom plate 206 to move downward to a corresponding degree. Downward movement of the gear box bottom plate 206 causes the linkage rod 210 to move the first brake actuator linkage 214 downward and pivot about the first pivot pin 222, which in turn causes the second brake actuator linkage 218 to pivot about the second pivot pin 230 connected to the cam 226. This action causes the cam 226 to pivot about the third pivot pin 234 and toward the upper portion 202a of the ramp arm 202, which causes the ramp arm 202 to move in a more vertical direction. As the ramp arm 202 moves in a more vertical direction, the brake shoe ramp arm interface 242 is moved downward along the ramp arm 202, thereby moving the brake shoe 182 and actuator brake pad 186 toward and into frictional engagement with the brake rotor 198 and the brake rotor 198 toward and into frictional engagement with the fixed brake pad 190. In this way, the compressive force on the brake disc rotor 198 by the actuator and fixed brake pads 186, 190 causes rotation of the brake disc rotor 198 to be slowed and/or stopped. Accordingly, downward movement of the cables 38 and attached load can be slowed and/or stopped.

As the load is being lowered, the brake disc rotor(s) 198 rotate in a clockwise direction. As this rotation begins, the back of the motor 58 moves slightly downward causing the gear box bottom plate 206 to move upward. This upward movement of the gear box bottom plate 206 causes the actuator linkages 214, 218 and cam 226 to cause the ramp arm 202 to become more horizontal. Horizontal movement of the ramp arm 202 moves the brake shoe ramp arm interface 242, brake shoe 182, and actuator brake pad 186 laterally away from the brake disc rotor(s) 198. The clockwise rotation of the brake disc rotor(s) 198 pulls the actuator brake pad 186 laterally toward the brake disc rotor(s) 198 and into the "wedge" created by the angle of the more horizontal ramp arm 202 against the brake shoe ramp arm interface 242. However, the more horizontal and shallow ramp arm 202 angle does not provide the necessary compressive force, or squeeze, to force downward movement of the load to be stopped.

When the load attached to the cables 38 is being raised, the motor 58 pivots about the drive shaft 66 such that the back of the motor 58 moves slightly upward, and the gear box bottom plate 206 moves correspondingly downward. Downward movement of the gear box bottom plate 206 causes the linkage rod 210 to move the first brake actuator linkage 214 downward and pivot about the first pivot pin 222, which in turn causes the second brake actuator linkage 218 to pivot about the second pivot pin 230 connected to the cam 226. This action causes the cam 226 to pivot about the third pivot pin 234 and toward the upper portion 202a of the ramp arm 202, which causes the ramp arm 202 to move in a more vertical direction. As the ramp arm 202 moves in a more vertical direction, due to friction generated at the interface of the rotor(s) and brake pads, the brake shoe ramp arm interface 242 moves upward along the ramp arm 202, thereby moving the brake shoe 182 and actuator brake pad 186 away from and out of frictional engagement with the brake rotor 198 and the brake rotor 198 away from and out of frictional engagement with the fixed brake pad 190. In this way, the ramp arm 202 becomes more vertical, thus creating a potential compressive force on the rotor(s) and brake pads, and actuating the braking mechanism 118. The compressive force on the brake disc rotor 198 by the actuator and fixed brake pads 186, 190 is sufficiently released so that the brake rotor 198 can move freely under the power of the motor 58 without having to drive through the brake mechanism 118 as in conventional braking mechanisms.

As the load is being raised, the brake disc rotor(s) 198 rotate in a counterclockwise direction. As this rotation begins, the back of the motor 58 moves slightly upward causing the gear box bottom plate 206 to move downward. This downward movement of the gear box bottom plate 206 causes the actuator linkages 214, 218 and cam 226 to cause the ramp arm 202 to become more vertical. Vertical movement of the ramp arm 202 compresses the brake shoe ramp arm interface 242, thereby providing compression, or squeeze force, on the brake pads and brake disc rotor(s) 198. However, friction from the counterclockwise rotation of the brake disc rotor(s) 198 against the brake pads causes the actuator brake pad 186 to move laterally away from the brake disc rotor(s) 198 and out of the "wedge" created by the angle of the more vertical ramp arm 202 against the brake shoe ramp arm interface 242. As a result, the load can be raised without the motor 58 having to drive through the compressive force of the braking mechanism 118. As a consequence of these opposing forces, upward and downward pivoting movements of the motor 58, and the rotation of the brake disc rotor(s) 198, the braking mechanism 118 is always "on," unless the lift assembly system controls cause the powering of the movements of the motor 58, gear box 62, and linkages be off, or deactuated. That is, the default, or "home," position of the motor 58 is such that it is always on, unless actively turned off.

In alternative embodiments, the braking mechanism 118 can comprise a different configuration of linkages and pivot points that provide a means for moving the ramp arm 202 into a more horizontal or vertical position so as to move the brake shoe 182 and actuator brake pad 186 toward and away from the brake rotor 198 and fixed brake pad 190.

In alternative embodiments, the braking mechanism 118 can include a spring 254 connected between the top of the brake shoe 182 and the top of the brake pad housing 194, as shown in FIGS. 7-9, 20, and 21. In this configuration, the spring 254 can provide a bias against the brake shoe 182. Since the spring 254 is biased against the brake shoe 182, the spring 254 provides a "pre-load" force on the brake shoe 182. In this manner, if power of the motor 58 is lost and the cables 38 and attached article 42 began to free fall, the spring 254 can push the brake shoe 182 to compress the actuator brake pad 186 toward the fixed brake pad 190 and exert friction against the brake disc rotor 198 between the brake pads, thereby slowing and/or stopping fall of the article 42. Such a "pre-load" push provided by the spring 254 may provide the additional friction on the brake disc rotor 198 to cause movement of the article 42 to be completely stopped, rather than only slowing, in the event of a loss of motor 58 power.

The braking mechanism 118 can include a brake release arm 258, as shown in FIGS. 7 and 8. The brake release arm 258 can be pivotable about a pivot 262. The pivoting end of the brake release arm 258 can extend outward from the brake shoe 182 so that a plate (not shown) on the motor 58 can push downward on the arm 258 when the motor 58 tilts slightly downward with the drive shaft 66 after the motor 58 stops rotating but before the gravitational force pulling the article 42 downward causes the drive shaft 66 to begin rotating again. That is, the rotational force of the motor 58/drive shaft 66 cause the motor 58 to move slightly downward and actuate the brake release arm 258. The downward push of the motor 58 plate 206 onto the brake release arm 258 causes the brake shoe 182 to move slightly upward along the ramp and thus slightly away from the brake disc rotor 198 and brake pads 186, 190, thereby relieving a small amount of pressure by the actuator brake pad 186 onto the brake disc rotor 198. This slight relief of pressure decreases the suddenness, or "shock" to the system, of having to release the brake mechanism 118 quickly. In this way, the release of the brake disc rotor 198 (and the motor 58) from a slowed or stopped position can be accomplished in a smoother, quieter, and safer manner.

In certain embodiments, the brake disc rotor 198 can comprise a surface material having a high friction coefficient. For example, the brake disc surface material can comprise steel or cast iron such that the friction between the brake pads and the disc is enhanced. The frictional interface between the brake disc rotor 198 and the brake pads 186, 190 can help the brake disc rotor 198 (and the motor 58) slow to a stop, rather than stopping undesirably abruptly. This can allow the braking mechanism 118 to be released more gradually and the article 42 being lowered by the lift system 10 to be stopped more gradually in the last few feet of descent in the event that the brake mechanism 118 is activated.

In embodiments of the braking mechanism 118, the brake disc rotors 198 and brake pads 186, 190 can move laterally, or "float," into and out of frictional engagement with each other along the "x" axis. In some embodiments, the brake disc rotors 198 and brake pads 186, 190 can also move slightly out of parallel with the surfaces of the adjacent pads 186, 190 or rotors 198 along the "z" axis. Such "play" in the rotors 198 and brake pads 186, 190 along two axes allows the rotors 198 and brake pads 186, 190 to engage a maximized amount of the adjacent surfaces. In this way, a fuller use of the brake pad surfaces can be achieved to provide greater braking force, as well as to allow the brake pads 186, 190 to wear more evenly and last longer.

Figure 9:
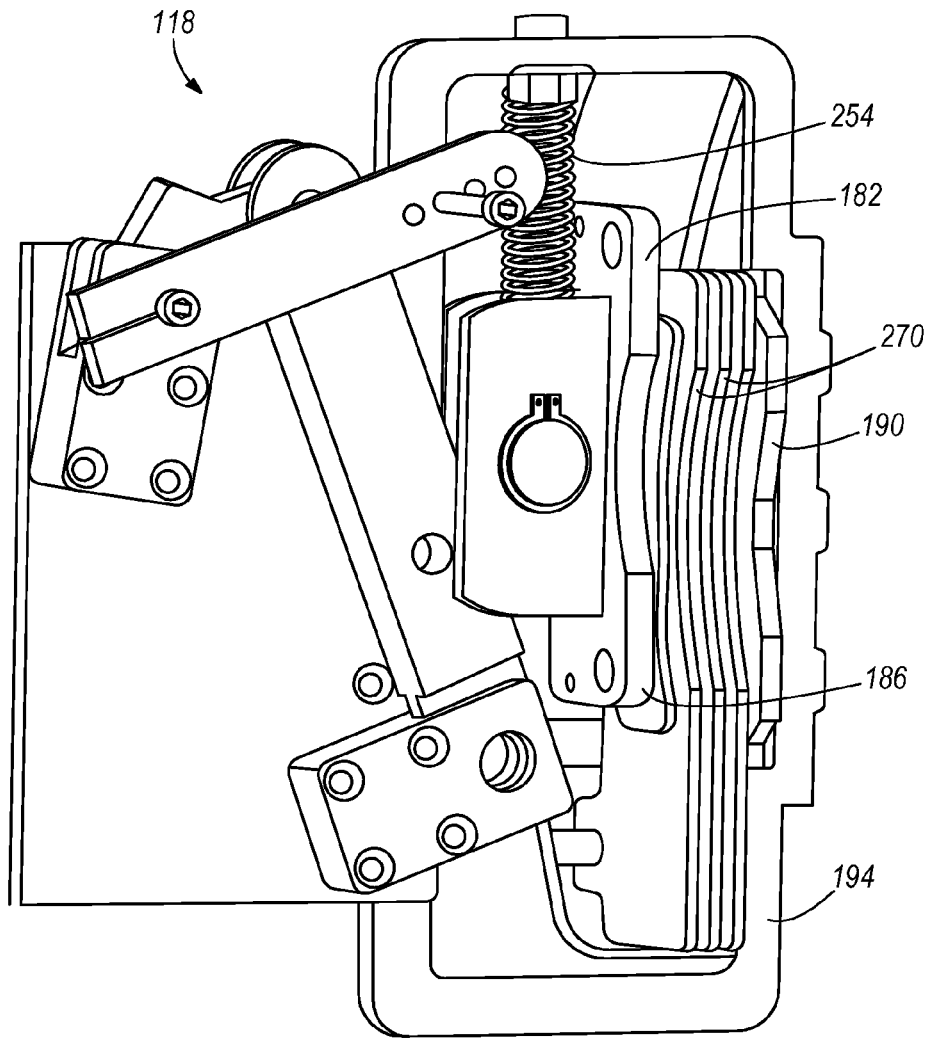
FIG. 9 is a view of a brake pad housing comprising a plurality of moveable brake pads in an embodiment of the present invention.

In other embodiments of the brake mechanism 118, the brake disc rotor 198 can comprise three or more rotors situated in the brake pad housing 194 between the brake shoe 182 and actuator brake pad 186, two spaced apart and moveable inter-rotor brake pads, and the fixed brake pad 190. For example, FIG. 9 shows two moveable inter-rotor brake pads 186, 190 disposed between the brake shoe 182 and actuator brake pad 186 and the fixed brake pad 190. As shown in FIGS. 17-21, a first brake disc rotor 198 can be situated between the actuator brake pad 186 and a first inter-rotor brake pad 270 adjacent the actuator brake pad 186, a second brake disc rotor 198 can be situated between the first inter-rotor brake pad 270 and a second inter-rotor brake pad 270 adjacent the first inter-rotor brake pad 270, and a third brake disc rotor 198 can be situated between the second inter-rotor brake pad 270 and the fixed brake pad 190. Each of the inter-rotor brake pads 270 can be double-sided brake pads that is, having a braking surface on each side of the brake pads 270. Accordingly, the actuator brake pad 186, two inter-rotor brake pads 270, and fixed brake pad 190 provide six braking surfaces, one braking surface for each side of the three brake disc rotors 198.

The actuator brake pad 186 and inter-rotor brake pads 270 can be moveable, or "float," out and back in a lateral direction relative to the brake disc rotors 198 such that each of the brake pads 186, 190, 270 can move into and out of frictional engagement with the surfaces comprising the diameters of the brake disc rotors 198. When the brake mechanism 118 is actuated, the ramp arm 202 moves in a more vertical direction and the brake shoe ramp arm interface 242 moves downward along the ramp arm 202. As a result, the brake shoe 182 presses the attached actuator brake pad 186, the brake disc rotors 198, the inter-rotor brake pads 270, and the fixed brake pad 190 against each other. In this manner, the actuator brake pad 186, the brake disc rotors 198, the inter-rotor brake pads 270, and the fixed brake pad 190 can move into sufficient frictional engagement with each other so as to slow and/or stop movement of the motor 58 and article 42 being moved. When the brake mechanism 118 is de-actuated, the ramp arm 202 moves in a more horizontal direction and the brake shoe ramp arm interface 242 moves upward along the ramp arm 202. As a result, the brake shoe 182 releases pressure of the attached actuator brake pad 186, the brake disc rotors 198, the inter-rotor brake pads 270, and the fixed brake pad 190 against each other. In this manner, the actuator brake pad 186, the brake disc rotors 198, the inter-rotor brake pads 270, and the fixed brake pad 190 can move out of frictional engagement with each other so as to allow movement of the motor 58 and article 42 being moved.

Embodiments of the lift system 10 brake mechanism 118 having such a plurality of brake disc rotors 198 and inter-rotor brake pads 270 can provide more contact surfaces for creating an increased amount of friction and efficiently slowing and/or stopping movement of the motor 58 and article 42. Some embodiments of the brake mechanism 118 can comprise any number of brake disc rotors 198 situated between the brake shoe 182 actuator brake pad 186, a number of moveable inter-rotor brake pads 270 that is one less than the number of brake disc rotors 198, and the fixed brake pad 190. The greater the number of brake disc rotors 198 and inter-rotor brake pads 270, the greater the total amount of contact surface available for creating friction and thereby slowing and/or stopping movement of the motor 58 and article 42. A larger number of brake disc rotors 198 and inter-rotor brake pads 270 can require a smaller amount of force to create sufficient friction to slow and/or stop movement of the motor 58 and article 42. For example, as compared to one brake disc rotor 198 disposed between the actuator brake pad 186 and the fixed brake pad 190, as shown in FIGS. 7 and 8, the brake mechanism 118 comprising the actuator brake pad 186, four rotors 198 and three inter-rotor brake pads 270, and the fixed brake pad 190 (comprising eight contact surfaces) can require about one fourth the amount of force to create sufficient friction to slow and/or stop movement of the motor 58 and article 42. Thus, embodiments of the lift system 10 brake mechanism 118 comprising a plurality of brake disc rotors 198 and inter-rotor brake pads 270 can be beneficially useful for braking a heavier article 42 and load. In embodiments in which the weight of the load to be moved is larger, the brake mechanism 118 can include more brake disc rotors 198 and moveable inter-rotor brake pads 270. In addition, as a result of the decreased compressive force required to slow and/or stop movement of the motor 58 and article 42, release of the braking force in a brake mechanism 118 having a larger number of rotors and moveable brake pads can be accomplished in a smoother and quieter manner. In embodiments in which the weight of the load to be moved is smaller, the brake mechanism 118 can include less brake disc rotors and moveable inter-rotor brake pads.

Such a floating movement of the brake disc rotors and inter-rotor brake pads toward and away from each other can preserve the surface material on the brake pads. The brake pad surface material can comprise a high coefficient of friction. Accordingly, in some embodiments, the brake pad surface material can be thinner than in brake mechanisms in which a brake disc rotor and brake pad do not "float" relative to each other.

Cable Keeper/Slack Line Detector

Figure 22:
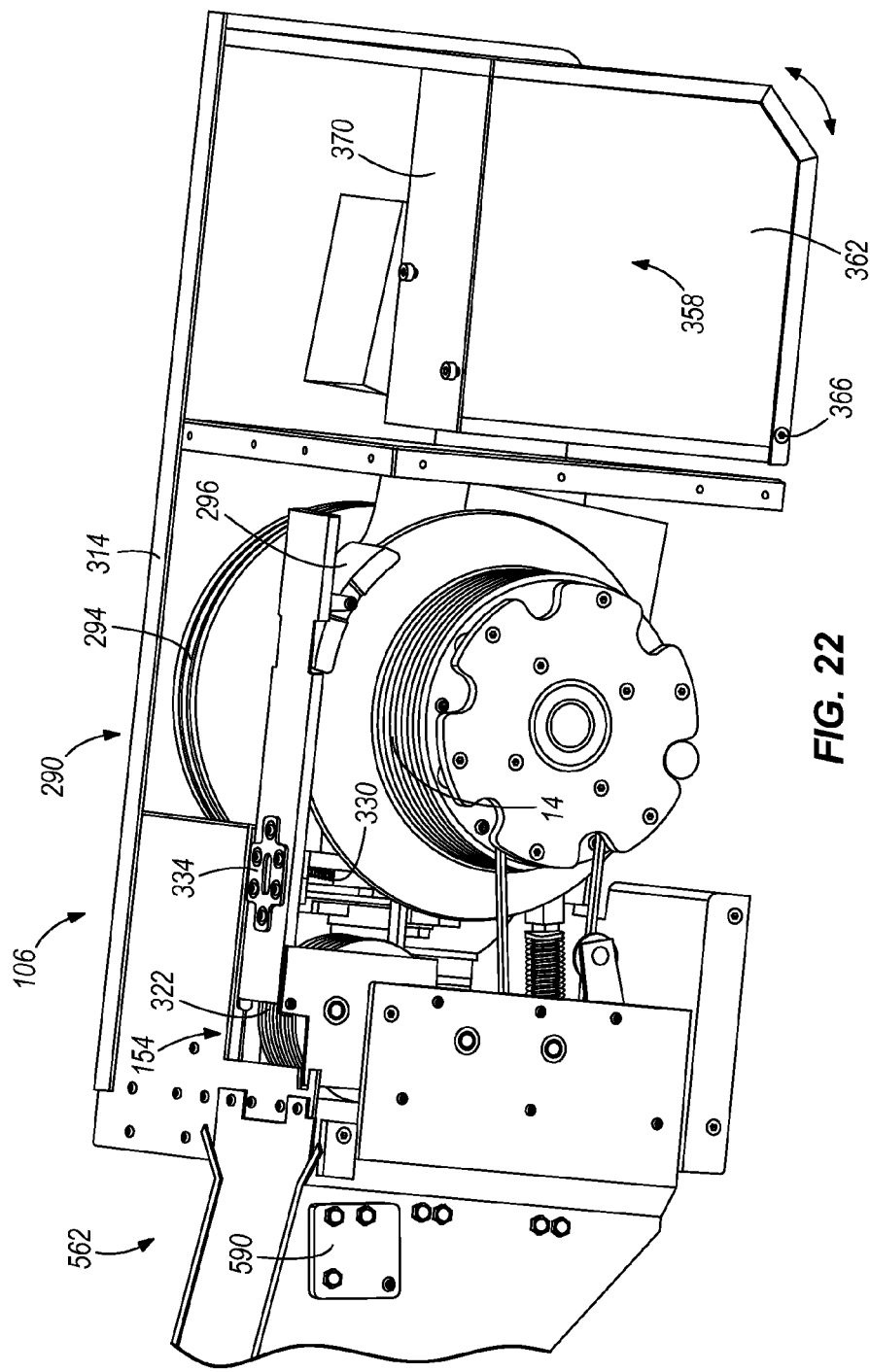
FIG. 22 is a side perspective view of the power head 106 with the foreground side plate of the power head 106 removed to show the drum and cable keeper assembly in an embodiment of the present invention.
Figure 23:
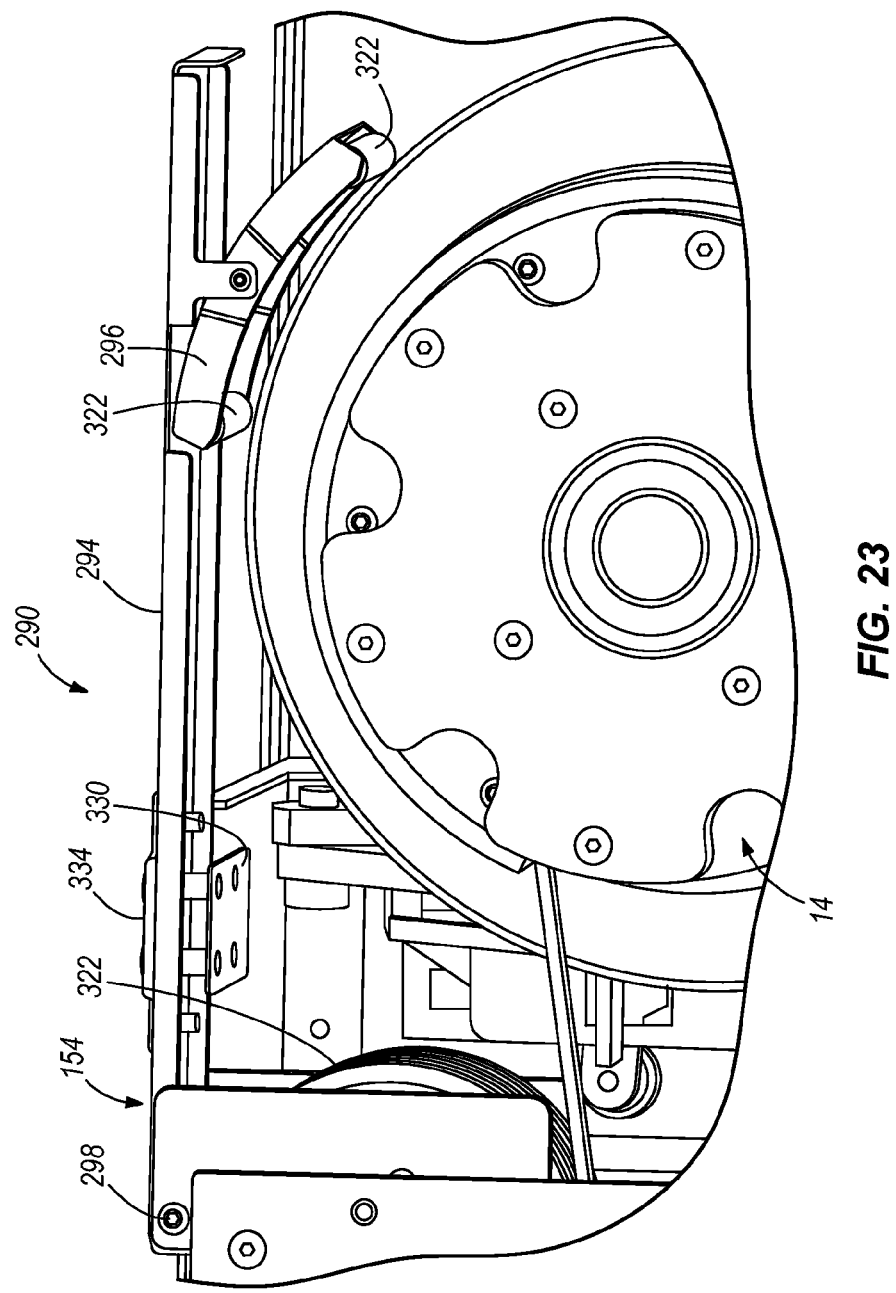
FIG. 23 is another side perspective view of the drum and cable keeper assembly inside the power head 106 shown in FIG. 22.
Figure 27:
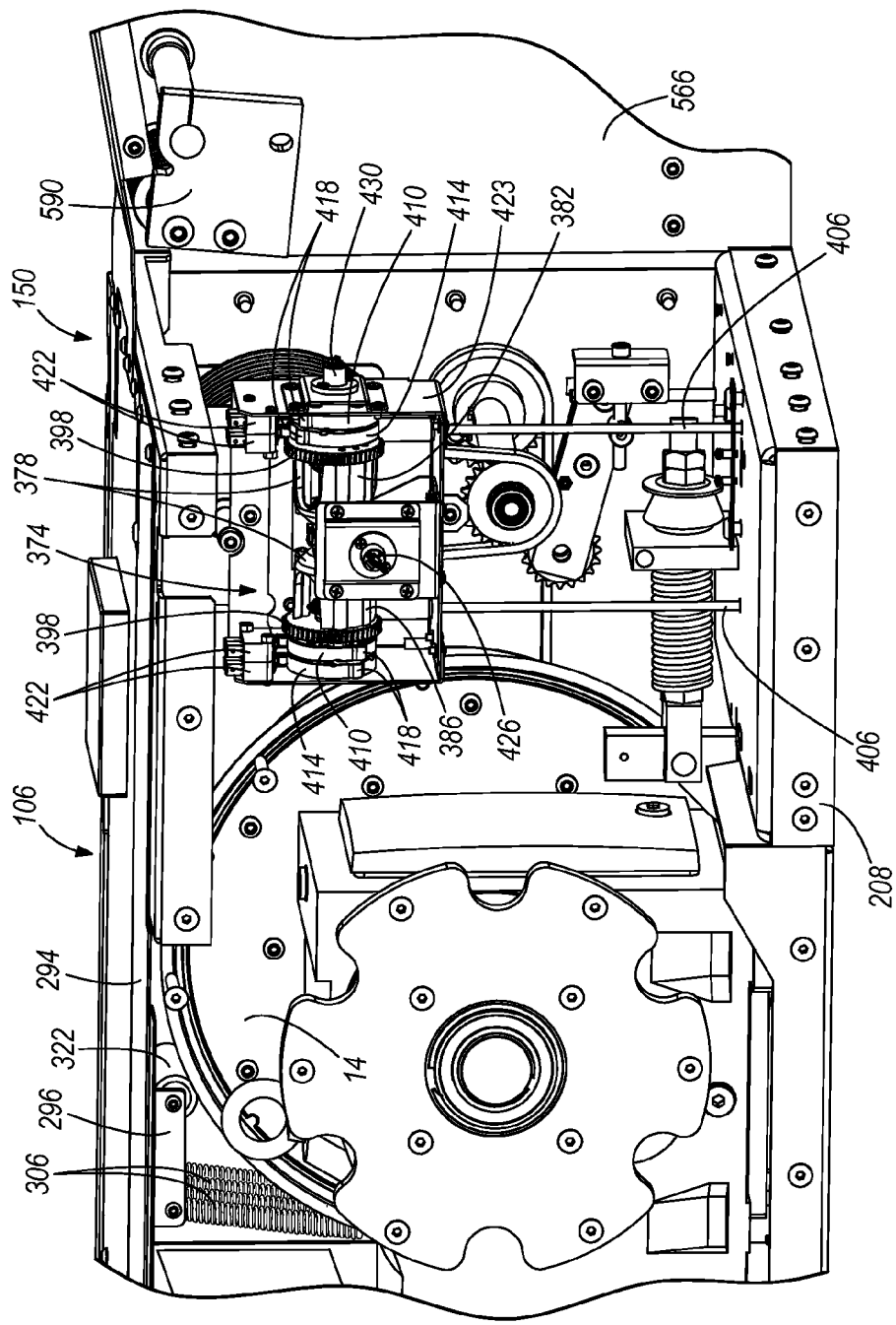
FIG. 27 is side perspective view of the portion of a power head 106 and the limit switch assembly shown in FIGS. 24-26.

As the cables 38 wind on the drum 14, they can wrap about a horizontal plane for a distance before moving up a slope. In some embodiments of the lift assembly system 10, a cable keeper assembly 290 can rest on the surface of the wound cables 38. The cable keeper assembly 290 can comprise a cable keeper arm 294 that extends over the surface of the drum 14 to contact the cables 38. As shown in FIGS. 22 and 23, the cable keeper arm 294 can comprise an elongate piece of material, such as steel. A first end of the cable keeper arm 294 can be attached to the guide block 154 that travels laterally at the same rate as the cables 38 wind onto and unwind from the drum 14. The cable keeper arm 294 can be pivotably attached to the guide block 154 with a pivot screw 298, and/or by a spring (not shown). The first end of the cable keeper arm 294 can include a pair of opposing, downwardly extending flanges, each flange having a hole through which the pivot screw 298 can be inserted. As shown in FIG. 27, one or more extension springs 306 can be attached at one end to the second end of the cable keeper arm 294. The extension spring(s) 306 can be attached on the opposite end to the bottom of the power head 106. The pivotable attachment of the cable keeper arm 294 to the guide block 154 and biasing of the cable keeper arm 294 against the cables 38 about the drum 14 by the extension spring(s) 306 can maintain enough pressure by the cable keeper arm 294 on the cables 38 to keep the cables 38 positioned about the drum 14, but without so much force as to affect the natural winding and unwinding of the cables 38 onto and from the drum 14. In this way, the cable keeper arm 294 can function to keep the cables 38 from unraveling from the drum 14, or moving out of position about the drum 14 relative to other cables 38, in the event that one or more of the cables 38 lose tension and become slack.

In certain embodiments, the cable keeper 290 can move along with the guide assembly 150 across the constant diameter portion 14a of the drum 14. In certain embodiments, the cable keeper 290 can move along with the guide assembly 150 across both the constant diameter portion 14a and the increasing diameter portion 14b of the drum 14. In certain embodiments, the guide block 154 can be connected to a threaded rod 174, which can be connected to the drive shaft 66, for example, with a chain and sprockets. The chain and sprockets can be geared so as to cause the guide block 154 move laterally at the same rate as the cables 38 wind laterally about the progressively sloped drum 14.

In some embodiments, the cable keeper arm 294 can include a cable contact member 296 attached to the second (non-pivoting) end of the cable keeper arm 294. The cable contact member 296 can be configured to rest on the cables 38 on the drum 14 and keep the cables 38 in position on the drum 14 as the cables 38 are being wound onto and unwound from the drum 14. In some embodiments, the cable contact member 296 can have a width less than the width of the drum 14 and sufficient to contact a selected portion of the cables 38 as they are being wound and/or unwound. In such embodiments, the cable contact member 296 can move laterally across the width of the drum 14 along with the guide block 154. Alternatively, the cable contact member 296 can have a width that is the same or nearly the same as the width of the drum 14 and that does not move laterally with the guide block 154.

In a preferred embodiment, as shown in FIGS. 22 and 23, the cable contact member 296 can comprise opposing side plates secured together in spaced-apart relationship with a top plate, and a roller 322 disposed between the side plates on each end of the cable contact member 296. The cable contact member 296 can have a slightly curved configuration from end to end, as shown in FIGS. 22 and 23, so that the rollers 322 can matingly ride about the cables 38 being wound about and unwound from the circumference of the drum 14. The cable contact member 296 can be connected near the second (non-pivoting) end of the cable keeper arm 294 and at various locations on the cable contact member 296. In one embodiment, as shown in FIGS. 22 and 23, the cable contact member 296 can be connected to the cable keeper arm 294 at or near the center of the cable contact member 296. In certain embodiments, the cable contact member 296 can be pivotably connected to the cable keeper arm 294 such that as the cables 38 are wound about and unwound from the drum 14, the cable contact member 296 can pivotably ride along the movement of the cables 38 about the circumference of the drum 14.

Alternatively, as shown in FIG. 27, the cable contact member 296 can have a rectilinear configuration, and the cable contact member 296 can be connected on one end to the cable keeper arm 294 and have a single roller 322 on the opposite end of the member in contact with the cables 38 about the drum 14. The roller(s) 322 on the cable contact member 296 can comprise a polymeric material suitable for avoiding wear over time from contact with the cables 38 being wound and unwound.

Figure 6:
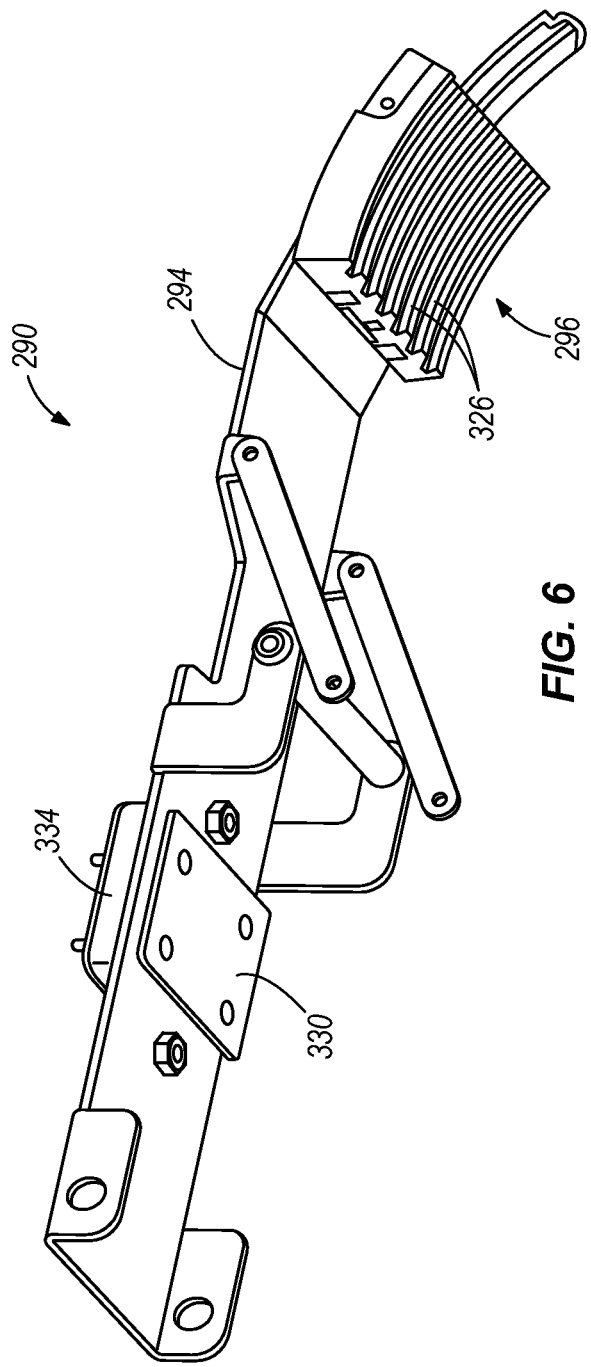
FIG. 6 is a view of a cable keeper arm having a set of grooved cable keeper pads disposed on one end of the arm in an embodiment of the present invention.

In other embodiments, as shown in FIG. 6, the cable contact member 296 can comprise a plurality of grooves 326 configured to rest on the cables 38 on the drum 14. Each groove 326 can rest on a single cable 38 on the drum 14 such that the cable 38 moves through the groove 326 in the cable contact member 296. The cable contact member 296 can include a groove 326 for each of the cables 38 being wound onto and unwound from the drum 14. The grooves 326 in the cable contact member 296 can comprise a polymeric material suitable for avoiding wear over time from contact with the cables 38 being wound and unwound.

In some embodiments, the cable keeper arm 294 can include a single cable contact member 296, as shown in FIG. 6. In alternative embodiments, the cable keeper arm 294 can include more than one cable contact member 296. For example, four cable contact members 296 can be disposed circumferentially about the outer surface of the drum 14. The plurality of cable contact members 296 can be slidably attached to an outer band extending in a circular fashion from the second (non-pivoting) end of the cable keeper arm 294. In such a configuration, one or more of the cable contact members 296 can slide along the outer band toward each other as the cables 38 are unwound from the drum 14 and away from each other as the cables 38 are wound about the drum 14. In this way, a larger surface area of the cables 38 about the drum 14 can be covered by the cable contact members 296. Thus, in the event a cable 38 loses tension and becomes slack, a larger length of the cable 38 can be in contact with the cable keeper 290 and thus better maintained about the drum 14, so as to prevent the cable 38 from releasing from its proper positioning on the drum 14.

As shown in the embodiment in FIG. 6, the cable keeper assembly 290 can further include a "ground out" bar 330 disposed on the underneath side of the cable keeper arm 294 adjacent the cables 38. The ground out bar 330 can be connected through the cable keeper arm 294 to an insulator plate, for example, a plastic insulator plate 334. The ground out bar 330 can be in the electrical circuit through which the motor 58 is powered. In the event a cable 38 loses tension and becomes slack, the slack cable 38 can move slightly away from the surface of the drum 14 and any wound cables 38 to make contact with the ground out bar 330. Upon such contact of the ground out bar 330 by a slack cable 38, the motor 58 power circuit can become grounded, thereby interrupting power to the motor 58 and stopping operation of the motor 58. In this way, movement of the cables 38 is stopped and positioning of the cables 38 about the drum 14 can be further maintained. Thus, stopping the motor 58 and movement of the article/load 42 attached to the cables 38 provides a safety mechanism for preventing uncontrolled and/or undesirable movement of the article/load 42.

Figure 5:
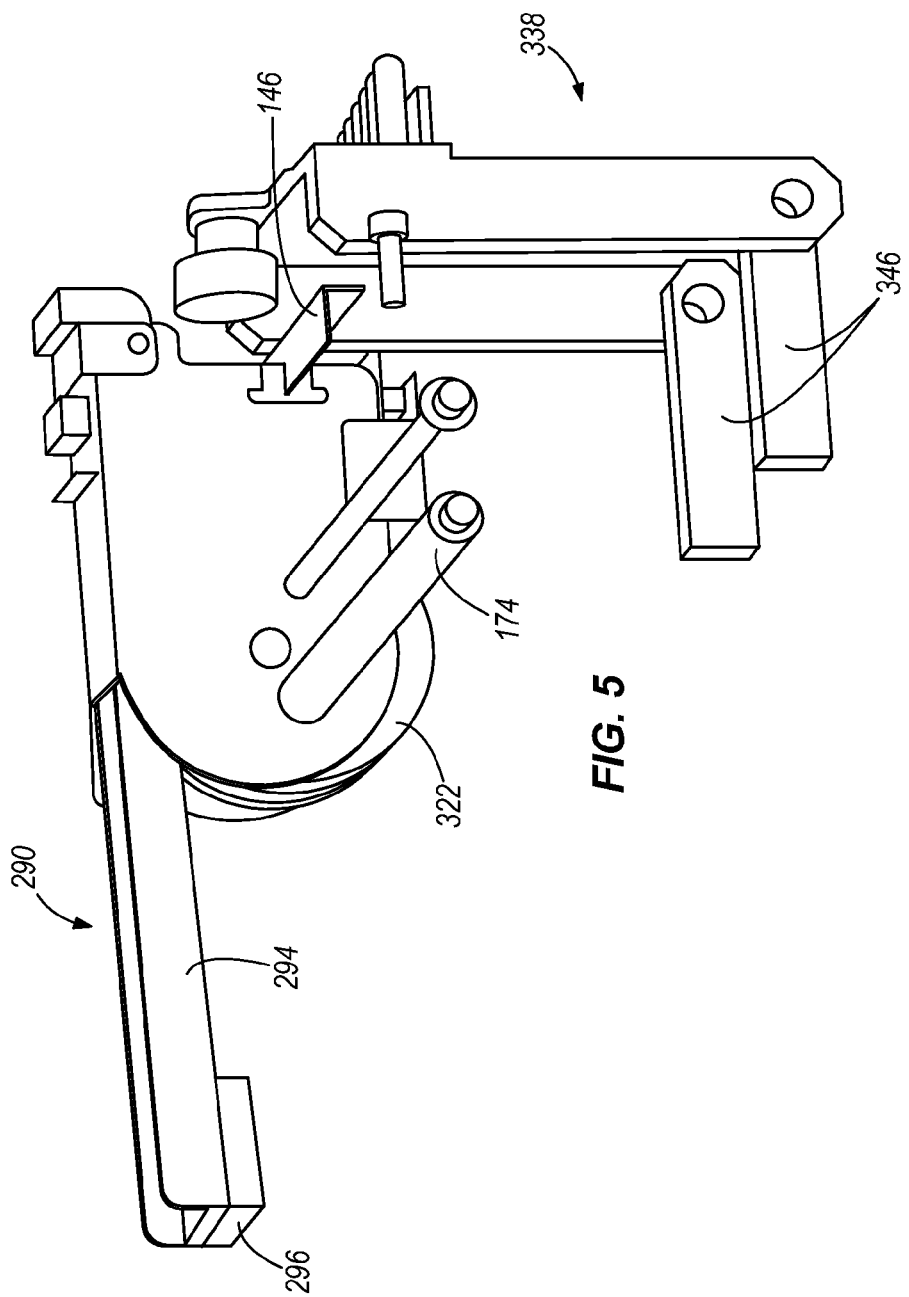
FIG. 5 is a view of a cable keeper assembly and a slack line detector in an embodiment of a lift assembly system of the present invention.

FIG. 5 is a view of the cable keeper 290, a slack line detector 338, and a dynamic load transducer in an embodiment of the present invention. As shown in FIG. 5, the slack line detector 338 can include sensors that may be used to monitor a slack line condition. A slack line condition can occur if one or more of the cables 38 lose tension. This could happen if the batten 46 is accidentally lowered onto an object on the stage floor. Each cable 38 may pass off the drum 14, through the guide block 154, under the slack line detector 338, and then out into the compression tube 26. The slack line detector 338 can include a slack line sensor arm, for example, a plastic slat 346, for each cable 38. The slat 346 may have an off-centered pivot point. An adjustable spring may hold one end of the slat 346 down. The other end of the slat 346 may be positioned next to a switch, so that if the end near the switch is raised, it will trip the switch, which can relay a message to the controls of the lift system 10 to stop movement of the batten 46 until the slack line problem is resolved. If one of the cables 38 becomes slack, the lack of tension may cause the cable 38 to try to rise out of the guide block 154. The cable 38 can then touch the slack line sensor arm, causing the slat 346 to pivot, thereby tripping the switch. In this manner, each cable 38 can have a dedicated sensor arm 346 that is pivotable for actuating a limit switch to manage a slack cable 38. In certain embodiments, the pivotable arms 346 can be positioned in locations other than near the drum 14.

Power Head Control Box

Some embodiments of the lift assembly system 10 can include an electronic control box 358 located within the power head 106. As shown in FIG. 22, the power head control box 358 can be situated at or near one side of the power head 106 for easy access to the lift system electronics. The power head control box 358 can include a cover 362 that is pivotable about a pivot pin 366 located at a lower corner of the control box 358. The control box cover 362 can be releasably secured, for example, with one or more fasteners such as screws, at the top of the cover 362 to an upper plate 370. The fasteners can be loosened to allow the control box cover 362 to pivot downward about the pivot pin 366 to expose the electronic components inside the box 358. Such a electronics control box 358 configuration that is incorporated inside the power head 106 provides the benefit of allowing the overall dimensions of the lift assembly system 10 to be smaller. In addition, in contrast to electronic controls being located remotely from the power head 106, the electronic control box 358 inside the power head 106 can facilitate servicing of the power head 106 and the power head electronics at the same time.

Limit Switch

As described herein with reference to FIG. 2, the guide assembly 150 can be operably connected to the drive shaft 66 by the threaded rod 174. The threaded rod 174, for example, an ACME® rod, can be matingly engaged with the guide block 154, or with a guide roller. In such a configuration, the threaded rod 174 can rotate in the same, winding direction as the drive shaft 66, thereby causing the guide block 154, or guide roller, to ride laterally in a first lateral direction along the threaded rod 174. In this way, the cables 38 being wound about the drum 14 can be guided from the loft blocks 34 along the width of the surface of the drum 14 and parallel to the drive shaft 66. Likewise, when the drive shaft 66 rotates in the opposite direction so as to unwind the cables 38 from the drum 14, the threaded rod 174 rotates in the same, unwind direction as the drive shaft 66, thereby causing the guide block 154, or guide roller 322, to ride in a second lateral direction opposite the first direction along the threaded rod 174. In this way, the cables 38 being unwound from the drum 14 can be guided from the loft blocks 34 along the width of the surface of the drum 14 and parallel to the drive shaft 66.

Some embodiments of the lift assembly system 10 can include a limit switch assembly 374 configured to monitor and limit downward movement of the cables 38 and attached article 42 or load. FIGS. 24-27 show one illustrative embodiment of such a limit switch assembly 374. The limit switch assembly 374 can be located within the power head 106 adjacent the guide assembly 150. The limit switch assembly 374 can include a coupler 378 operatively engaged with the guide assembly 150 threaded rod 174. The coupler 378 can comprise a first coupler portion 382 extending perpendicularly in one direction from the threaded rod 174 and a second coupler portion 386 extending perpendicularly in the opposite direction from the threaded rod 174. In some embodiments, the limit switch coupler 378 can have a slot mated with a slot in the threaded rod 174, and the mated slots can be operatively joined so as to rotate together. The limit switch assembly 374 can further include a gear sprocket 398 operatively attached to the end of each of the first and second coupler portions 382, 386. Each of the gears 398 can engage a worm gear attached to a limit switch cam adjustment rod 406 configured to allow adjustment of the limit switches 422, as described below.

A first cam 410 and an adjacent second cam 414 can be positioned on the side of each of the limit switch gears 398 opposite the coupler portions 382, 386. The cams 410, 414 can have a substantially circular shape. Each cam 410, 414 can have a tab 418 extending outwardly from the circumferential surface of the cam 410, 414. As the article 42 attached to the cables 38 is raised, the cams 410, 414 rotate in one direction. The cams 410, 414 can rotate slightly less than a full revolution, for example, about 355 degrees.

A limit switch 422 can be attached to the limit switch assembly housing 423 adjacent the circumferential surface of each cam 410, 414. For example, the limit switch 422 can be attached to the limit switch assembly housing 423 above the circumferential surface of each cam 410, 414, as shown in FIG. 27. In the embodiment shown in FIG. 27, the limit switch assembly 374 can include four cams 410, 414 and four limit switches 422. Each limit switch 422 can be positioned a distance from the circumferential surface of the adjacent cam 410, 414 such that when the cam 410, 414 is rotated by the threaded rod 174 and coupler 378, the tab 418 on the cam 410, 414 can trip a button, lever, or other contact on that switch 422. When the tab 418 on the cam 410, 414 trips its respective limit switch 422, a circuit in which that limit switch 422 is positioned is opened, and power to the motor 58 is stopped. In other embodiments, the limit switch 422 can be in an open position in the circuit, and when the cam 410, 414 trips the limit switch 422, the limit switch 422 can close the circuit so as to power stopping of load movement. As a result, movement of the cables 38 and attached load, such as the batten 46, is stopped. Thus, in such embodiments, the limit switch 422 can be physically connected to the lift assembly drive train through the motor 58, drive shaft 66, guide assembly 150 threaded rod 174 and coupler 378.

One set of the first and second cams 410, 414 on one side of the limit switch assembly 374—the set of upward limit cams 410, 414—operate to control an upward limit of load, or article 42, movement. When the desired, preset limit of load movement in the upward direction is reached, the first cam 410 in the set of upward limit cams 410, 414 can trip an upward load movement limit switch 422 and stop upward movement of the load. The second cam 414 in the set of upward limit cams 410, 414 acts as a safety, or "over travel," mechanism and can operate to control an "ultimate" limit of upward movement. The tab 418 on the second cam 414 can be offset slightly from the position of the tab 418 on the first cam 410 in the set of upward limit cams 410, 414. In this way, if for some reason the first cam 410 fails to trip an upward load movement limit switch 422, and the load continues to move upward, the second cam 414 will continue to rotate until the tab 418 on the second cam 414 reaches the trip mechanism for the ultimate upward load movement limit switch 422. The second cam 414 and ultimate upward load movement limit switch 422 can thus serve as a back-up, or "over travel," mechanism to provide ultimate control of upward load movement.

Likewise, another set of the first and second cams 410, 414 on the opposite side of the limit switch assembly 374—the set of downward limit cams 410, 414—operate to control a downward limit of load, or article 42, movement. When the desired, preset limit of load movement in the downward direction is reached, the first cam 410 in the set of downward limit cams 410, 414 can trip a downward load movement limit switch 422 and stop downward movement of the load. The second cam 414 in the set of downward limit cams 410, 414 act as a safety, or "over travel," mechanism and can operate to control an "ultimate" limit of downward movement. The tab 418 on the second cam 414 can be offset slightly from the position of the tab 418 on the first cam 410 in the set of downward limit cams 410, 414. In this way, if for some reason the first cam 410 fails to trip a downward load movement limit switch 422, and the load continues to move downward, the second cam 414 will continue to rotate until the tab 418 on the second cam 414 reaches the trip mechanism for the ultimate downward load movement limit switch 422. The second cam 414 and ultimate downward load movement limit switch 422 can thus serve as a back-up, or "over travel," mechanism to provide ultimate control of downward load movement.

In some embodiments, the distance between the tabs 418 adjacent an upper limit switch 422 and an ultimate limit switch 422 can be adjusted, depending on the accuracy of a particular motor 58 to stop movement of the load. For example, for a motor 58 that takes longer to stop movement of the load, the distance of the tabs 418 adjacent an upper limit switch 422 and an ultimate limit switch 422 can be increased to allow more time for the motor 58 to stop movement of the load before the ultimate limit switch 422 is tripped.

The limit switch assembly 374 can further include two encoders. A first encoder 426 can be attached to the end of the threaded rod 174 exterior to the limit switch 422 housing opposite the guide assembly 150. A second encoder 430 can be attached to the end of the one of the assemblies of coupler 378, gear 398, and pair of first and second cams 410, 414. The first and second encoders 426, 430 act together to monitor movement of the load and encode the positioning of the load to the lift assembly control system.

The first encoder 426 is attached to, and senses rotation of, the threaded rod 174. The first encoder 426 counts revolutions of the threaded rod 174, which can rotate, for example, about seven or eight revolutions during movement of the load over its entire length of travel. Accordingly, the first encoder 426 has a first sensitivity to movement of the load. The second encoder 430 is attached to, and senses rotation of, the cams 410, 414. The second encoder 430 counts revolutions of the cams 410, 414, which rotate slightly less than a full revolution, for example, about 355 degrees. Thus, the second encoder 430 has a second sensitivity to movement of the load that is greater than the first sensitivity of the first encoder 426. In other words, the second encoder 430 can be considered a "fine tune" sensor for monitoring movement of the load as compared to the sensitivity of monitoring by the first encoder 426 linked directly with the threaded rod 174 and drive train.

In the lift assembly control system 10, the length, or path, of travel of the load can be pre-set to a certain limit. The first and second encoders 426, 430 provide a physical count of the revolutions of the threaded rod 174 and of the cams 410, 414 and encode those counts to an electronic reader. The encoders can thus provide a read out of the position of the load along its length of travel in real time on a control panel. In this way, the threaded rod 174, cams 410, 414, and encoders 426, 430 acting together allow an operator of the lift assembly system 10 to know where the load is located along its pre-set length of travel at all times. Because the encoders 426, 430 are mechanical, even if the lift system 10 has a loss of power, the position of the load along its length of travel can be preserved and read from the control panel when power to the system is restored. Accordingly, the encoders 426, 430 are considered to be "absolute" encoders 426, 430.

In some embodiments of the limit switch assembly 374, a cam adjustment rod 406 can extend outward from each pair of adjacent first and second cams 410, 414. For example, as shown in FIGS. 24-27, each cam adjustment rod 406 can extend downward from the respective pair of first and second cams 410, 414 and through the bottom, or floor, of the power head housing 208. By moving the cams 410, 414 slightly toward the limit switches 422 and thus causing the cams 410, 414 to rotate less distance for the tabs 418 to trip the limit switches 422, the upper limit of travel of the article 42 attached to the cables 38 can be decreased. By moving the cams 410, 414 slightly away from the limit switches 422 and thus causing the cams 410, 414 to rotate farther for the tabs 418 to trip the limit switches 422, the upper limit of travel of the article 42 attached to the cables 38 can be increased. The adjustment rods 406 can be rotated in one direction to increase the upper limit of travel of the article 42 attached to the cables 38 and rotated in the opposite direction to decrease the upper limit of travel of the article 42 attached to the cables 38.

In particular embodiments, the power head housing 208 through which each cam adjustment rod 406 extends can include labeling and/or lights, such light emitting diodes (LEDs), indicating when the upper limits for movement of the article 42, such as the batten 46, are reset. For example, a first LED can illuminate when the first cam 410 is set at a desired position to reset the load movement "upper limit" on the upper limit switch 422; a second LED can illuminate when the second cam 414 is set at a desired position to reset the load movement "ultimate limit" on the ultimate limit switch 422; and a third LED can illuminate when the limits are reset for both the first cam 410 (upper limit) and the second cam 414 (ultimate limit). In certain embodiments, the limit reset indicator lights can be a different color for each of the adjustment rods 406 and pair of first and second cams 410, 414 and for limit resets for both adjustment rods 406 and both pair of first and second cams 410, 414. Such limit reset indicator lights can provide the advantage of an affirmative (visual) indicator of limit resets, in contrast to conventional limit reset mechanisms in which the person adjusting the load movement upper limits must listen (in a sometimes noisy environment) for an audible indicator of the switches 422 being reset.

Cable Management System

Some embodiments of the lift system 10 of the present invention can include a cable management system 452. Some embodiments of the cable management system 452 can include a system for controlling movement of electrical wires, and/or other cables 38, so as to avoid unnecessary pinching or binding of the wires and cables 38. The cable management system 452 can include a mechanism for stacking wires, for example, electrical wires from lights, as they are being raised and lowered. In some embodiments of the lift system 10, electrical wires and/or other types of wires can be contained in an outer sheath, which can be referred to as a wire containment cable 454, or wire cable 454. The wire containment cable 454 may be about four inches wide, for example. The wires at the end of the wire containment cable 454 proximal to the batten 46 or other load can be connected to an output object, for example, electrical outlets or lights, attached to the batten 46. The end of the wire cable 454 opposite the batten 46 can be connected to an input source, for example, a power source.

In some embodiments of the present invention, the cable management system 452 can include a housing, or tray 458, which may be attached to the compression tube 26. The tray 458 can have dimensions suitable for containing the wire cable 454. As shown in the embodiment in FIG. 10, the tray 458 can be attached to the exterior of one side of the compression tube 26. Alternatively, the tray 458 can be attached to the underneath side of the compression tube 26. As shown in the embodiments in FIGS. 11 and 12, the tray 458 can be attached to the top of the batten 46 or article 42 to be raised and lowered. The tray 458 can extend along the entire length of the tube 26, or along a portion of the tube 26, for example, the majority of the length of the tube 26. The cable management system 452 can include rollers about which the wire containment cable 454 can be guided into and positioned in the tray 458 and guided out of the tray 458. A first roller 462 can be stationarily attached to one end of the tray 458. In certain embodiments, the first roller 462 can be attached to the end of the tray 458 adjacent the power head 106 of the lift assembly 10. In certain embodiments, the first roller 462 can be geared to correspond with the gearing of the power head 106 motor 58 so that the first roller 462 rotates in the same direction and at the same speed as the drum 14 connected to the motor 58. A second roller 464 can be movably attached to the tray 458 such that the second roller 464 moves a predetermined distance along the length of the tray 458 as the batten 46 is raised and lowered.

Figure 4:
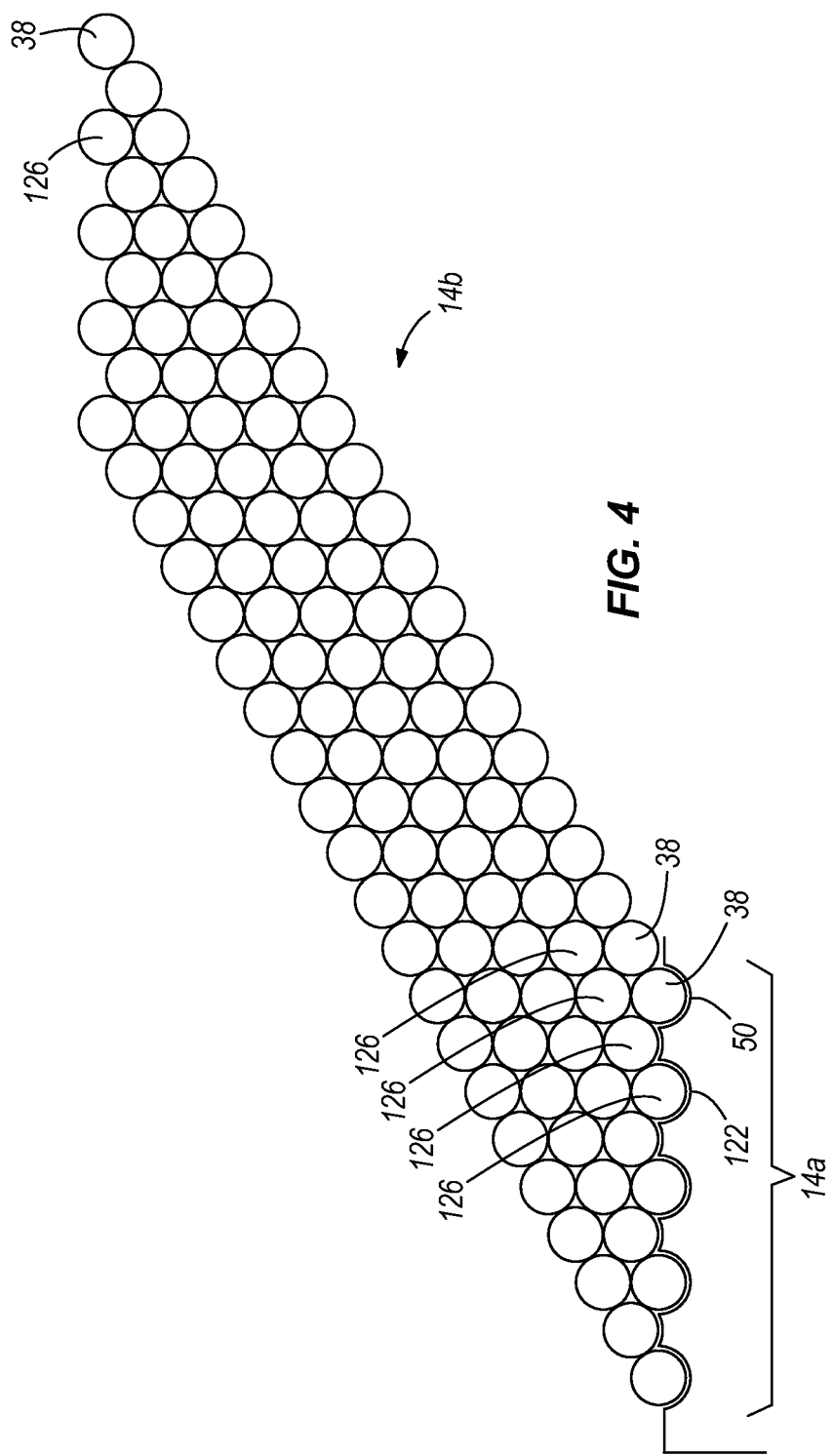
FIG. 4 is a diagrammatic, cross-sectional view of the drum in the lift assembly power head 106 shown in the embodiment in FIG. 2, showing cables wound about the same diameter portion 14a and the increasing diameter portion 14b of the drum in a nested fashion.

The wire containment cable 454 can be connected to one of the load lift cables 38, such as the cables 38 described herein with reference to FIGS. 2-4 that wind about and unwind from the drum 14 in the lift system power head 106. The lift cable 38 to which the wire containment cable 454 can be attached can be a wire cable lift cable 466. The wire cable lift cable 466 can be routed from the drum 14 to a wire cable lift cable loft block 470 near the end of the tube 26 opposite the power head 106, around the loft block 470, and back in the opposite direction toward the power head 106. The wire cable lift cable 466 can be attached at its distal end to the wire cable 454 and to the second roller 464. As a result, the wire containment cable 454 can move in the same direction (vertically) and at the same rate as the lift cables 38 and the load attached to the lift cable 38. As the lift cables 38 are wound onto the drum 14, the second roller 464 moves toward the wire cable loft block 470, and the wire cable lift cable 466 moves around the wire cable loft block 470 and is likewise wound onto the drum 14 the same amount and at the same rate as the lift cables 38 attached to the load, or article 42, are wound. As the lift cables 38 are unwound from the drum 14, the wire cable lift cable 466 is likewise unwound from the drum 14 and moves around the wire cable loft block 470, allowing the second roller 464 to move away from the wire cable loft block 470 and lower the wire cable 454 the same amount and at the same rate as the lift cables 38 attached to the load are lowered.

When the batten 46 is in a lowered position, the wire containment cable 454 can extend downward from the tray 458 around the first roller 462 to the batten 46 or load. As the load attached to the lift cables 38 is raised, the wire cable 454 can be routed from its substantially vertical position, about the top of the first roller 462, and to a substantially horizontal position in the tray 458. The wire cable 454 can be guided about the top of the second roller 464 such that, as the load is raised, the wire cable 454 is positioned so as to lie flat in the tray 458. When the article 42 is fully raised to a position adjacent the tube 26, the wire containment cable 454 can be positioned flat in a single layer along the length of the tray 458.

The wire containment cable 454 may be "single purchased," defined as a one-to-one relationship of the horizontal movement to the vertical movement of the wire cable 454. As the wire cable 454 moves a particular distance vertically while the lift cables 38 (and load) are being moved vertically, the wire cable 454 moves that same distance horizontally about and within the tray 458. In certain embodiments, the wire containment cable 454 can be "double purchased," in that as the lift cables 38 and the wire containment cable 454 move a particular vertical distance, the wire cable 454 can be moved about and within the tray 458 a horizontal distance, which is less than the vertical distance. The horizontal distance may be, for example, about one half the vertical distance. That is, as the wire cable 454 is moved upward while the load is being raised, the wire cable 454 may be doubled onto itself within the tray 458. As an example, if the wire cable 454 is raised 60 feet vertically, the wire cable 454 may move in one direction horizontally for 30 feet, for example, and then be folded back onto itself by the second roller 464 into the tray 458 in the opposite direction for 30 feet. In this way, the wire cable 454 can be folded back onto itself once, allowing both layers of the wire cable 454 to lie flat along a substantial distance within the tray 458. In embodiments in which the wire containment cable 454 is "single purchased," the wire lift cable 38 can be "single purchased." In embodiments in which the wire containment cable 454 is "double purchased," the wire lift cable 38 can be "double purchased." In various embodiments, the wire lift cable(s) 38 can be "single purchased" or "double purchased," and/or the wire containment cable 454 can be "single purchased" or "double purchased," in any combination.

Figure 13:
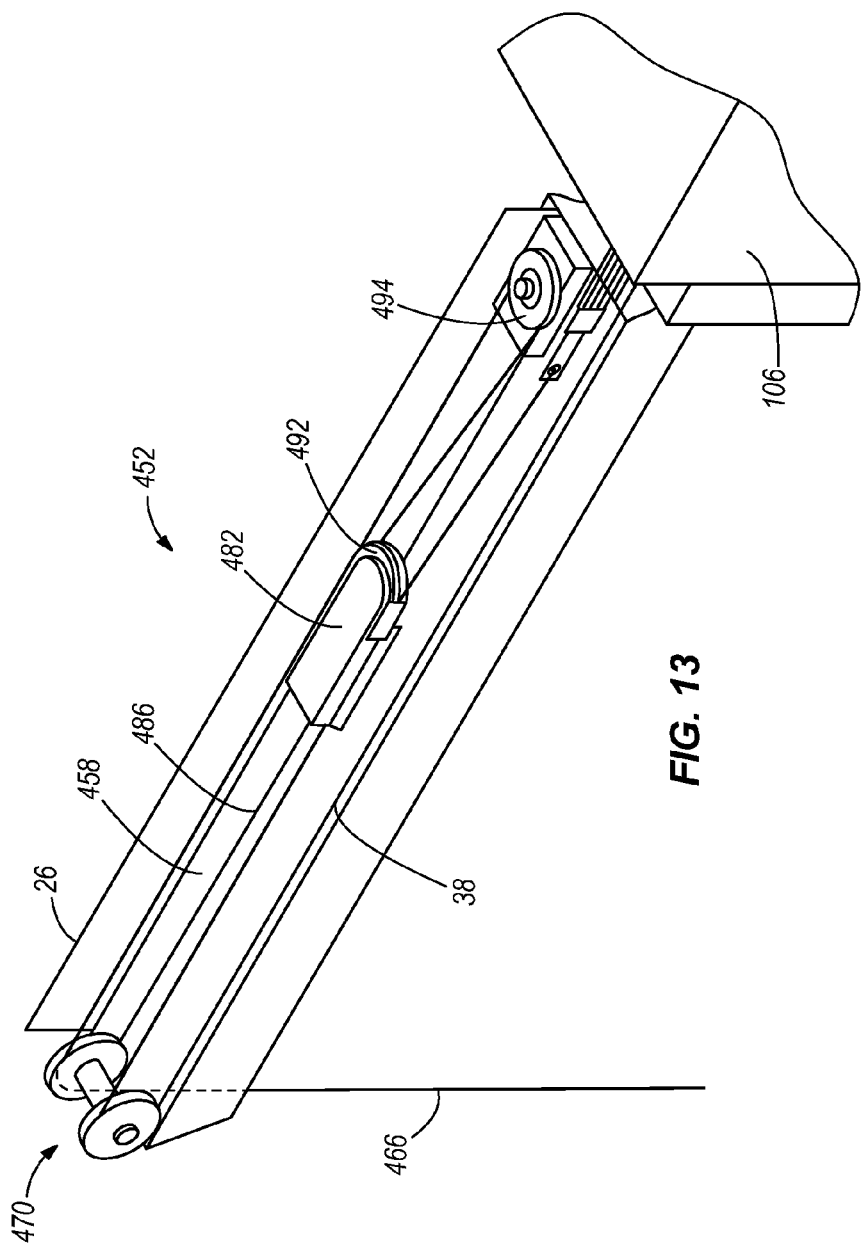
FIG. 13 is a view of a cable management system in a tray on top of a compression tube in an embodiment of the present invention.

FIG. 13 illustrates another embodiment of the cable management system 452 in which the tray 458 is disposed on the compression tube 26. As shown in FIG. 13, the tray 458 can comprise the top of the compression tube 26 between upward extensions 160 along the length of the tube 26. Such an embodiment of the cable management system 452 can include the wire cable loft block 470 attached to the end of the tube 26 opposite the power head 106. In some embodiments, the wire cable loft block 470 can comprise a pair of side-by-side pulleys. The cable management system 452 can further include a truck 482 that can slide along the length of the top of the tube 26, that is, along the length of the tray 458, along a guide rail 486. The guide rail 486 can have a "T" shape, and the truck 482 can be configured to matingly slide along the T-rail 486. The truck 482 can include a pulley 492, or sheave, about which the cable 38 can move. A pulley 494 can be fixed in the tray 458 on the power head 106 end of the lift assembly system 10. In other embodiments, the cable management system 452 can be similarly configured on top of the compression tube 26 without the tray 458. That is, in certain embodiments, only the truck 482 and its associated movement mechanisms can be located on the compression tube 26.

The lift cable 38 can be one of the plurality of lift cables 38 attached to the drum 14, and can be routed to the wire cable loft block 470 on the end of the tray 458 opposite the power head 106. The cable 38 can then be routed about a first pulley in the wire cable loft block 470 back in the direction toward the power head 106 and be connected to the truck 482 in the tray 458. The wire cable lift cable 466 can be attached on one end to a fastener adjacent the power head 106, routed about the pulley 492 attached to the truck 482, to the pulley 494 fixed on the power head 106 end of the lift assembly system 10, about the pulley 494, to a second pulley in the wire cable loft block 470, and about the wire cable loft block 470 into a substantially vertical downward direction.

When the drum 14 winds the lift cables 38 about the drum 14, the wire cable lift cable 466 and the attached truck 482 are pulled toward the wire cable loft block 470. This movement causes the truck 482 to pull the cable 38 to raise the wire containment cable 454 attached to the lift cable 466. When the drum 14 unwinds the lift cables 38 from the drum 14, the wire cable lift cable 466 and the attached truck 482 are allowed to move toward the pulley 494 near the power head 106. This movement allows the cable 38 to lower the wire containment cable 454 attached to the lift cable 38.

In alternative embodiments, the mechanism for moving the wire containment cable 454 can comprise mechanisms other than a physical truck 482 as shown in FIG. 13. In alternative embodiments, the cable management system 452 can include a mechanism for guiding movement of the wire containment cable 454 without a T-rail 486. In preferred embodiments, the cable management system 452 can provide a system that is stable under loads to be raised and lowered and during operation of the lift assembly system 10. In such embodiments, the cable management system 452 can provide a system that is smooth in operation, quiet, and durable.

Figure 14:
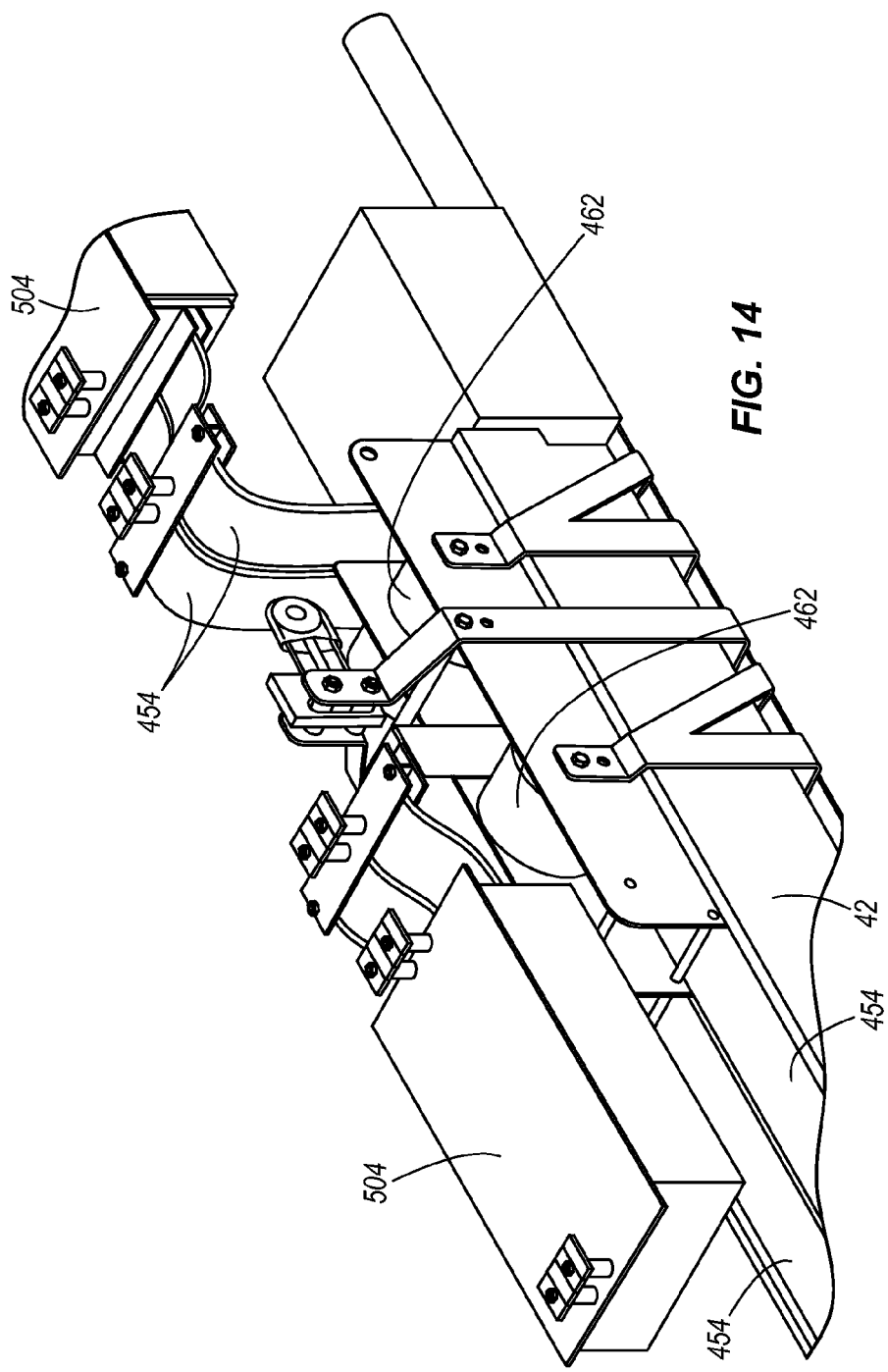
FIG. 14 is a view of components of a cable management system attached to a batten in an embodiment of the present invention.
Figure 15:
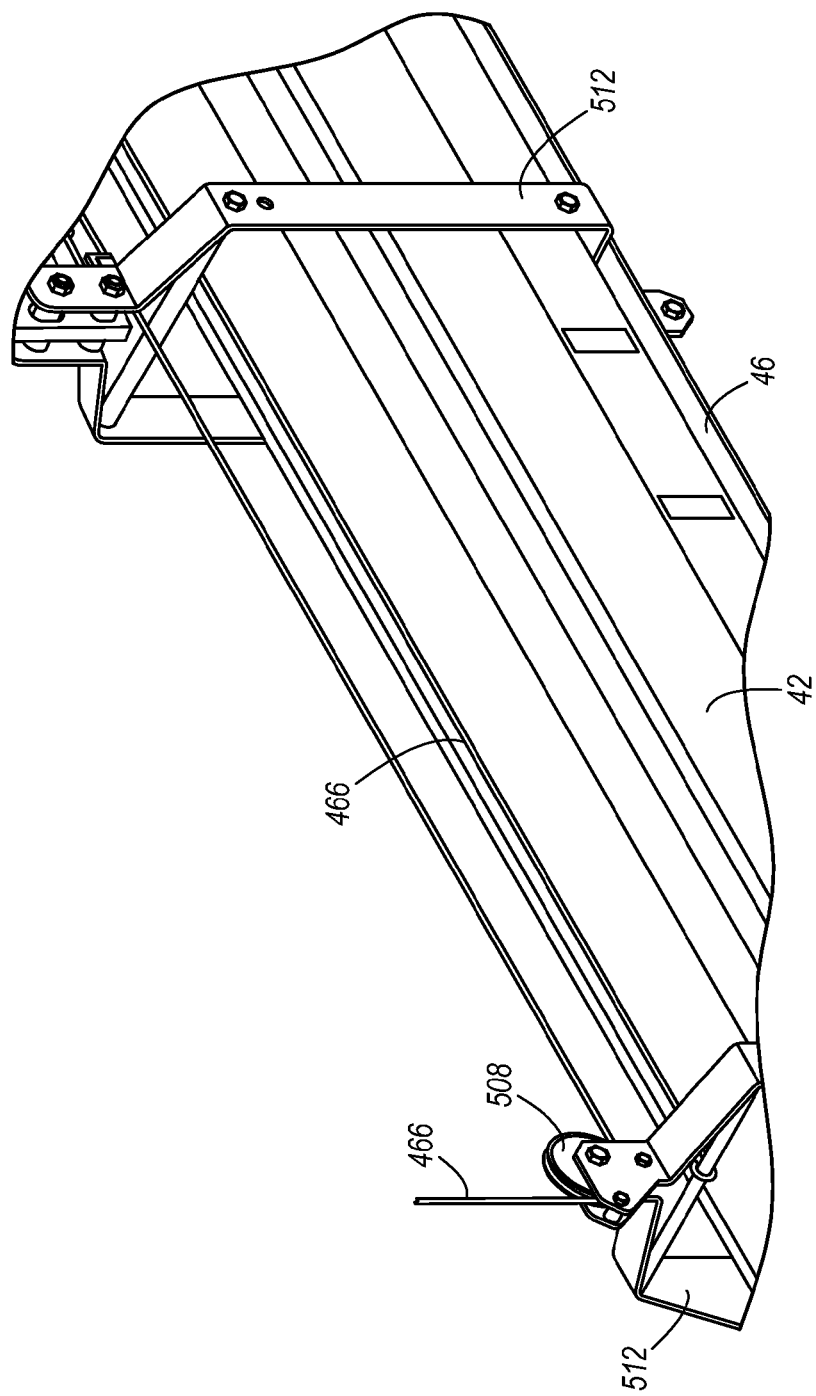
FIG. 15 is a view of components of a cable management system attached to on one end of a batten in an embodiment of the present invention.
Figure 16:
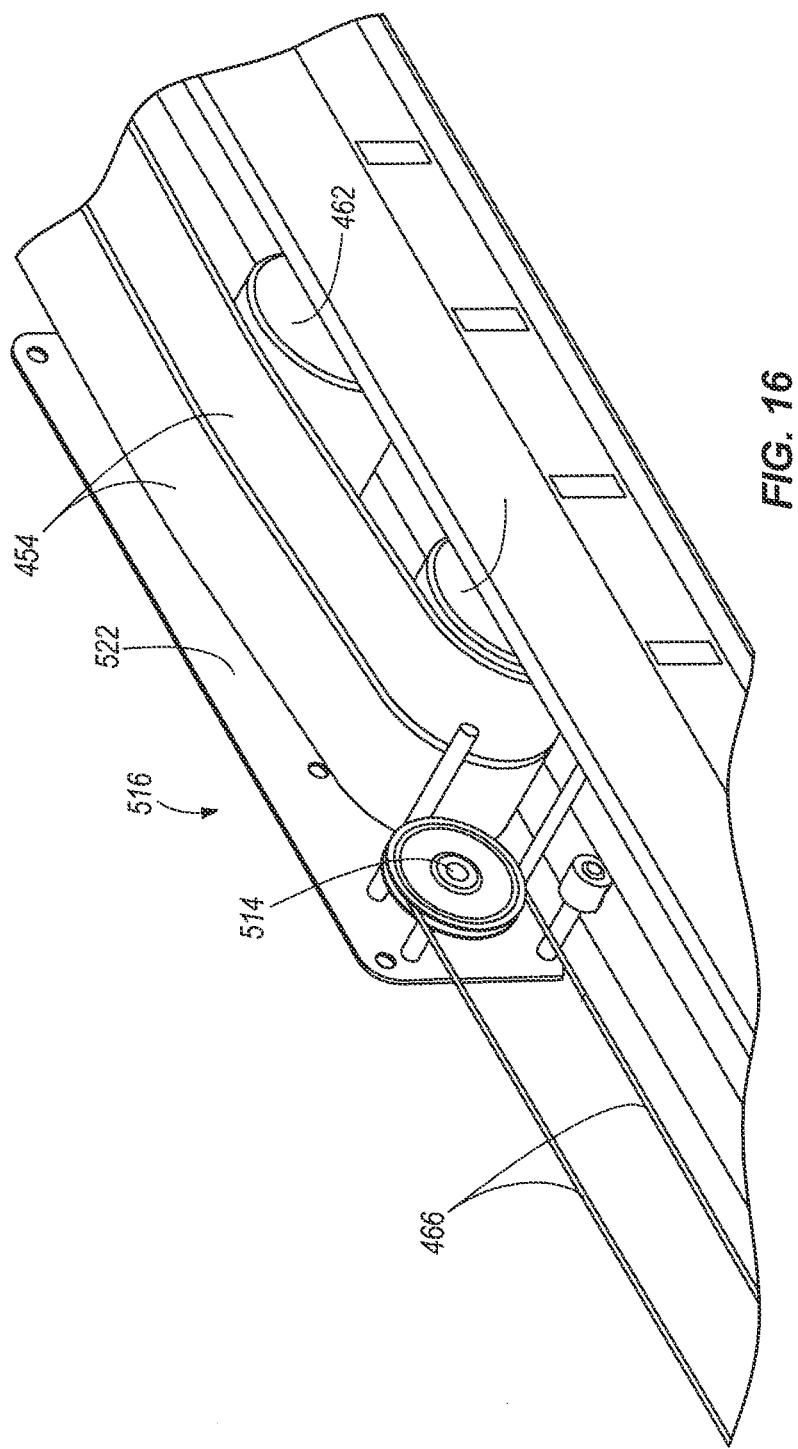
FIG. 16 is a view of components of a cable management system attached to the opposite end of the batten shown in FIG. 15.

FIGS. 14-16 illustrate embodiments of the cable management system 452 having components attached to the batten 46, or article 42. As shown in FIG. 14, one or more wire containment cables 454 can be attached on one end to an electrical box input source 504 located near the compression tube 26. FIG. 14 shows a compressed vertical view of the wire containment cables 454 that extend between the tube 26 and the article 42. The wire containment cables 454 can be routed downward from one or more of the electrical box input sources 504 in a substantially vertical direction to the wire containment cable rollers 462 and about the rollers 462 onto the top of the article 42. In some embodiments, one pair of the wire containment cables 454 can be positioned on top of the other pair on top of the batten 46/article 42 when the article 42 is raised.

FIG. 15 shows the wire cable lift cable 466 routed substantially vertically downward from the wire cable loft block 470 and about a pulley 508 fixed to a batten attachment arm 512 on the end of the batten 46 below the wire cable loft block 470. The wire cable lift cable 466 can then be routed substantially horizontally toward the opposite end of the batten 46 about the pulley 514 attached to a trolley 516. The trolley 516 can ride on a roller 154 along the top of the length of the batten 46. The trolley 516 can be at least partially enclosed by trolley walls 522. The top and front walls of the trolley 516 are removed in FIG. 16 to show the internal portions of the trolley 516. The wire cable lift cable 466 can be routed from the pulley 514 back in the opposite direction to a point of attachment on the batten attachment arm 512 below the first pulley 508. In this manner, when the lift cables 38 are wound about the drum 14 to raise the batten 46/article 42, the wire cable lift cable 466 and the trolley 516 are pulled toward the pulley 508. This movement causes the trolley 516 to pull the wire containment cable 454 in position along the top of the batten 46. When the lift cables 38 are unwound from the drum 14, the wire cable lift cable 466 and the attached trolley 516 are allowed to move away from pulley 508. This movement allows the wire cable lift cable 466 to be extended in a substantially vertical direction between the tube 26 and the article 42.

In certain embodiments, the cable management system 452 can include two wire cable lift cables 466 that extend substantially vertically downward from the tube 26 when the article 42 is lowered. In such embodiments, the wire cable lift cable 466 on one end of the article 42 can be pulled by a first trolley toward the center of the article 42, thereby positioning a first wire containment cable 454 on the batten 46. The first trolley can have a cable attached to the first trolley routed about a pulley on the end of the batten 46/article 42 nearest the first trolley and back in the opposite direction to a second, slave trolley (not shown). A second wire cable lift cable can extend downward from the tube 26 to the second, slave trolley, about a pulley on the trolley, and to an attachment point on the end of the batten 46 opposite the first trolley. As the first trolley is pulled toward the center of the batten 46/article 42, the second, slave trolley and the second wire cable lift cable are likewise pulled toward the center of the batten 46, thereby positioning the second wire containment cable 454 on the batten 46.

In some embodiments, as shown in FIGS. 14 and 16, the tray 458 can comprise two portions of the tray 458 disposed longitudinally in a side by side fashion that form a "double tray." The two trays can be defined by a common tray separator extending upwardly in the middle of the tray 458 along its length. In this way, each of the wire containment cable rollers 462 can be guided along its own separate path along the length of the tray 458. The double tray 458 can help each individual wire containment cable 454 to stay in a constant horizontal position as it layers onto itself along its vertical length while being raised and lowered. In certain embodiments, the guide roller 154 can be turned 90 degrees from the position shown in FIG. 16 and can be attached to an inwardly extending flange along the top of the trolley 516 wall. In such a configuration, the guide roller 154 can help maintain the trolley 516 in position within the tray 458 as the trolley 516 moves out and back along the length of the tray 458.

Figure 11:
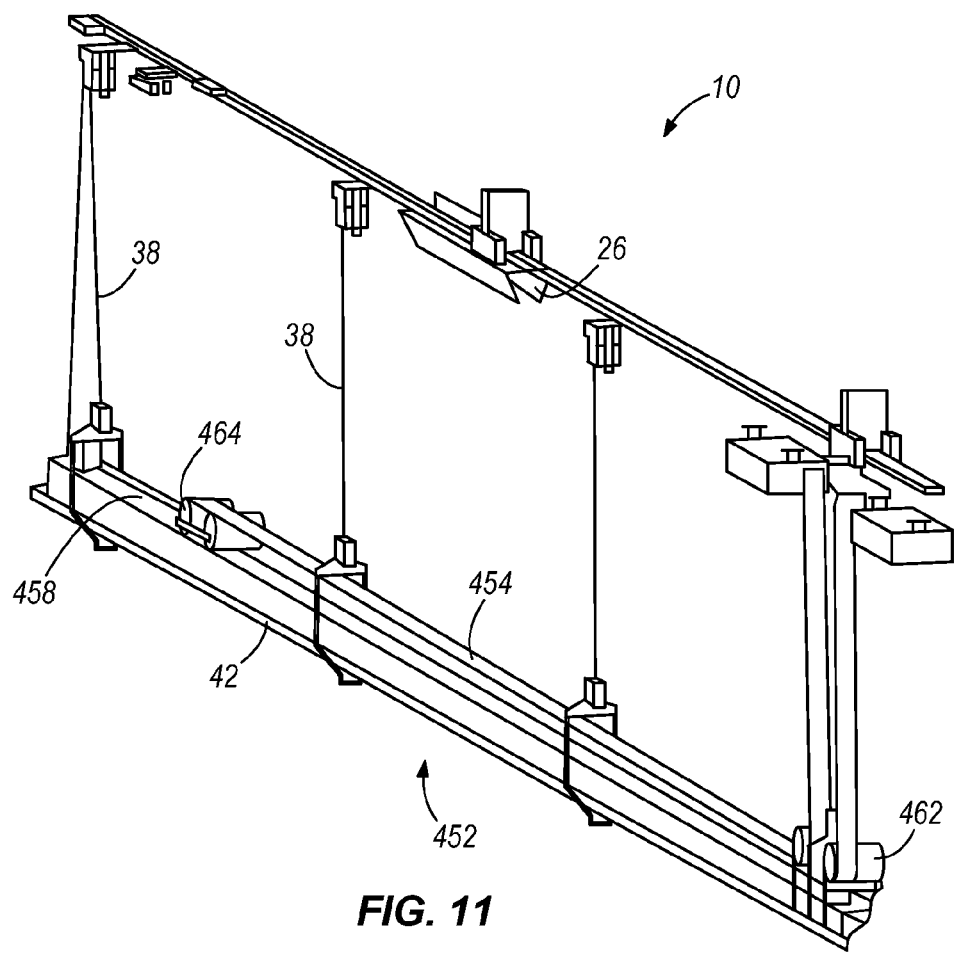
FIG. 11 is a view of a low profile distribution cable management system having a tray attached to the top of a batten in an embodiment of a lift assembly of the present invention.
Figure 12:
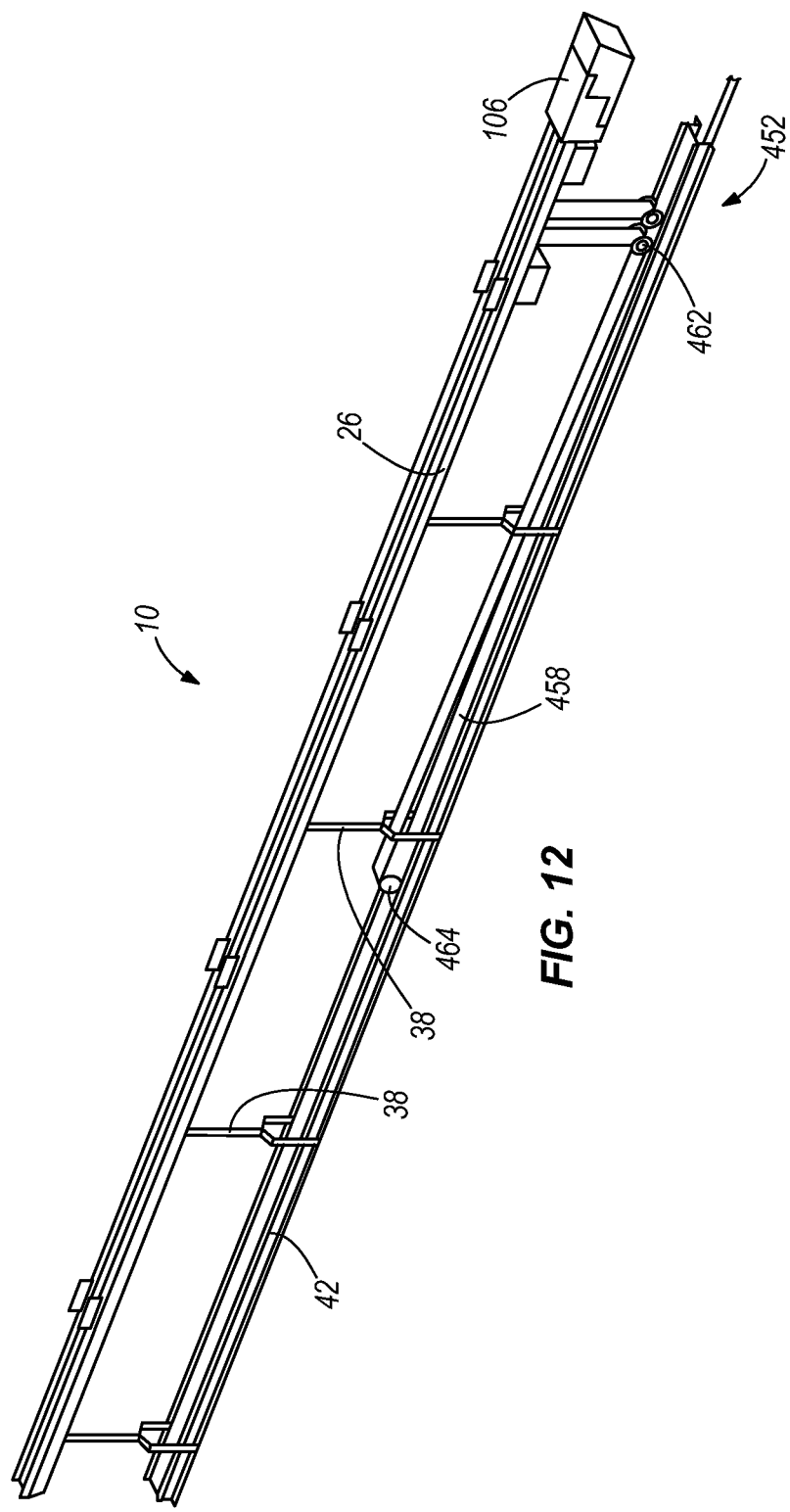
FIG. 12 is a view of a compression tube, power head 106, and particular load configuration in an embodiment of a lift assembly of the present invention.

In certain embodiments of the cable management system 452 of the present invention, the tray 458 can be attached to the top of a batten 46 or other load to be raised and lowered. FIG. 11 is a view of the low profile distribution cable management system 452 in which the tray 458 is attached to the top of the batten 46, or article 42, from which lights can be attached. The low profile distribution cable management system 452 can include the tray 458 comprising, for example, aluminum. Such an aluminum tray 458 can be extruded into tray form. In such an embodiment, the first roller 462 can be rotatingly fixed to the end of the tray 458 below the end of the tube 26 to which the power head 106 is attached. The flat electrical cable may be connected to the power head 106 of the lift assembly, which may be located at near the ceiling of a building. The flat wire containment cable 454 can move up and down with the batten 46, following a path that goes from the power head 106 substantially vertically downward, around the first roller 462 at the end of the tray 458, then horizontally in the tray 458, and around the moveable second roller 464 that travels in the tray 458. The moveable second roller 464 in the tray 458 may be connected by one of the lift cables 38 to the same drum 14 as the other lift cables 38 used to raise and lower the batten 46. In this way, the flat, electrical wire containment cable 454 may be moved in synchronization with the batten 46 to which it is attached. The wire containment cable 454 that moves with the second roller 464 in the tray 458 may be attached to a truck that can move internally along the length of the tube 26 along a guiding T-shaped rail. The truck may be connected to the wire cable lift cable 466 that winds about the power head drum 14 with the other load lift cables 38 that raise and lower the batten 46. The truck can slide along the T-rail and can serve as an interface between the power head 106 and the cable 38 running down to the tray 458 that is on the batten 46. The truck 482 may serve as a double- or triple-purchasing device to enable the flat electrical cable 38 to move at appropriate speeds and/or lengths in synchronization with the batten 46. In certain embodiments, the cable management system 452 can be primarily contained inside the compression tube 26. This can allow the entire lift assembly having cable 38 management to be pre-rigged at the factory.

In such embodiments, the roller system (first and second rollers 462, 464) can lay the wire containment cable 454 into the tray 458 in a flatter arrangement than in conventional cable management systems 452. In addition, because the wire cable 454 can be positioned in the tray 458 substantially from one end of the tube 26 to the other (when "single purchased"), or, alternatively, about half of the length of the tray 458 (when "double purchased"), the wire cable 454 does not stack as high as in conventional systems, where the wire cable 454 may stack on top of itself six to eight times or more. In this way, certain embodiments of the present invention can avoid the stacked height of the wire cable 454 on top of the batten 46 as in conventional systems, thereby providing a more stable and balanced positioning of the wire cable 454 on the batten 46. Because in some embodiments of the present invention the wire cable 454 is stacked in such a flatter arrangement on top of the batten 46, the batten 46 and attached articles 42 can travel a greater distance (that is, more closely to the overhead tube 26) than in conventional systems in which the wire cable 454 is stacked multiple times on itself at the top of the batten 46.

Conventional lift assemblies often include an electrical distribution runway, or power strip. The electrical distribution runway is connected to a power source. Various electrically powered components of the system or article being raised and lowered are then connected to the electrical distribution runway for a source of electrical power. Such electrical distribution runways are often mounted onto a batten. In such conventional lift assemblies, a cable management system can be separate from the electrical distribution runway. For example, in such lift assemblies, a cable management system can be built onto the electrical distribution runway, which results in additional materials and extra bulk and weight that must be moved with the batten or article. In some embodiments of the present invention, a cable management system 452 can be integrated with the electrical distribution runway. That is, both the cable management system 452 and the electrical distribution runway can be manufactured as a single unit. In this way, the bulk and weight of the lift assembly can be advantageously reduced.

Some embodiments of the present invention can include a method for managing the wire containment cable 454 while raising and lowering the article 42 utilizing the cable management systems 452 described herein.

Figure 28:
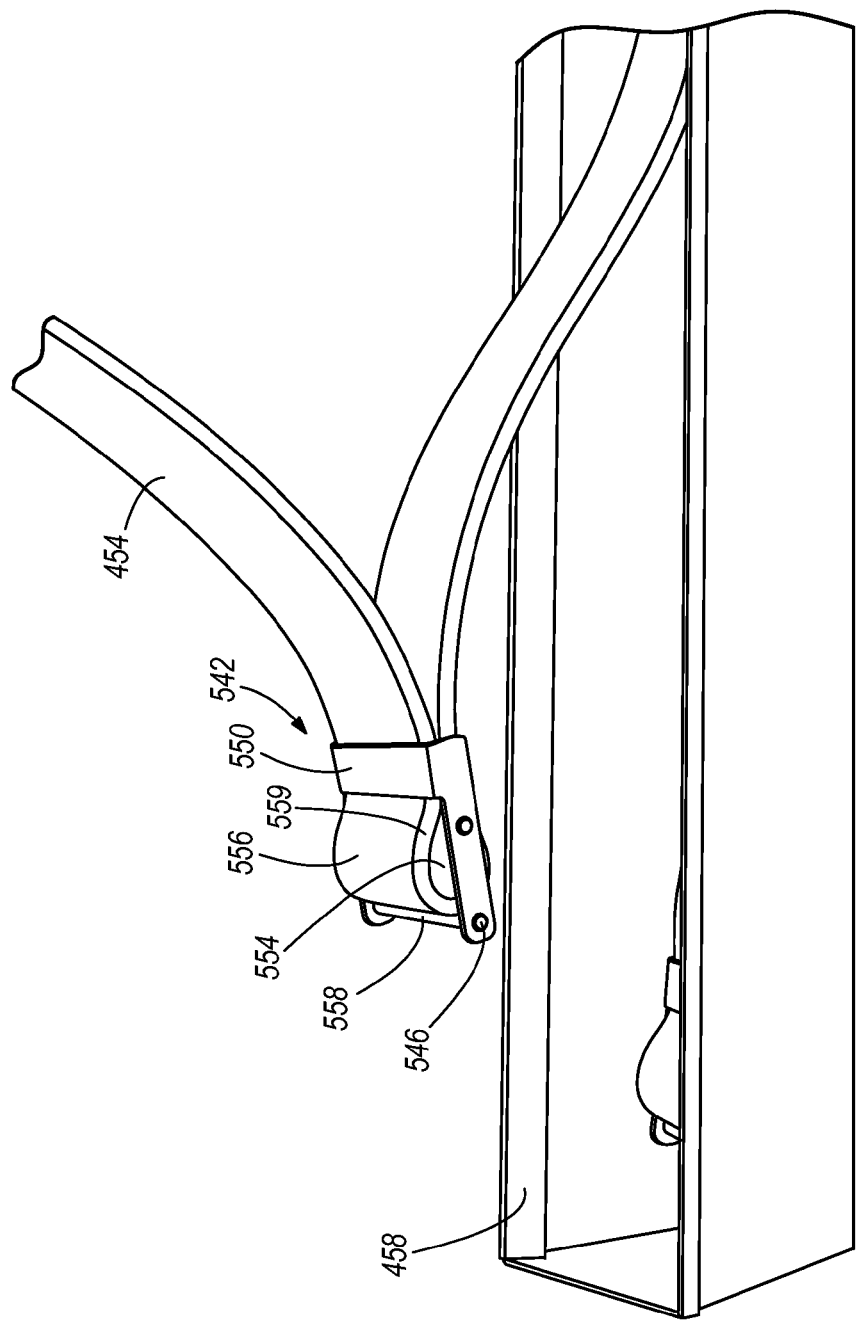
FIG. 28 is a perspective view of a cable clamp useful in certain embodiments of the cable management system.

FIG. 28 shows an embodiment of a cable clamp 542 useful in certain embodiments of the cable management system 452. The cable clamp 542 can comprise a rigid material, such as steel. The cable clamp 542 can comprise two side arms 546 spaced apart sufficiently to allow the width of the wire containment cable 454 to fit between the side arms 546. A cross bar 550 can extend between one end of the side arms 546 above and below a double thickness of the wire containment cable 454. The opposite end of the cable clamp 542 can include a connector rod 554 extending between the side arms 546 to help stabilize that end of the cable clamp 542. When the wire containment cable 454 is folded onto itself, the cable clamp 542 can be secured to the folded portion 556 of the wire containment cable 454. The cable clamp 542 can further include a support cylinder 558 that extends between the side arms 546 and through a loop 559 in the cable 454 created by the cable 38 fold. The support cylinder 558 can provide stabilizing and cushioning support to electrical wiring inside the wire containment cable 454, and can help secure the cable fold in a substantially unmovable relationship with the cable clamp 542. The support cylinder 558 can also help assure that the cable 38 is not folded too much, thereby protecting the integrity of the wiring inside the cable 38.

In operation, the wire containment cable 454 can be folded at desired points along its length and can have a cable clamp 542 applied to the cable 454 at each of the cable folds 556. In this way, the length of the wire containment cable 454 having a plurality of the cable clamps 542 applied can be stacked on top of itself in a managed way. For example, cable clamps 542 can be applied to increasingly shorter lengths of the wire containment cable 454 from the bottom of the cable 454 upward. As a result, the wire containment cable 454 can be stacked, or purchased, out and back onto itself in the tray 458, as shown in FIG. 28. As the individual lengths of the wire containment cable 454 are stacked onto each other, subsequent ones of the cable clamps 542 can rest adjacent a previous clamp in a side by side fashion. In such a stacked arrangement, the wire containment cable 454 can form a pyramidal stack of decreasing lengths of the cable 38, with the cable clamps 542 resting on the cable 38 below on the outside of the pyramid. The cable clamps 542 may be more effectively utilized in some embodiments of the wire containment cable 454, for example, in those wire containment cables 454 attached to lighter loads, such as regular house lights in a theater.

Load Cell Assembly

Figure 24:
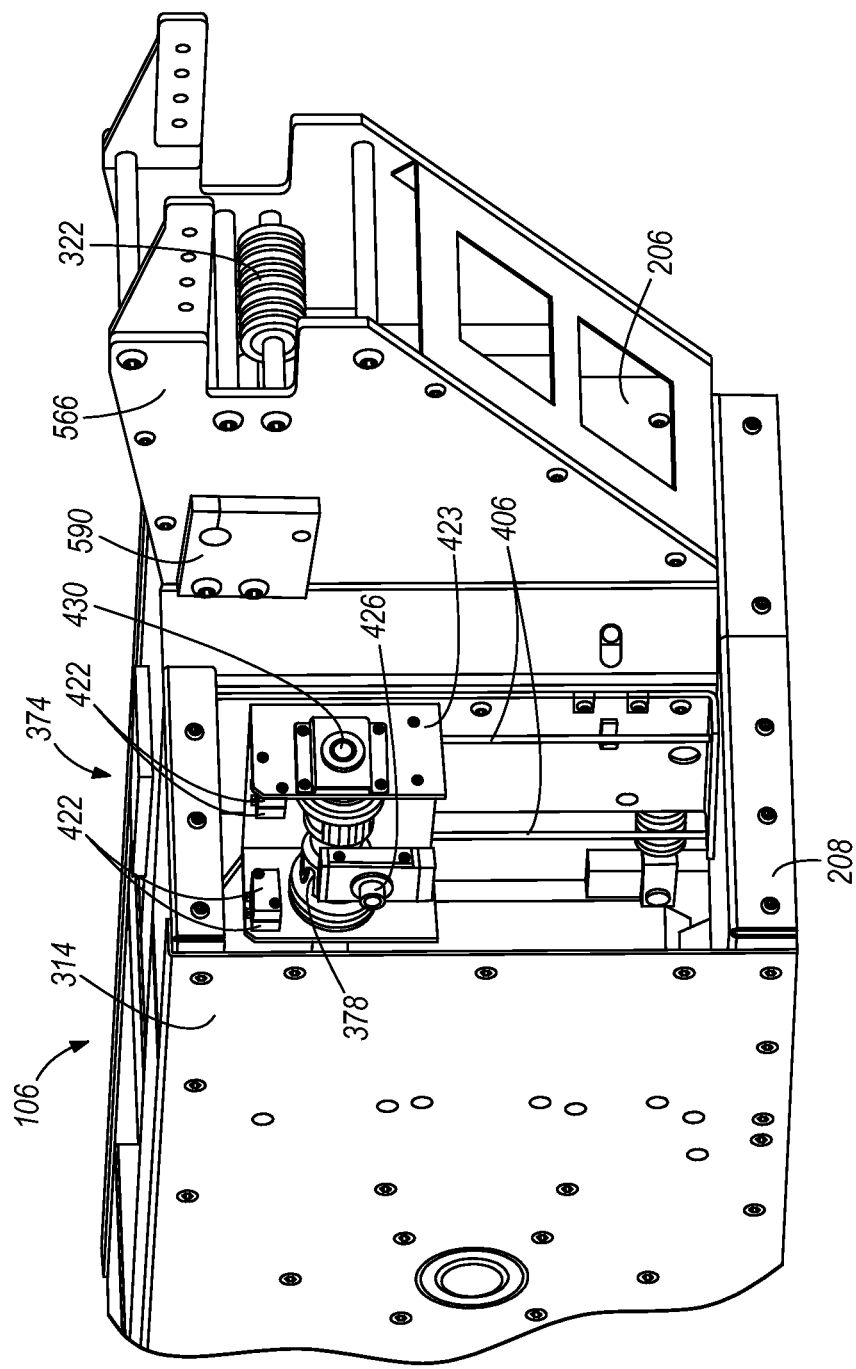
FIG. 24 is perspective view of a portion of a power head 106 having a portion of the power head 106 housing removed to show a limit switch assembly inside the power head 106 in an embodiment of the present invention.
Figure 25:
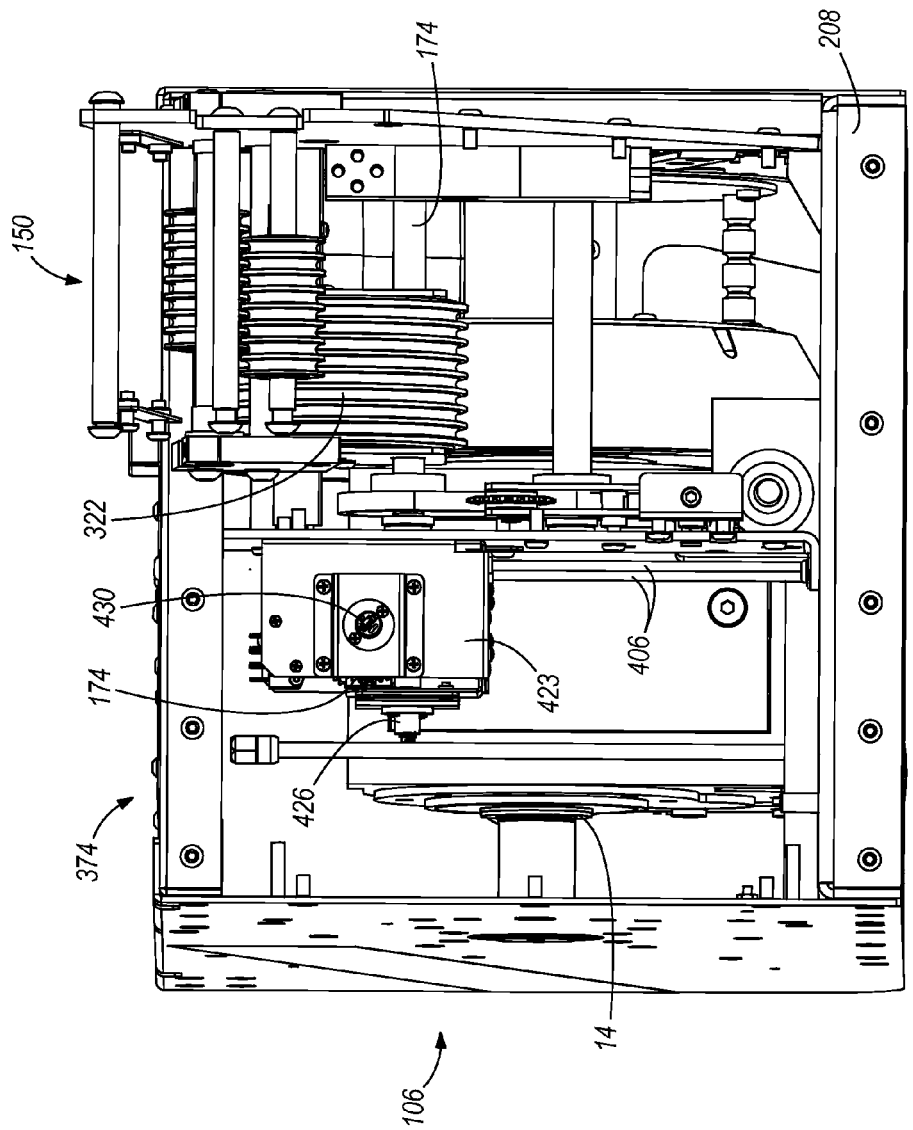
FIG. 25 is an end view of the portion of a power head 106 and the limit switch assembly shown in FIG. 24, with a portion of the power head 106 housing and load cell housing removed.
Figure 26:
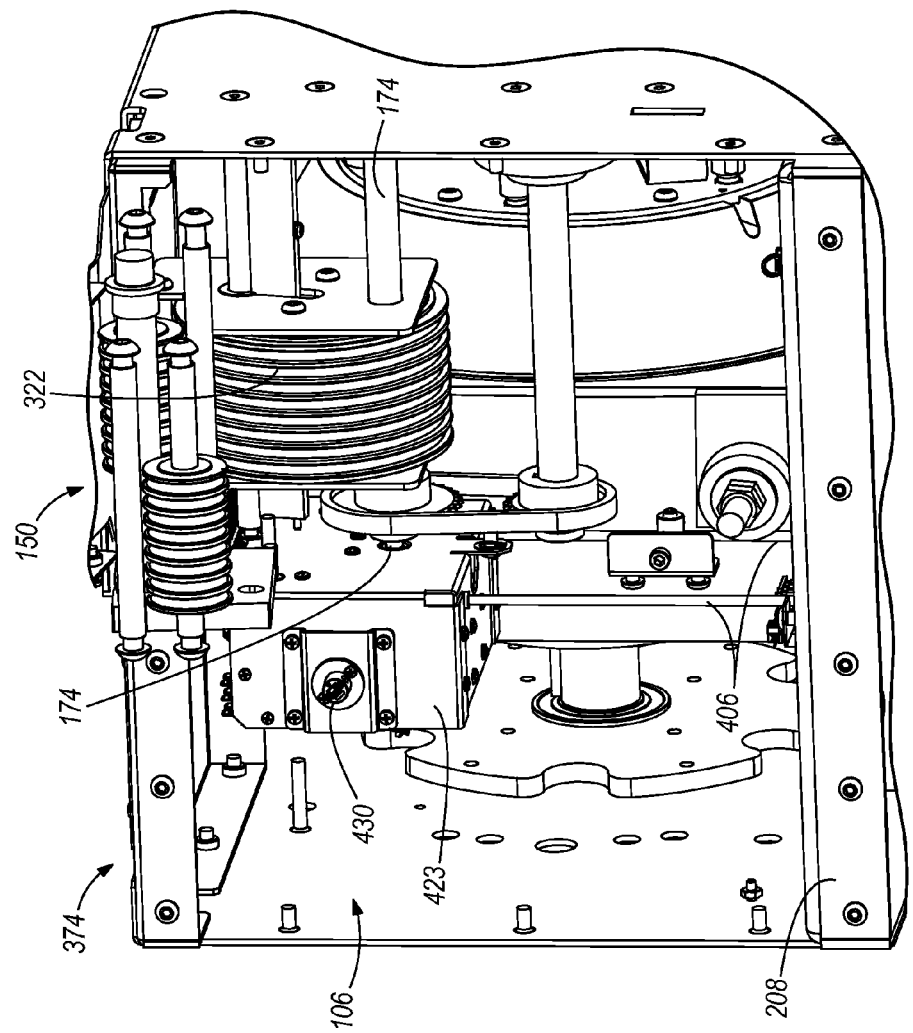
FIG. 26 is a perspective view of the portion of a power head 106 and the limit switch assembly shown in FIGS. 24 and 25.
Figure 29:
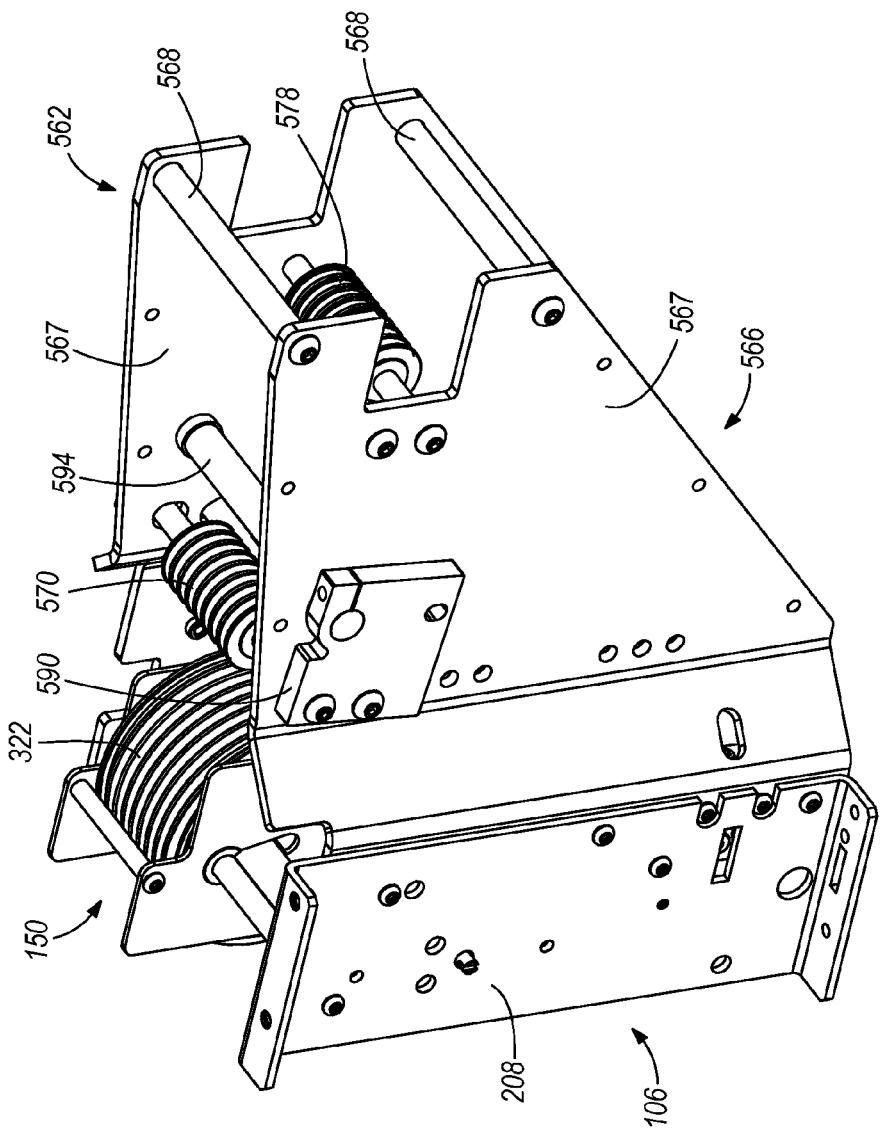
FIG. 29 is a perspective view of the power head 106 and load cell assembly in an embodiment of the present invention.
Figure 30:
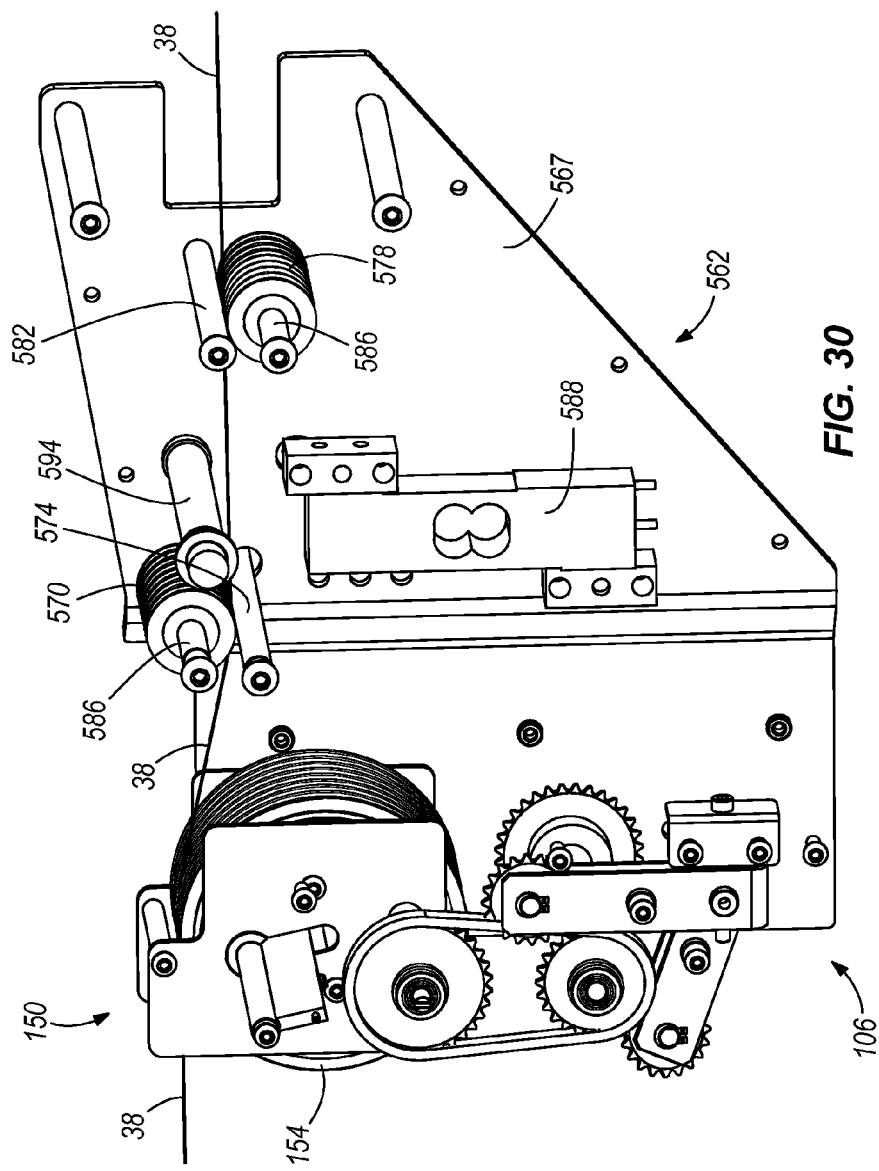
FIG. 30 is a side view of the power head 106 and load cell assembly shown in FIG. 29, with one of the power head 106 side plates, the power head 106 end plate, and one of the load cell assembly housing side plates removed to show internal components of each.
Figure 31:
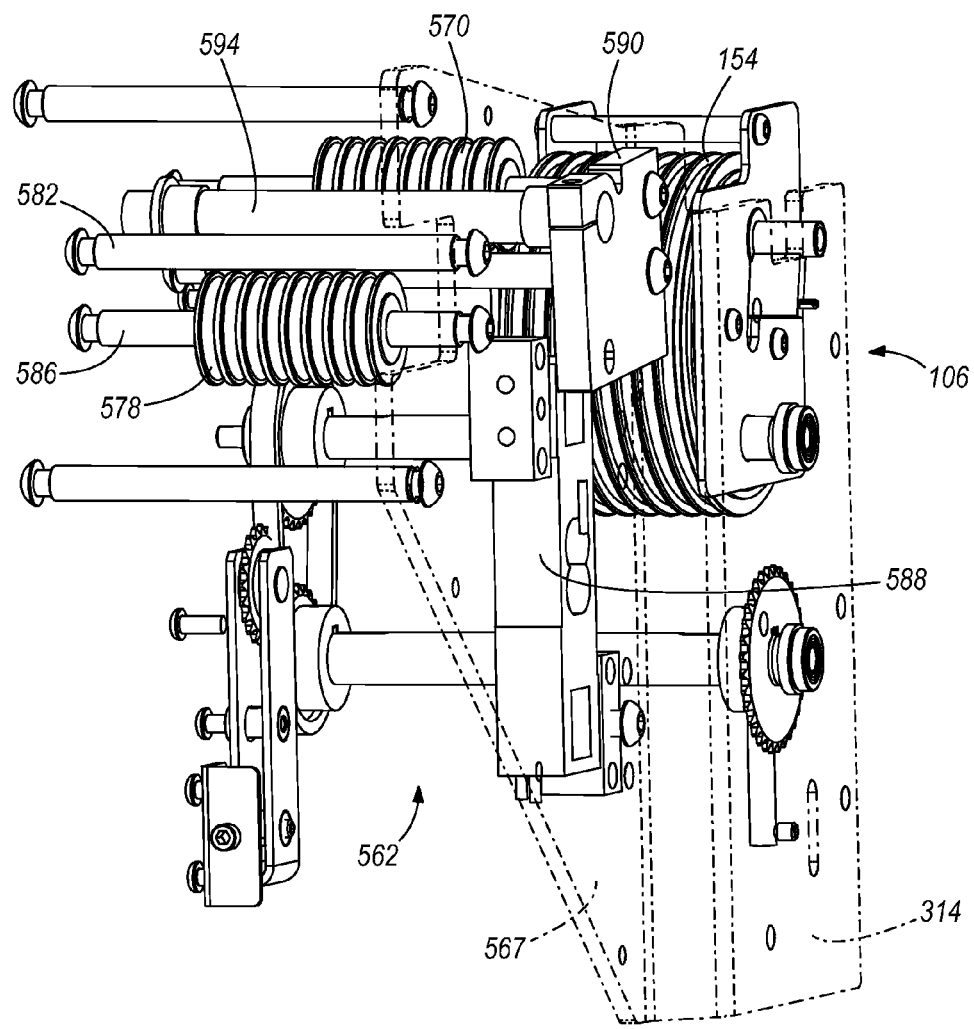
FIG. 31 is a perspective view of the power head 106 and load cell assembly shown in FIGS. 29 and 30, with further power head 106 housing and load cell assembly housing removed to show internal components of each.

Some embodiments of the lift assembly system 10 can include a load cell assembly 562 adapted to measure the force, or pressure, applied by a load attached to the cables 38. FIGS. 29-31 show a preferred embodiment of such a load cell assembly 562. As shown in FIG. 29, the load cell assembly 562 can be housed in a load cell assembly housing 566 outside and adjacent to the power head housing 208. The load cell assembly housing 566 can include two spaced apart side plates 567 having support bars 568 between the side plates 567. In FIG. 30, one of the side plates 314, 567 of each of the power head housing 208 and the load cell housing 566 and the end plate 206 of the power head housing 208 (as shown in FIG. 24) are removed to show the load cell assembly 562 components inside the load cell assembly housing 566 and the positioning of the load cell assembly 562 components relative to the power head 106 components. In FIG. 31, most of the load cell assembly housing 566 and power head housing 208 have been removed and one of the power head housing 208 side plates 314 and one of the load cell assembly housing 566 side plates 567 are shown in transparent fashion to show the relative positions of internal components.

In such an embodiment, the load cell assembly 562 can include a first load cell roller 570 adjacent a first keeper bar 574 and a second load cell roller 578 adjacent a second keeper bar 582. The first and second load cell rollers 570, 578 can each be slidably mounted about a separate roller rod 586 that extends between the load cell assembly housing side plates 567. In operation of the lift assembly 10, the cables 38 travel over the top of the guide assembly roller 154 in the power head 106, out of the power head 106, underneath the first load cell roller 570 and on top of the first load cell keeper bar 574, on top of the second load cell roller 578 and underneath the second load cell keeper bar 582, and then to the loft blocks 34 in the compression tube 26. The load cell assembly 562 can further include a load cell 588 mounted on one of the load cell assembly side plates 567. The load cell assembly 562 can further include a load cell pivot block 590 mounted on the exterior of each of opposing load cell assembly side plates 567.

In the embodiment shown in FIGS. 29-32, the first load cell roller 570 is adapted to move upward and downward in response to the amount of pressure on the cables 38 on that roller 570. When there is a load, such as a batten 46, on the cables 38, the cables 38 tends to push the first load cell roller 570 upward, which causes the load cell pivot blocks 590 to pivot in a counterclockwise direction about a pivot bar 594, or torsion bar, extending between the side plates 567 of the load cell assembly housing 566 and operatively connecting the two load cell pivot blocks 590. In this manner, each of the load cell pivot blocks 590 can pivot together and to the same degree, which can help provide consistent load cell readings of the load. When the load cell pivot block 590 pivots in this manner, it presses against a pressure-sensitive contact on the load cell 588. The load cell 588 is adapted to sense the pressure applied to it by the load cell pivot block 590 in response to pressure from the load on the cables 38. In this manner, the load cell 588 can measure pressure on the lift assembly generated by the load. In some embodiments, the load cell 588 can sense pressure differences of about 25 lbs. or less. The load cell 588 can transmit readings of load pressure to the lift assembly system 10 control panel and/or to other locations, such as a remote computer.

The guide roller 154 (in the power head 106) and first and second load cell rollers 570, 578 (in the load cell assembly 562 outside the power head 106) can move laterally, or horizontally, between the side plates 314, 567 of the power head housing 208 and load cell assembly housing 566, respectively. Measurements of load pressure can be taken when the guide roller 154 and first and second load cell rollers 570, 578 are moved completely to one side or the other and the guide roller 154 is adjacent one of the power head housing 208 side plates 314 and the first and second load cell rollers 570, 578 are adjacent one of the load cell housing 566 side plates 567. In this way, load pressure measurements can be taken in consistent positions over time, and the side plates can help stabilize these rollers 570, 578 for more accurate and consistent measurements. In addition, the first and second load cell guide rollers 570, 578 can move laterally in synchronization with lateral movement of the guide assembly 150 guide roller 154. As a result, consistent fleet angles of the cables 38 between these three rollers 154, 570, 578 can be maintained.

Cable Adjuster

Figure 32:
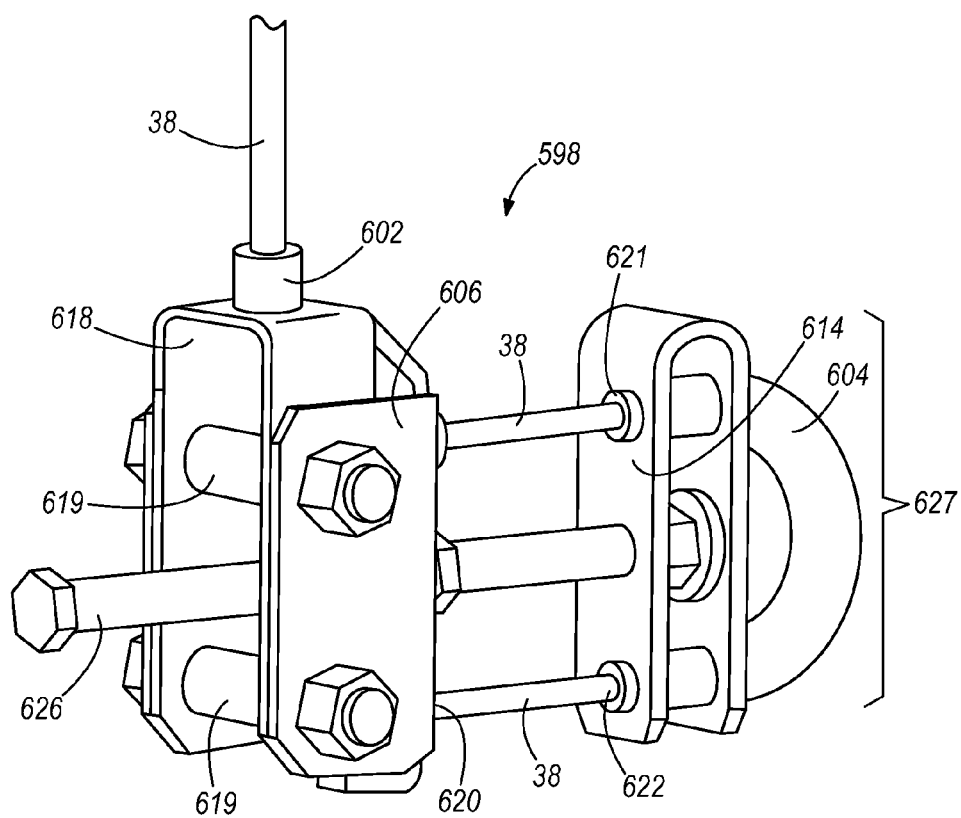
FIG. 32 is a view of a low profile, horizontally oriented cable adjuster in an embodiment of a lift assembly of the present invention.
Figure 33:
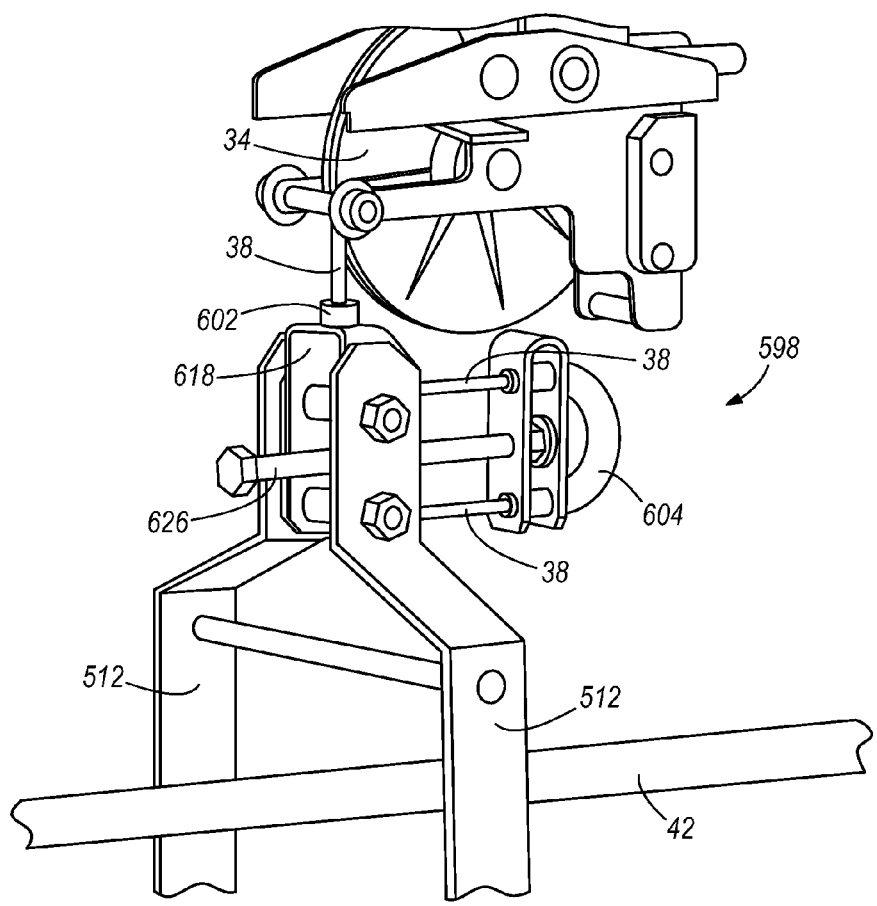
FIG. 33 is a view of the low profile cable adjuster shown in FIG. 32, in which the wire cable is shown movably attached to a loft block.
Figure 34:
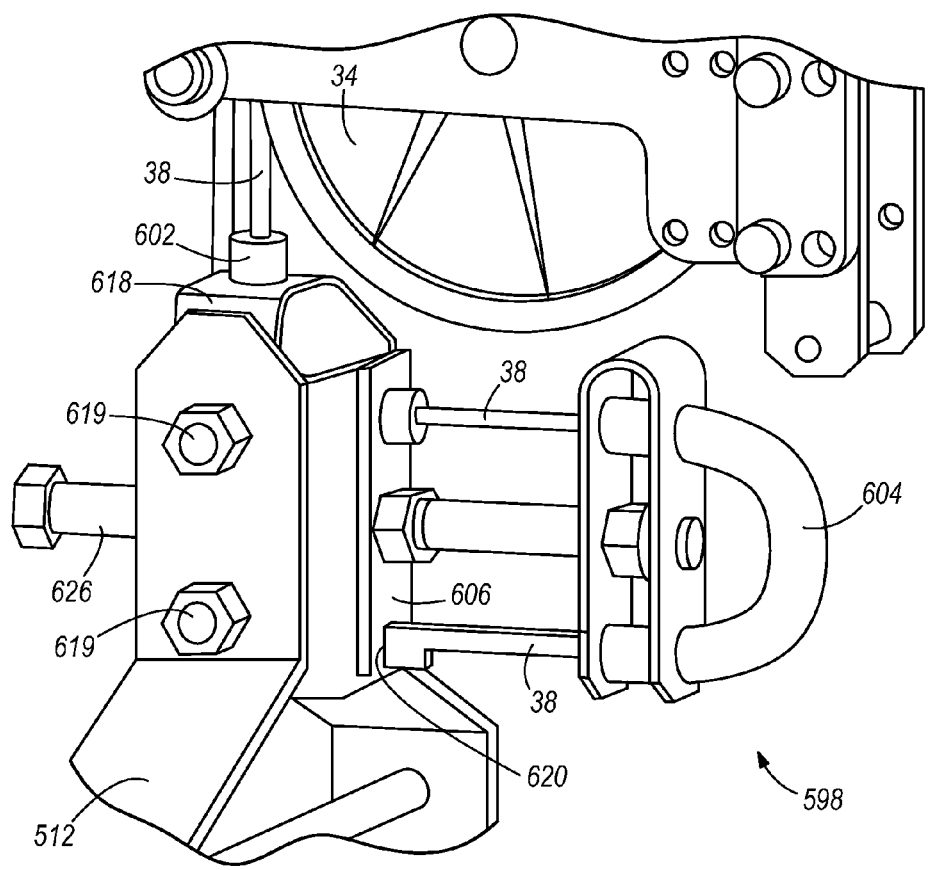
FIG. 34 is a view of the low profile cable adjuster shown in FIG. 32, showing the cable adjuster assembly attached to a pair of batten attachment arms.

Some embodiments of the present invention can include a low profile, horizontally oriented cable adjuster 598 as an interface between the cables 38 and the batten 46. FIGS. 32-35 illustrate various embodiments of such a low profile, horizontal cable adjuster 598. For example, as shown in FIGS. 32-35, the cable adjuster 598 can include a pair of cable guide blocks. A first one of the cable guide blocks 602 can be attached to a first rigid plate 606 and include a cable pathway having an angle, for example, a 90 degree angle. A second one of the cable guide blocks 604 can be attached to a second rigid plate 614 spaced apart along a horizontal axis from the first plate 606 and include a cable pathway angle, for example, a 180 degree angle. In some embodiments, for example, as shown in FIGS. 32-34, the cable guide blocks 602, 604 having 90 degree angle and 180 degree angle cable pathways, respectively, can comprise a tubular material such as steel bent at those angles.

In some embodiments, the first plate 606 can be attached to a U-shaped support 618. The 90 degree cable guide tube 602 may be further attached to the U-shaped support 618, such that the U-shaped support 618 can be moved vertically along with the cable 38. One or more securing bolts 619 can pass through holes in each of the arms of the U-shaped support 618. In certain embodiments, a batten attachment arm can be secured to the U-shaped support 618 with the securing bolts. The second plate 614 can have various shapes and dimensions configured to provide support to the 180 degree cable guide block 604. For example, as shown in the embodiments in FIGS. 32-34, the second plate 614 can be U-shaped and attached to the ends of the 180 degree cable guide tube 604. The cable adjuster 598 assembly can be strong enough to support a batten 46 and/or a load attached to the cable 38.

As shown in FIGS. 32-35, the cable 38 can be routed vertically from the power head 106, through the 90 degree cable guide block 602, horizontally into a cable entry point 621 in one end of the 180 degree cable guide block 604 in a first horizontal direction, out of the 180 degree cable guide block 604 in the opposite horizontal direction, and dead end at a cable attachment point 620 on the first plate 606 attached to the 90 degree cable guide block 602. The cable 38 can be securely attached to the first plate 606 in a variety of ways. For example, the cable 38 can be attached to the first plate 606 using a "nico" fitting or a "swage" fitting.

In some embodiments, the cable adjuster 598 assembly can further include a horizontal adjustment bolt 626, or threaded rod 626, or other mechanism configured to maintain a desired distance between the first and second plates 606, 614. The adjustment bolt 626 can help hold the assembly together. One end of the bolt or threaded rod 626 can be secured to the 180 degree cable guide block 604. As shown in FIGS. 32-35, the horizontal adjustment bolt 626 can be attached to the second plate 614 attached to the 180 degree cable guide block 604. The bolt can be rotated to move the 180 degree cable guide block 604 horizontally, thereby moving the cable 38 horizontally and moving the entire cable adjuster 598 assembly vertically on the cable 38. In this manner, the length of the cable 38 between the loft block 34 and the attached article 42 can be adjusted, that is lengthened or shortened. In some embodiments, the horizontal adjustment mechanism can comprise distance adjustment structures other than a bolt or rod.

The cable pathway through the guide blocks 602, 604 can be dimensioned for a particular cable 38 diameter, or range of cable 38 diameters, with sufficient clearance between the cable 38 and the inside wall of the guide blocks 602, 604 such that the cable 38 can move smoothly through the guide blocks 602, 604 without undesirable friction, or drag. For example, the inside diameter of the cable pathway through the guide blocks 602, 604 can be large enough for a 3/16 inch and/or a 1/4 inch cable 38. In some embodiments, the inside diameter of the cable pathway through the guide blocks 602, 604 can be larger or smaller, depending on the diameter of the cable 38 to be guided through the guide blocks 602, 604. That is, for a cable 38 having a diameter smaller than 3/16 inch, or for a cable 38 having a diameter larger than 1/4 inch, the diameter of the cable pathway can be just large enough to accommodate that particular size cable 38.

The 180 degree guide block 604 can have a spread 627 between the cable entry point 621 and the cable exit point 622 that provides a cable path that is sufficiently rounded, or arched, to reduce friction between the cable 38 and the guide block 604. In certain embodiments, for example, the spread 627 of the cable 38 path in the 180 degree guide block 604 can be about two inches. That is, as shown in FIGS. 32-35, the distance between the cable entry point 621 into the 180 degree guide block 604 and the cable exit point 622 from the 180 degree guide block 604 can be about two inches. In some embodiments, the distance, or spread, between the cable entry point 621 into and the cable exit point 622 from the 180 degree guide block 604 can be more or less than two inches, depending on various factors, including, for example, the differential between the diameter of the cable 38 and the inside diameter of the guide block 604 cable pathway, the materials from which each of the cable 38 and the inside walls of the guide block 604 cable pathway are made, and other factors. The relative sizes of the cable 38 and the cable pathway in the guide blocks 602, 604 and the spread of the cable 38 entering and exiting the 180 degree guide block 604 can be dimensioned so as to maintain the structural integrity of the cable 38 and the cable pathway during repeated use.

The cable adjuster 598 assembly may be only a few inches tall, for example, two to four inches tall, which could save six or more inches of vertical distance, as compared to conventional lift assembly cable adjusters using vertically oriented turnbuckles. The cable adjuster 598 may be used to trim the cables 38 that hold the batten 46, effectively leveling the batten 46 if one or more cables 38 are longer than another, or if the batten 46 is loaded unevenly such that one end is heavier than the other. In this manner, the low profile, horizontally oriented design of the cable adjuster 598 of the present invention can eliminate the significant cost for building a foot or more of vertical space required in a building by other lift assembly systems.

Figure 35:
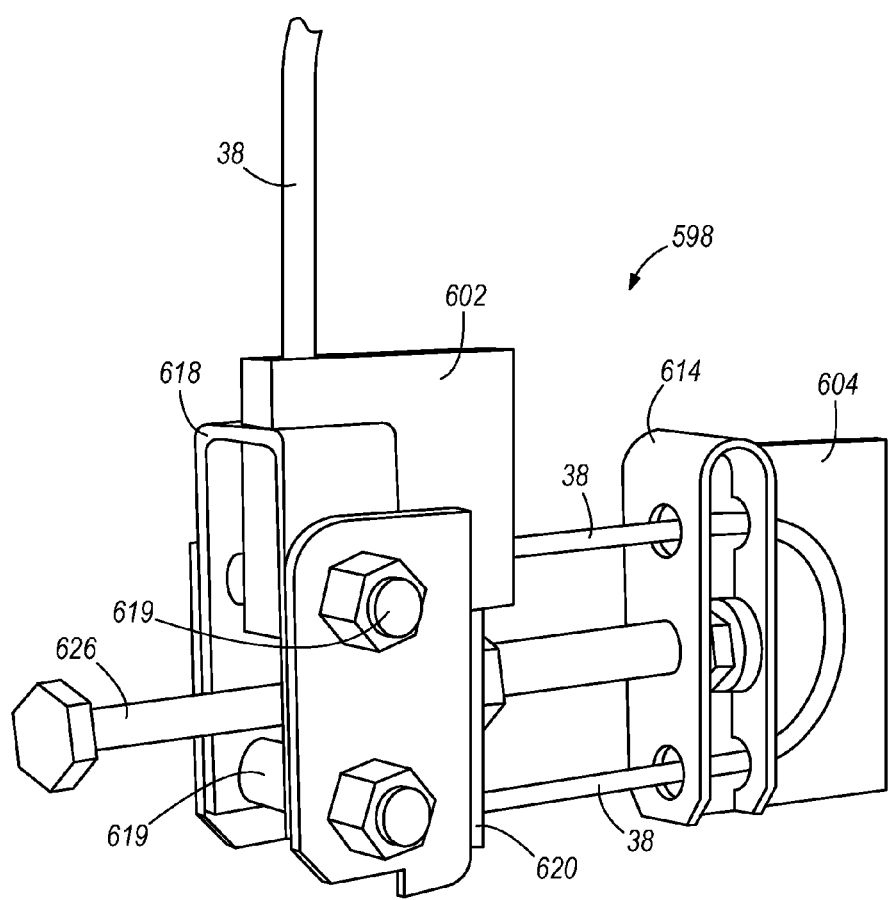
FIG. 35 is a view of another embodiment of a low profile, horizontally oriented cable adjuster having a 90-degree cable guide block and a 180-degree cable guide block for guiding the wire cable from the loft block in a horizontal direction.
Figure 36:
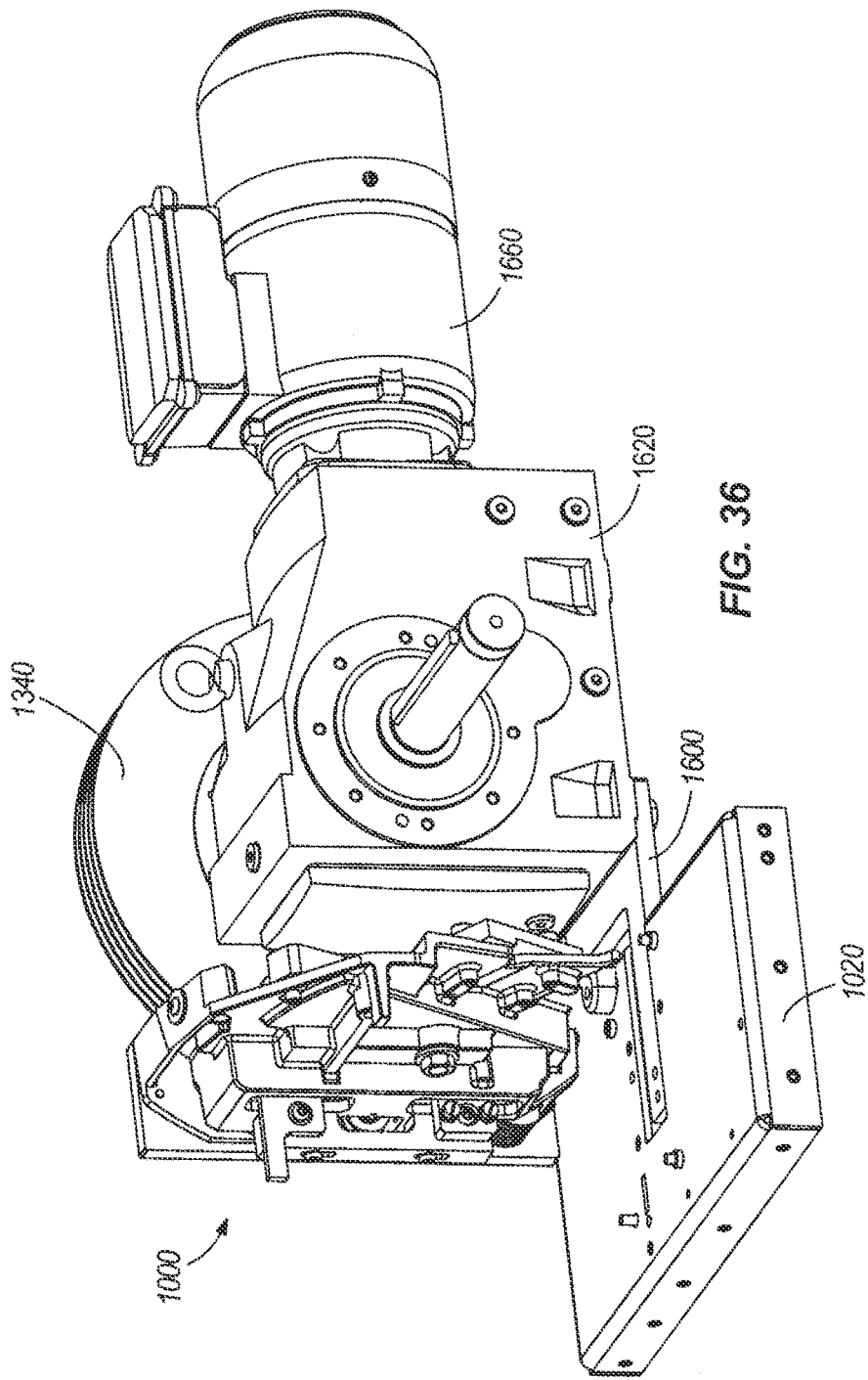
FIG. 36 is a rear perspective view of a power head 106 and brake assembly corresponding with an alternative embodiment of the invention.
Figure 37:
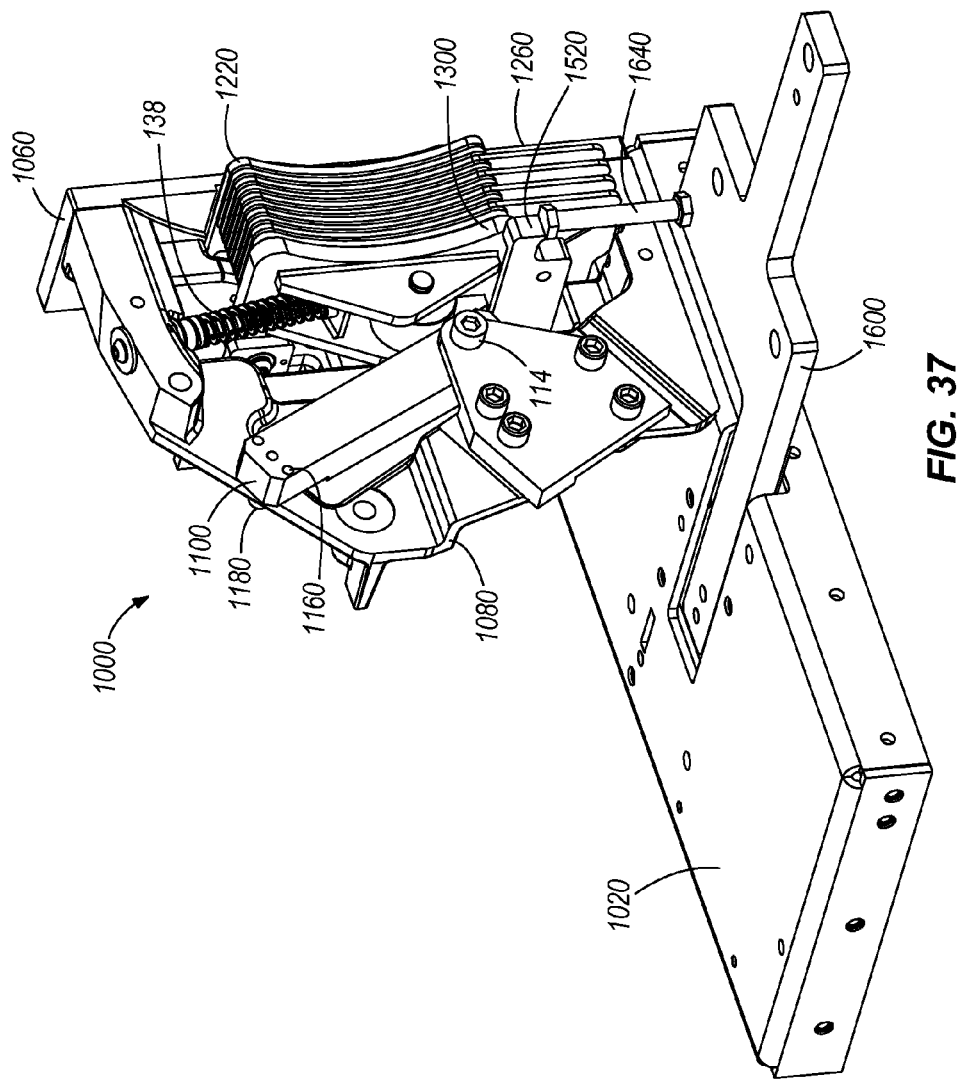
FIG. 37 is a front perspective view of the brake assembly of FIG. 36.
Figure 38:
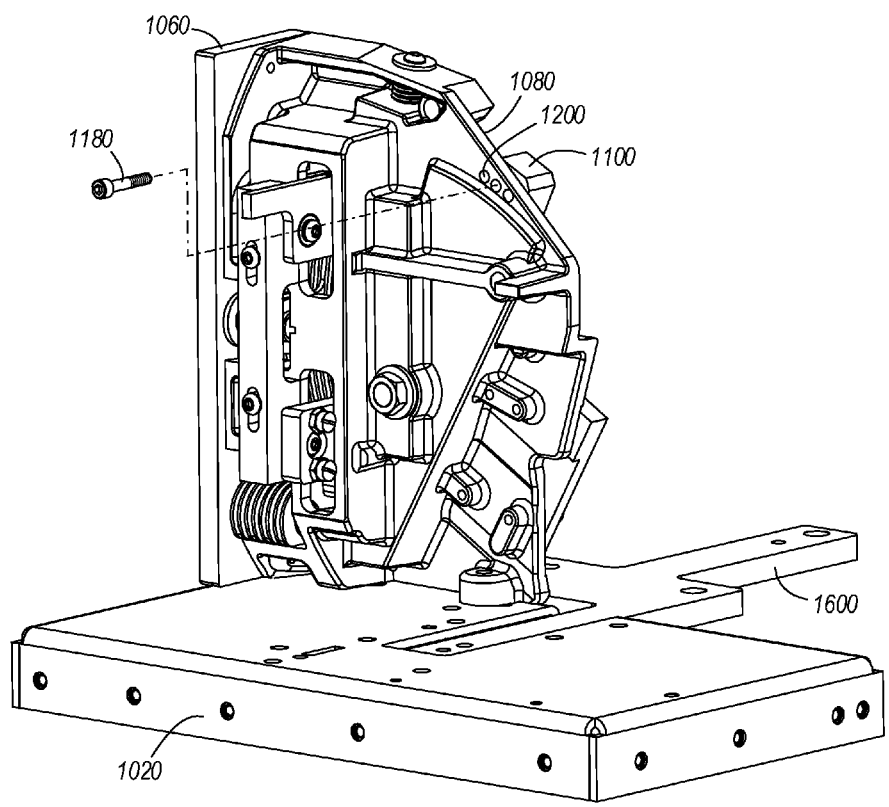
FIG. 38 is a rear perspective view of the brake assembly of FIG. 36.
Figure 39:
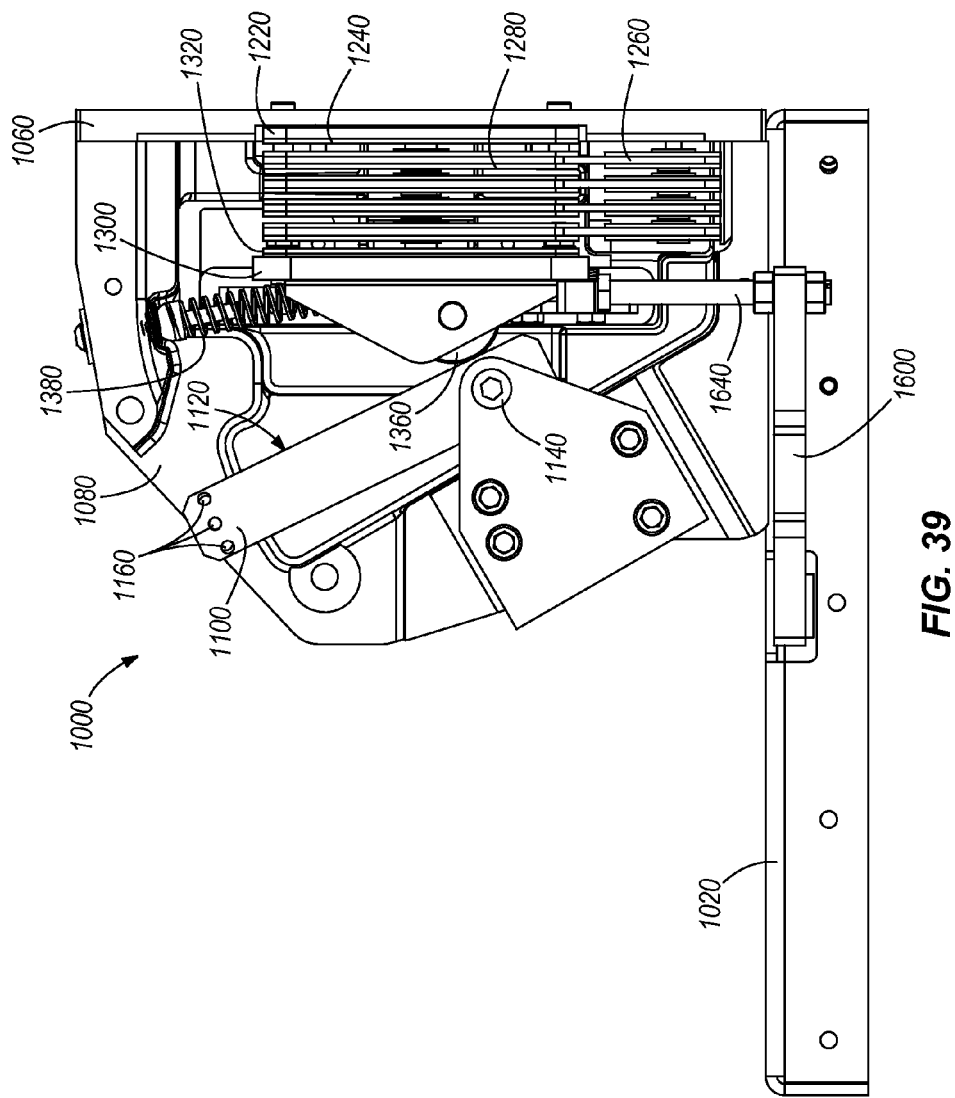
FIG. 39 is a front view of the brake assembly of FIG. 36.

In another embodiment of the low profile, horizontally oriented cable adjuster 598, the cable guide blocks can comprise a pair of guide blocks instead of angled tubes. FIG. 35 illustrates one embodiment of such a cable adjuster 598 having guide blocks 602, 604. In this embodiment, the first guide block 602 includes a 90 degree angle cable pathway, and the second guide block 604 includes a 180 degree angle cable pathway. In such a configuration, the guide blocks 602, 604 can guide the cable 38 from a vertical direction from the loft block 34 into a first horizontal direction and then into a second, opposite horizontal direction. In this manner, the cable adjuster 598 can provide a low profile mechanism for adjusting the cable 38 in the vertical direction so as to trim the cable 38.

In some embodiments, the cable guide blocks 602, 604 can comprise various materials. Such materials can be advantageously lightweight, strong, and inexpensive. One such material is plastic. In other embodiments, the guide blocks 602, 604 can comprise aluminum, steel, or other suitable load-bearing materials. The guide blocks 602, 604 can be made in various ways. For example, the guide blocks 602, 604 can be molded, or cast. As the guide blocks 602, 604 are made, the cable pathways can be formed within the guide blocks 602, 604.

The guide blocks 602, 604 can be securely attached to the first and second plates 606, 614, respectively. In certain embodiments, the guide blocks 602, 604 can be securely bolted or welded to the plates 606, 614 and/or supports. For example, as shown in FIG. 35, at least one of the securing bolts 619 can be inserted through the 90 degree angle cable guide block 602 to securely attached the guide block 602 to the U-shaped support 618 to which the first plate 606 is attached.

In some embodiments, as described herein, the 180 degree guide block 604 may dimensioned for a particular cable 38 diameter with sufficient clearance between the cable 38 and the inside wall of the guide block 604 such that the cable 38 can move smoothly through the guide block 604 without undesirable friction, or drag. In addition, the 180 degree guide block 604 can have a spread 627 between the cable entry point 621 and the cable exit point 622 that provides a cable 38 path that is sufficiently rounded, or arched, to reduce friction between the cable 38 and the guide block 604. Furthermore, each of the cable 38 and the inside walls of the 180 degree guide block 604 cable pathway can comprise materials that facilitate smooth movement of the cable 38 through the guide block 604. Despite these friction-reducing aspects in some embodiments, the 180 degree guide block 604 may allow more cable 38 drag than is desirable for certain heavy loads.

Therefore, in some embodiments, (not shown), the 180 degree guide block 604 can comprise a pulley mechanism, or sheave, rather than the curved tube through which the cable 38 travels. Such a sheave can be rigidly mounted at a desired distance from the first plate 606. In this way, any risk of excessive drag by the cable 38 through the 180 degree turn from one horizontal direction to the opposite horizontal direction can be eliminated. Accordingly, the cable adjuster 598 assembly can be strong enough to support a much heavier batten 46 and/or a load attached to the cable 38, while maintaining the structural integrity of the cable 38 and the cable pathway during repeated use.

In some embodiments, the cable adjuster 598 can be turned about 90 degrees from the vertical orientation shown in FIGS. 33 and 34 to lie on its side in a substantially horizontal orientation. Such a flat orientation can decrease the amount of vertical space needed for the cable adjuster 598 on top of the load, or batten 46. Conserving vertical space needed by the lift assembly system 10 can allow additional space for lift assembly components attached to the overhead support structure and for the load attached to the cables 38.

In the embodiment shown in FIG. 33, the cable adjuster 598 is oriented lengthwise along the length of the article 42, or batten 46. In some embodiments, the cable adjuster 598 can be turned at an angle (not shown) from the length of the article 42 such that the 180 degree cable guide block 604 on one end and the horizontal adjustment bolt 626 on the other end of the cable adjuster 598 can each extend outwardly sideways in opposite directions from the plane of the article 42. For example, in one illustrative embodiment, the cable adjuster 598 can be oriented at an angle of about 28 degrees from the length of the article 42. In this way, the cable adjuster 598 can utilize less space along the length of the article 42, thereby allowing closer location of vertical components, such as cables 38, along the length of the article 42.

Features of lift assembly systems and methods of the present invention may be accomplished singularly, or in combination, in one or more of the embodiments of the present invention. Although particular embodiments have been described, it should be recognized that these embodiments are merely illustrative of the principles of the present invention. Those of ordinary skill in the art will appreciate that lift systems and method of the present invention may be constructed and implemented in other ways and embodiments. Accordingly, the description herein should not be read as limiting the present invention, as other embodiments also fall within the scope of the present invention.

An alternative embodiment of the brake assembly 1000 is illustrated in FIGS. 36-41. The alternative brake assembly 1000 includes a damper 1020 fixed to the power head (e.g., gear box 1626 and motor 1660) of the lift assembly, a caliper side plate 1060 secured to the damper 1020, and a caliper support plate 1080 secured to the caliper side plate 1060.

A ramp arm 1100 is secured to the caliper support plate 1080 to create a ramp surface 1120 at an oblique angle relative to the damper 1020 (and oblique relative to the brake caliper, described below). The ramp arm 1100 is pivotally secured at its lower end to the caliper support plate 1080 by a ramp pivot bolt 1140 to allow adjustment of the angle of the ramp surface 1120 relative to the damper 1020 (and relative to the brake caliper). An upper end of the ramp arm 1100 includes three threaded holes 1160, and a ramp fixing bolt 1180 can be inserted through one of three holes 1200 in the caliper support plate 1080 to secure the upper end of the ramp arm 1100 at one of three different positions corresponding with three different angular positions of the ramp surface 1120.

A fixed pad holder 1220 is secured to the side plate 1060 and supports a fixed brake pad 1240. A series of intermediate pad holders 1260 support intermediate brake pads 1280 and are movable relative to the fixed pad holder 1220. A movable pad holder 1300 supports a movable pad 1320 and is positioned to move toward the fixed pad holder 1220 to squeeze brake rotors 1340 positioned between pairs of opposing brake pads. The movable pad holder 1300 includes a roller 1360 that is positioned to roll on a ramp surface 1120 of the ramp arm 1100. A compression spring 1380 is positioned between the caliper support plate 1080 and the movable pad holder 1300 to provide a downward biasing force on the movable pad holder 1300. Due to the interface between roller 1360 and the ramp surface 1120, such downward force moves the movable pad holder 1300 toward the fixed pad holder 1220 to compress the brake pads 1240, 1280, 1320 onto the rotors 1340 to apply braking to the system. It can therefore be seen that the brake assembly 1000 is biased toward the "brake on" position.

Figure 40:
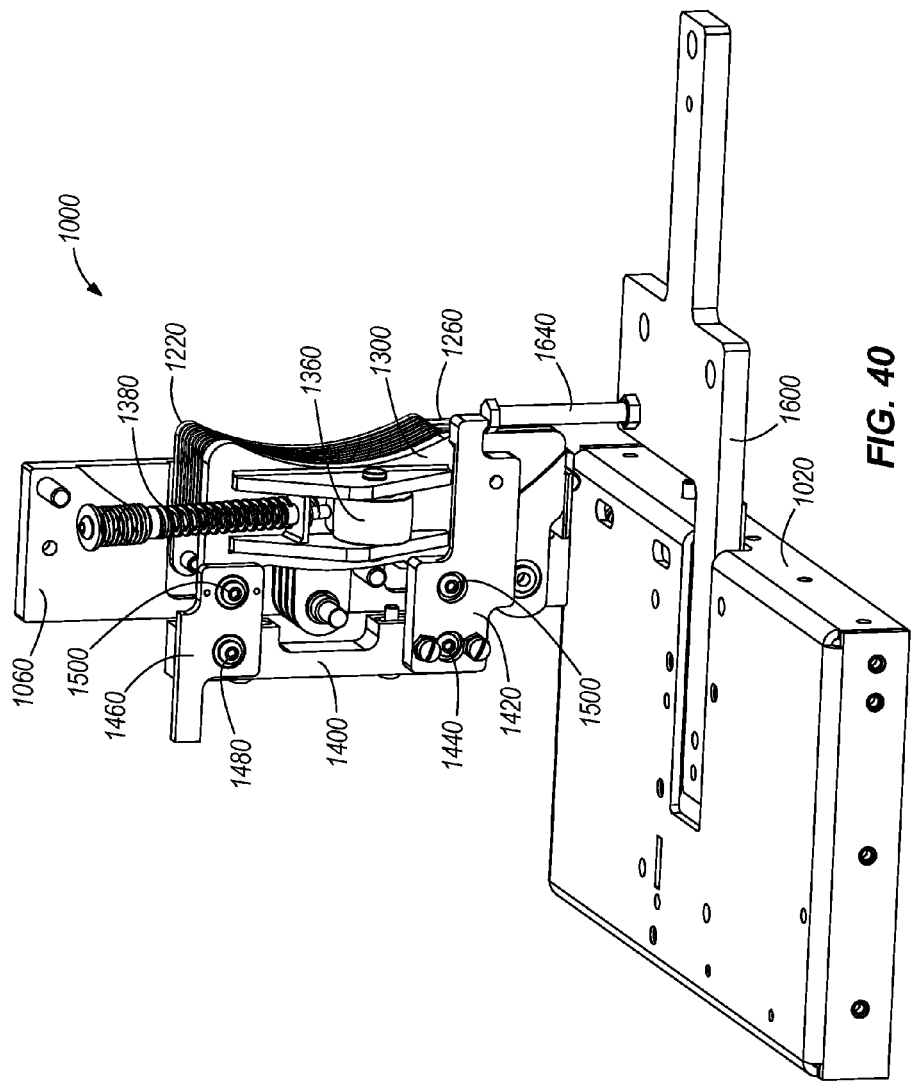
FIG. 40 is a front perspective view of the brake assembly of FIG. 36 with a portion removed for clarity.
Figure 41:
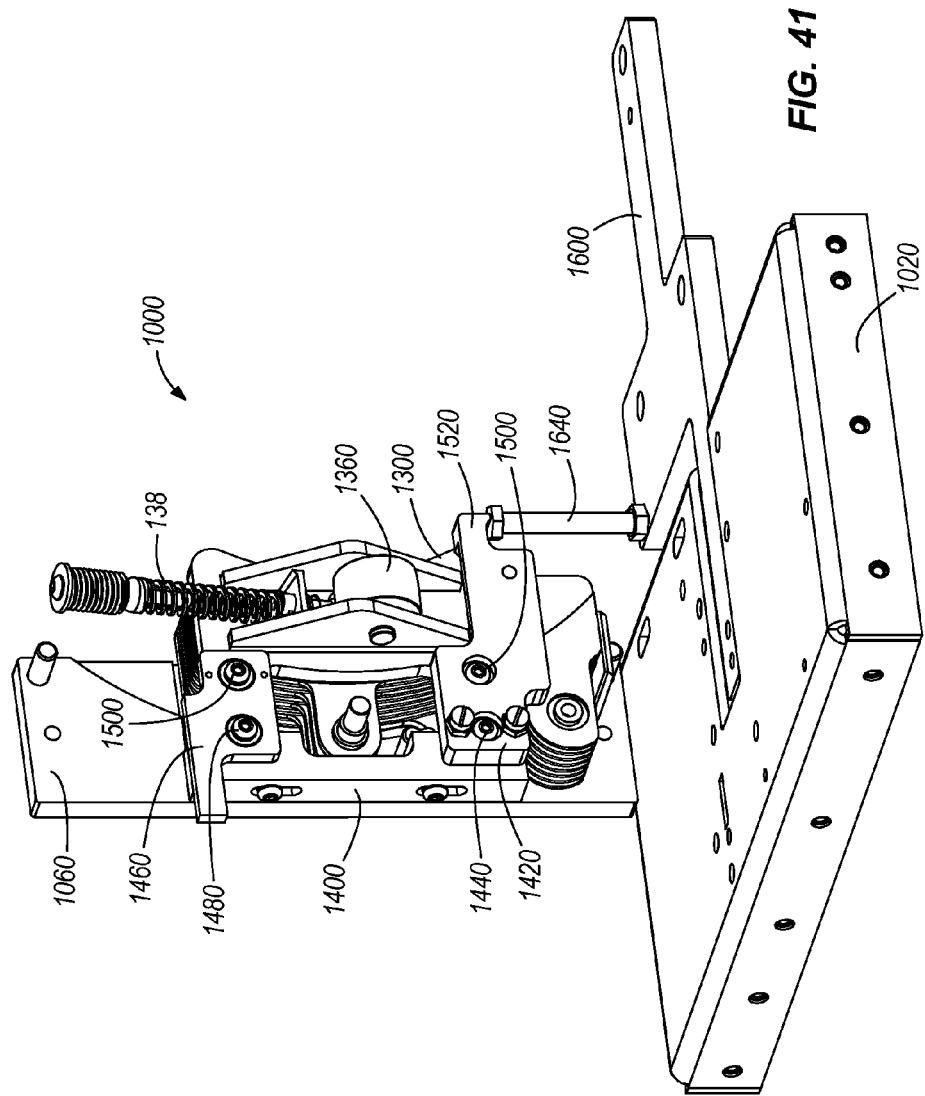
FIG. 41 is a rear perspective view of the brake assembly of FIG. 40.

In order to release the brake, the brake assembly 1000 includes a brake release mechanism in the form of a four-bar linkage that is designed to lift the movable pad holder 1300 upward to overcome the biasing force of the compression spring 1380 to lift the movable pad holder 1300, and thereby remove or substantially reduce the squeezing force of the movable pad holder 1300 toward the fixed pad holder 1220. In the illustrated embodiment, the four-bar linkage includes a four-bar block 1400 secured to the caliper support plate 1080, a lower link 1420 pivotally secured to a lower portion 202b of the four-bar block 1400 by a lower pivot bolt 1440, and an upper link 1460 pivotally secured to an upper portion 202a of the four-bar block 1400 by an upper pivot bolt 1480. The lower and upper links 1420, 1460 are each pivotally secured to the movable pad holder 1300 by intermediate pivot bolts 1500 such that the movable pad holder 1300 forms one of the links of the four-bar linkage. Referring to FIGS. 40-41, the lower link 1420 includes an extension 1520 that facilitates lifting of the lower link 1420 in order to lift the movable pad holder 1300. More specifically, lifting of the extension 1520 will pivot the lower link 1420 about the lower pivot bolt 1440, which will lift the movable pad holder 1300 against the bias of the compression spring 1380 to release the braking force. The upper link 1460 will maintain the angular orientation of the movable pad holder 1300.

The brake release mechanism further includes a brake release plate 1600 secured to the gear box 1626, and a brake release bolt 1640 secured to the brake release plate 1600 and positioned adjacent the extension 1520 of the lower link 1420. As noted above in more detail in connection with a prior embodiment, the gear box 1626 (and the attached release plate 1600 and release bolt 1640) will pivot slightly relative to the damper 1020 when the drive mechanism (e.g., electric motor 1660) is actuated. This pivoting will result in the release bolt 1640 pushing upward on the extension 1520 of the lower link 1420 to thereby move the four-bar linkage and lift the movable pad holder 1300. In this manner, the brake mechanism will automatically release when the drive mechanism is actuated.

Figure 42:
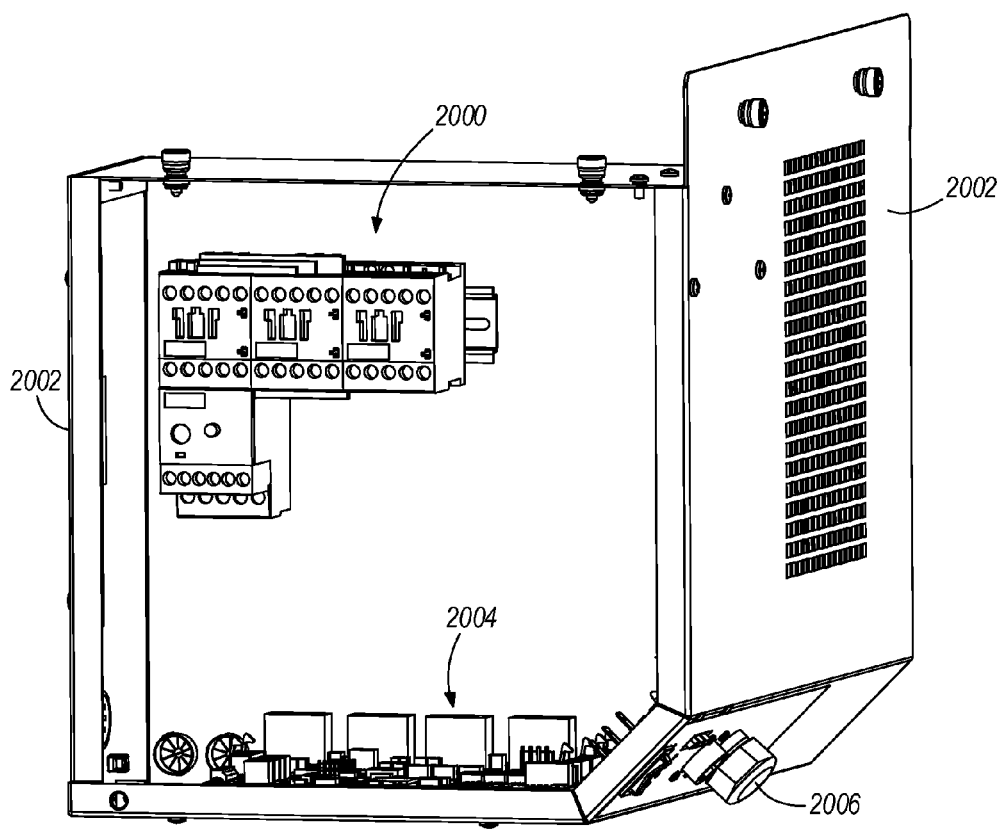
FIG. 42 is a perspective view of a power head housing.
Figure 43:
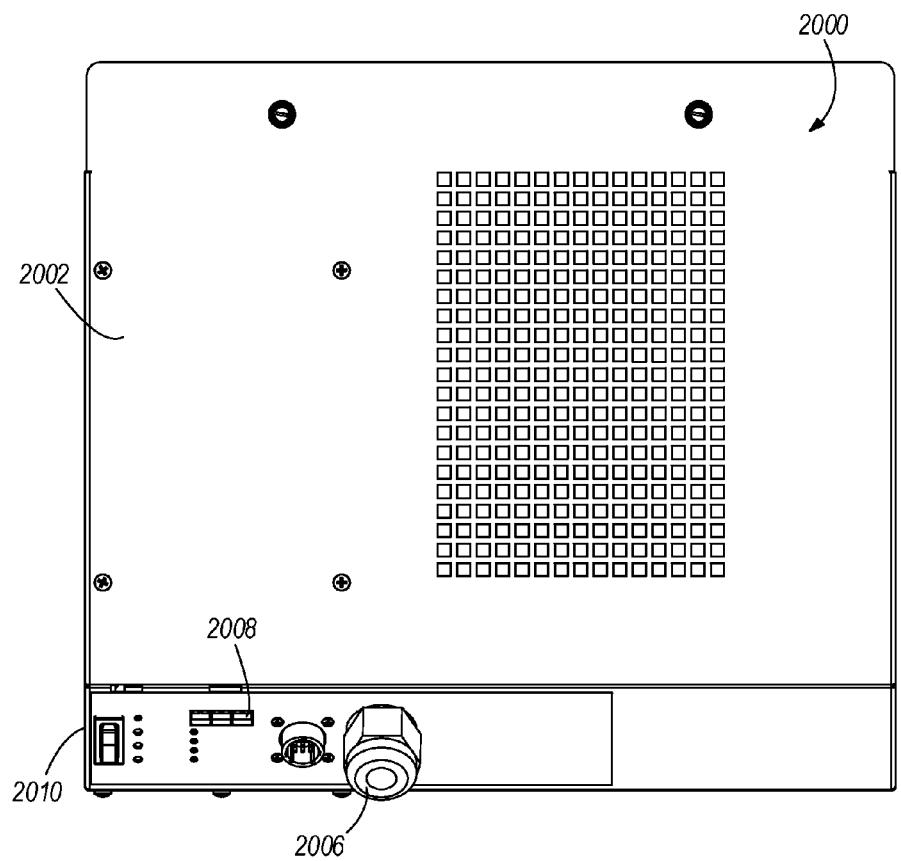
FIG. 43 is a front view of the power head housing of FIG. 42.

FIGS. 42-43 illustrate a portion of a power head housing 2000 that could be used with the present invention. The housing 2000 includes multiple walls 2002 (some walls are removed from the figures for clarity). The housing 2000 contains control electronics 2004 that are adjusted using controls that are accessible from the exterior of the housing 2000. The controls include a power knob 2006, address knobs 2008, and an up/down toggle 2010. The controls also include lighted indicators to provide information regarding the status of the lift assembly.

Figure 44:
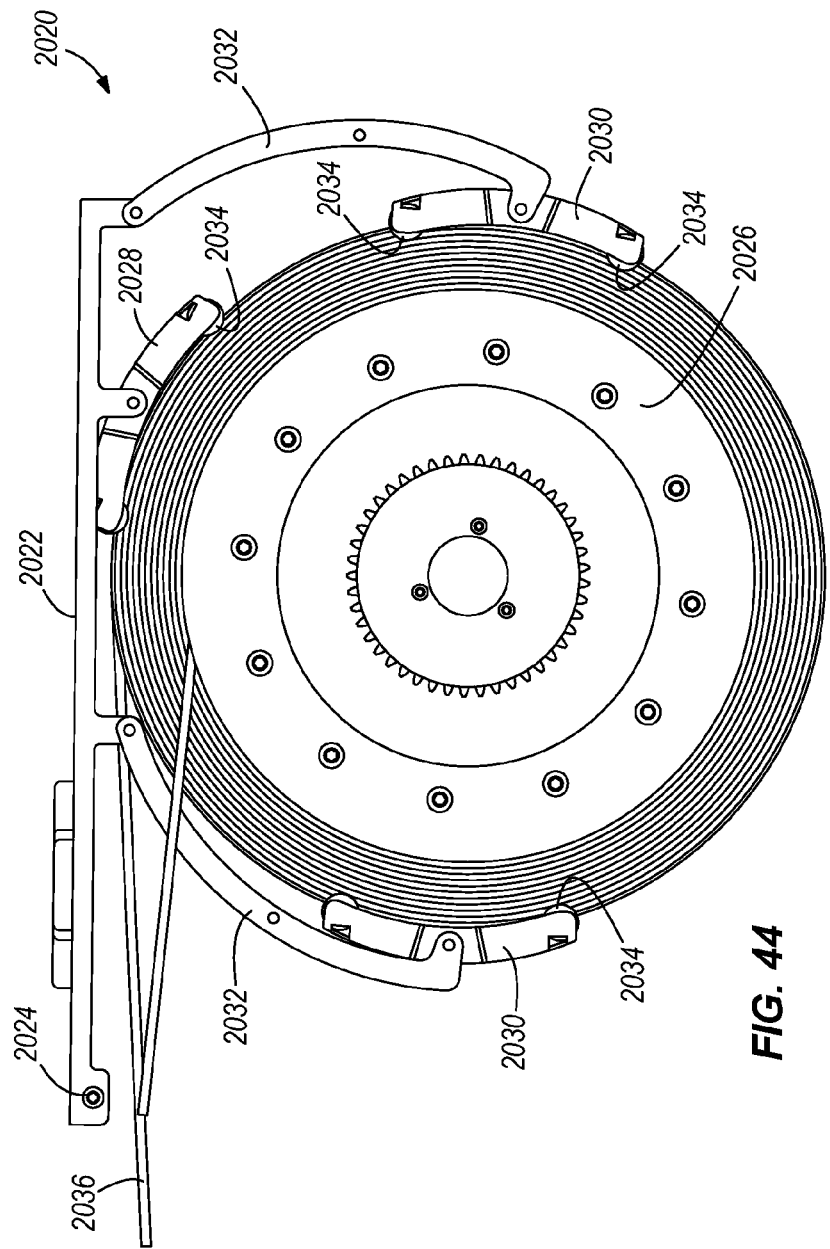
FIG. 44 is a side view of an alternative embodiment of the cable keeper assembly.

FIG. 44 illustrates an alternative embodiment of the cable keeper 2020. In this embodiment, the cable keeper 2020 includes a single keeper arm 2022 that is pivotally mounted at a pivot point 2024 and biased toward the drum 2026 by a spring (not shown). The cable keeper 2020 further includes three cable contact members 2028,2030 spaced around the drum 2026. A center contact member 2028 is pivotally mounted directly to the keeper arm 2022, while the side contact members 2030 are pivotally coupled to the keeper arm 2022 via intermediate swing arms 2032 that are biased toward the drum 2026. Each contact member 2028,2030 includes two rollers 2034 that are designed to be in contact with the cables 2036.

The invention claimed is:
1. A lift assembly comprising:
an article to be lifted between a lowered position and a raised position;
a flexible drive element coupled to the article and defining a longitudinal axis;
a power mechanism coupled to the drive element;
a drum powered by the power mechanism and dimensioned to facilitate winding of the drive element onto the drum;
a cable keeper providing a force on the drive element to bias the drive element toward the drum;
a keeper shaft coupled to the cable keeper to provide movement of the cable keeper laterally relative to the longitudinal axis; and
an encoder mounted for rotation with the keeper shaft, wherein the encoder provides information regarding the position of the article from the lowered position to the raised position.
2. The lift assembly of claim 1, wherein the power mechanism includes a drive shaft, wherein the encoder is a first encoder, and wherein the assembly further comprises a second encoder mounted for rotation with the drive shaft, wherein the first encoder rotates at a slower rate than the second encoder as the article is moved between the lowered and raised positions; and wherein the first and second encoders provide information regarding the position of the article from the lowered position to the raised position.
3. The lift assembly of claim 2, wherein the first and second encoders are mechanical encoders.
4. The lift assembly of claim 2, wherein the first and second encoders are absolute encoders.
5. The lift assembly of claim 1, further comprising a load cell assembly including:
a load cell housing;
a load cell member contacting the drive element and movable relative to the load cell housing; and
a load cell sensor coupled to the load cell member and operative to provide an output corresponding with a load on the drive element.
6. The lift assembly of claim 5, wherein the flexible drive element comprises a cable.
7. The lift assembly of claim 5, wherein the load cell member comprises a roller.
8. The lift assembly of claim 5, further comprising a keeper bar positioned adjacent the load cell member.
9. The lift assembly of claim 5, wherein the load cell member is coupled to a pivot block, and the pivot block is coupled to the load cell sensor.
10. The lift assembly of claim 5, wherein the load cell member is mounted for movement laterally relative to the longitudinal axis.
11. A lift assembly comprising:
an article to be lifted between a lowered position and a raised position;
a flexible drive element coupled to the article and defining a longitudinal axis;
a power mechanism coupled to the flexible drive element;
a drum rotatable by the power mechanism to wind the flexible drive element about the drum; and
a load cell assembly positioned in contact with the drive element, the load cell assembly comprising:
a load cell housing;

a first load cell member contacting a portion of the drive element between the drum and the article to be lifted, wherein the first load cell member is movable relative to the load cell housing;

a second load cell member contacting the drive element at a position spaced from the first load cell member; and a load cell sensor coupled to the first load cell member and operative to provide an output corresponding with a load on the drive element.

12. The lift assembly of claim 11, wherein the flexible drive element comprises a cable.

13. The lift assembly of claim 11, wherein the first load cell member comprises a roller.

14. The lift assembly of claim 11, further comprising first and second keeper bars positioned adjacent the first and second load cell members, respectively.

15. The lift assembly of claim 11, wherein the first load cell member is coupled to a pivot block, and the pivot block is coupled to the load cell sensor.

16. The lift assembly of claim 11, wherein the first load cell member is movable laterally relative to the longitudinal axis.

* * * * *